United States Patent
Takahashi

(10) Patent No.: US 12,176,778 B2
(45) Date of Patent: Dec. 24, 2024

(54) ROTATING ELECTRIC MACHINE AND METHOD OF MANUFACTURING ROTATING ELECTRIC MACHINE HAVING FILLED GAPS BETWEEN ELECTRICAL CONDUCTOR WIRE WOUND TO FORM ARMATURE COIL

(71) Applicant: DENSO CORPORATION, Kariya (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 289 days.

(21) Appl. No.: 17/741,507

(22) Filed: May 11, 2022

(65) Prior Publication Data
US 2022/0271596 A1 Aug. 25, 2022

Related U.S. Application Data

(63) Continuation of application No. PCT/JP2020/041958, filed on Nov. 10, 2020.

(30) Foreign Application Priority Data

Nov. 11, 2019 (JP) .................................. 2019-204217

(51) Int. Cl.
*H02K 3/42* (2006.01)
*H02K 3/52* (2006.01)
(Continued)

(52) U.S. Cl.
CPC .............. *H02K 3/42* (2013.01); *H02K 3/522* (2013.01); *H02K 15/095* (2013.01); *H02K 15/105* (2013.01); *H02K 2203/12* (2013.01)

(58) Field of Classification Search
CPC .. H02K 3/42; H02K 3/04; H02K 3/03; H02K 3/38; H02K 3/12; H02K 3/14; H02K 3/52;
(Continued)

(56) References Cited

U.S. PATENT DOCUMENTS 3,710,437 A * 1/1973 Kipple .................... H02K 15/12
29/598
4,616,407 A * 10/1986 Tamaki .................. H02K 15/12
29/598

(Continued)

FOREIGN PATENT DOCUMENTS

JP 2009-225513 A 10/2009
JP 200922513 A * 10/2009
(Continued)

OTHER PUBLICATIONS

JP 200922513A English Translation.*

*Primary Examiner* — Maged M Almawri
(74) *Attorney, Agent, or Firm* — Oliff PLC

(57) ABSTRACT

In a rotating electric machine that includes an armature with an armature coil, the armature coil is formed by winding an electrical conductor wire. The electrical conductor wire includes a plurality of element wires in a bundled state and an insulating coat covering the bundled element wires. Each of the element wires includes an electrical conductor through which electric current flows, and a fusing layer that covers a surface of the electrical conductor. In the bundled state of the element wires, the fusing layers of the element wires are in contact with and fused to one another. Between adjacent parts of the electrical conductor wire wound to form the armature coil, there are formed gaps due to differences in straightness between different parts of the electrical conductor wire. The gaps are filled with a filler.

2 Claims, 41 Drawing Sheets

(51) Int. Cl.
  *H02K 15/095* (2006.01)
  *H02K 15/10* (2006.01)
(58) Field of Classification Search
  CPC .. H02K 3/28; H02K 3/00; H02K 3/46; H02K 3/50; H02K 3/522; H02K 15/12; H02K 15/0442; H02K 15/095; H02K 15/105; H02K 2203/09; H02K 2203/12; H01F 5/06
  USPC ....... 310/179–208; 29/603.23, 605, 606, 596
  See application file for complete search history.

(56) References Cited

U.S. PATENT DOCUMENTS

| | | | | |
|---|---|---|---|---|
| 8,604,655 | B1* | 12/2013 | Ferran | H02K 3/28 |
| | | | | 310/179 |
| 8,659,202 | B2* | 2/2014 | Ikeda | H02K 3/12 |
| | | | | 310/179 |
| 8,772,995 | B2* | 7/2014 | Ogihara | H02K 15/0081 |
| | | | | 310/201 |
| 8,878,413 | B2* | 11/2014 | Wolf | H02K 3/28 |
| | | | | 310/58 |
| 8,987,969 | B2* | 3/2015 | Kamatani | H02K 15/0068 |
| | | | | 310/201 |
| 9,419,484 | B2* | 8/2016 | Tokizawa | H02K 15/04 |
| 9,496,773 | B2* | 11/2016 | Ishigami | B60L 15/007 |
| 9,559,573 | B2* | 1/2017 | Baba | H02K 15/105 |
| 9,647,502 | B2* | 5/2017 | Takahashi | H02K 9/19 |
| 10,128,728 | B2* | 11/2018 | Hirao | H02K 3/14 |
| 2001/0011852 | A1* | 8/2001 | Nakamura | H02K 3/34 |
| | | | | 310/201 |
| 2002/0033649 | A1* | 3/2002 | Oohashi | H02K 3/28 |
| | | | | 310/201 |
| 2003/0135980 | A1* | 7/2003 | Ichikawa | H02K 15/0081 |
| | | | | 29/598 |
| 2008/0246354 | A1* | 10/2008 | Asao | H02K 15/12 |
| | | | | 310/45 |
| 2011/0036614 | A1* | 2/2011 | Otsuka | C22C 21/00 |
| | | | | 156/50 |
| 2014/0069686 | A1* | 3/2014 | Abe | H01B 7/0275 |
| | | | | 521/88 |
| 2014/0125182 | A1 | 5/2014 | Takahashi | |
| 2016/0028294 | A1 | 1/2016 | Hirao | |
| 2017/0264155 | A1* | 9/2017 | Nakayama | H02K 3/12 |
| 2018/0323672 | A1* | 11/2018 | Juris | H02K 3/18 |
| 2019/0207439 | A1* | 7/2019 | Marino | H02K 1/20 |
| 2020/0161939 | A1 | 5/2020 | Takahashi et al. | |
| 2020/0162003 | A1 | 5/2020 | Takahashi et al. | |
| 2020/0328639 | A1 | 10/2020 | Takahashi | |
| 2020/0336033 | A1 | 10/2020 | Takahashi | |
| 2022/0271596 | A1* | 8/2022 | Takahashi | H02K 15/095 |
| 2022/0399786 | A1* | 12/2022 | Graef | H02K 9/197 |
| 2023/0008528 | A1* | 1/2023 | Tonino | H02K 15/12 |
| 2023/0112188 | A1* | 4/2023 | Sawata | H02K 3/24 |
| | | | | 310/65 |

FOREIGN PATENT DOCUMENTS

| | | |
|---|---|---|
| JP | 2010-207006 A | 9/2010 |
| JP | 2019-122249 A | 7/2019 |

* cited by examiner

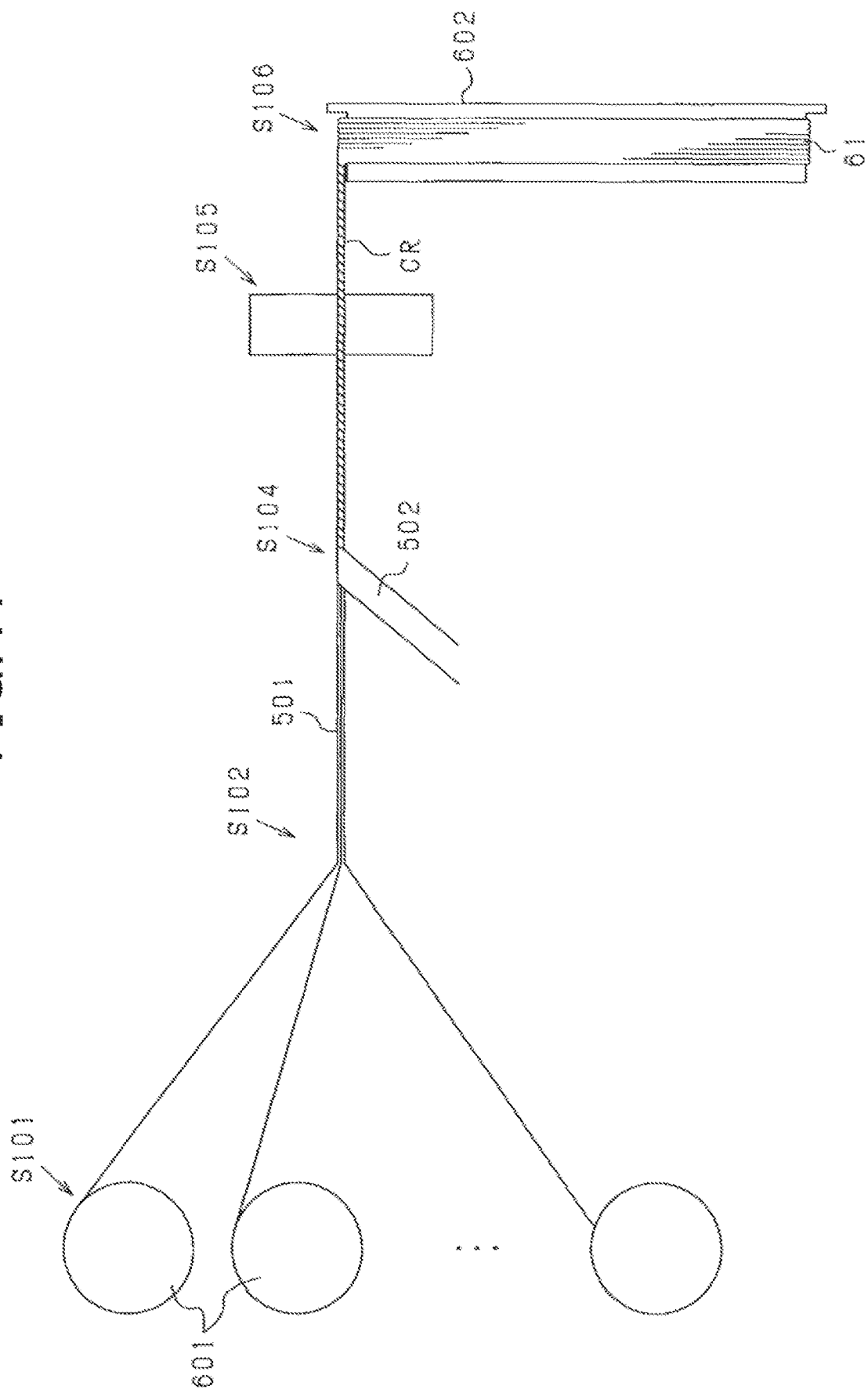

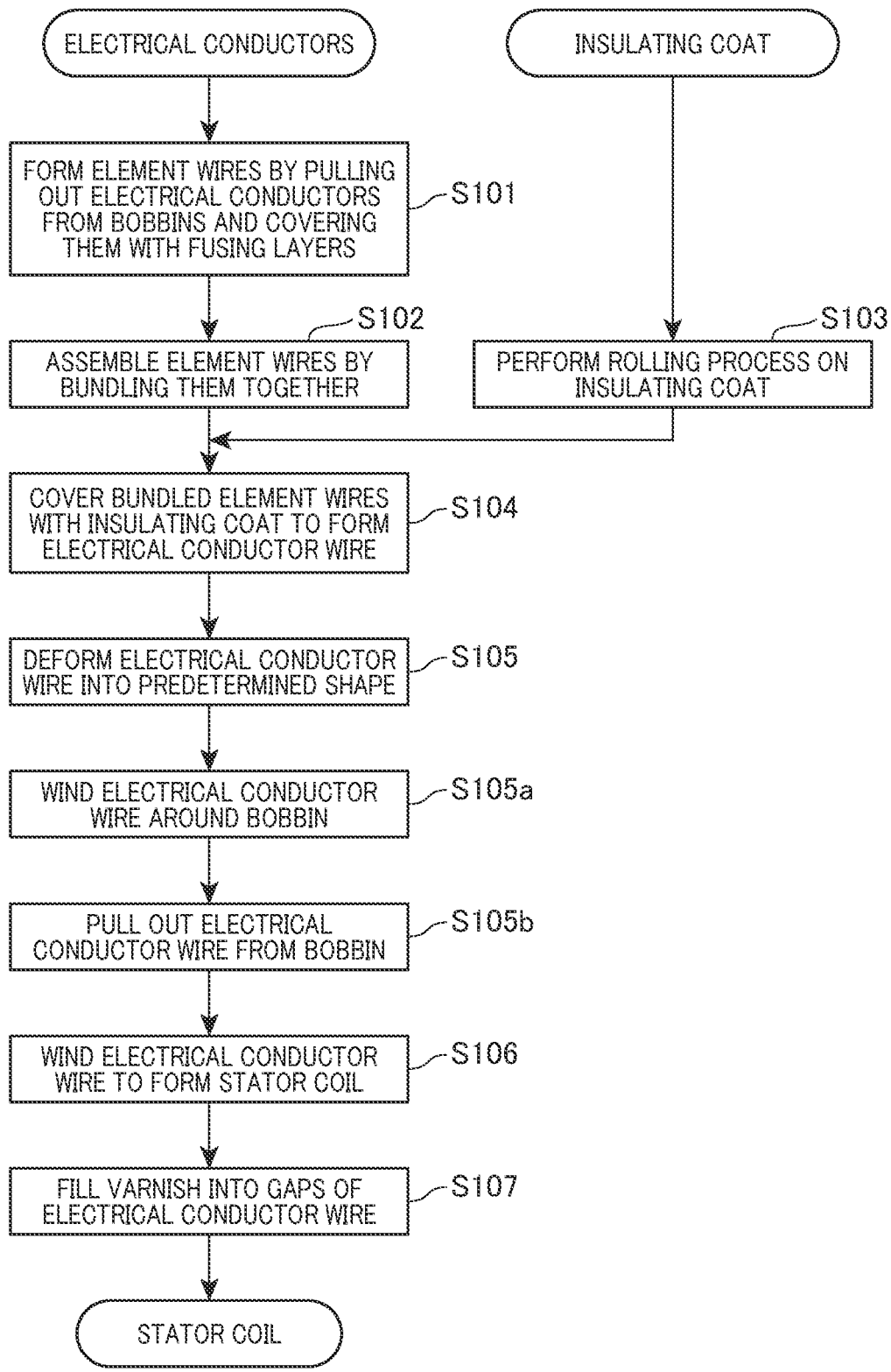

ROTATING ELECTRIC MACHINE AND METHOD OF MANUFACTURING ROTATING ELECTRIC MACHINE HAVING FILLED GAPS BETWEEN ELECTRICAL CONDUCTOR WIRE WOUND TO FORM ARMATURE COIL

CROSS-REFERENCE TO RELATED APPLICATIONS

The present application is a continuation application of International Application No. PCT/JP2020/041958 filed on Nov. 10, 2020, which is based on and claims priority from Japanese Patent Application No. 2019-204217 filed on Nov. 11, 2019. The entire contents of these applications are incorporated by reference into the present application.

BACKGROUND

1 Technical Field

The present disclosure relates to rotating electric machines and methods of manufacturing rotating electric machines.

2 Description of Related Art

Conventionally, a rotating electric machine has been proposed which includes a stator coil (or armature coil) formed by winding an electrical conductor wire, as disclosed in Japanese Patent Application Publication No. JP 2019-106864 A. The electrical conductor wire is formed by bundling element wires together, thereby making it possible to suitably suppress the eddy current loss.

SUMMARY

In the above-described stator coil, each of the element wires is provided with an insulating coat; therefore, the eddy current loss can be suitably suppressed. However, it takes time and effort to manufacture the stator coil. Moreover, the insulating coats of the element wires may become thick, thereby lowering the space factor of electrical conductors of the element wires.

The present disclosure has been accomplished in view of the above problems.

According to the present disclosure, there is provided a rotating electric machine which includes an armature with an armature coil. The armature coil is formed by winding an electrical conductor wire. The electrical conductor wire includes a plurality of element wires in a bundled state and an insulating coat covering the bundled element wires. Each of the element wires includes an electrical conductor through which electric current flows, and a fusing layer that covers a surface of the electrical conductor. In the bundled state of the element wires, the fusing layers of the element wires are in contact with and fused to one another. Between adjacent parts of the electrical conductor wire wound to form the armature coil, there are formed gaps due to differences in straightness between different parts of the electrical conductor wire. The gaps are filled with a filler.

According to the present disclosure, there is also provided a method of manufacturing a rotating electric machine that includes an armature coil. The method includes: an assembly step of bundling a plurality of element wires, each of which includes an electrical conductor through which electric current flows and a fusing layer covering a surface of the electrical conductor, to have the fusing layers of the element wires in contact with and fused to one another; a covering step of covering the element wires, which are bundled in the assembly step, with a tape-shaped insulating coat to form an electrical conductor wire; a first winding step of winding the electrical conductor wire, which is formed in the covering step, around a cylindrical bobbin; a pulling-out step of pulling out the electrical conductor wire, which is wound around the cylindrical bobbin, from the cylindrical bobbin; a second winding step of winding the electrical conductor wire, which is pulled out from the cylindrical bobbin in the pulling-out step, to form the armature coil, and a filling step of filling a filler into gaps between adjacent parts of the electrical conductor wire wound to form the armature coil.

In the above-described rotating electric machine and manufacturing method according to the present disclosure, electrical insulation between adjacent parts of the electrical conductor wire is provided by the insulating coat. On the other hand, the electrical conductors of the element wires are covered with the fusing layers, but have no insulating layers provided thereon; therefore, the electrical conductors may come into contact and thus electrically connected with one another. However, the electric potential differences between the electrical conductors are small. Moreover, even if the fusing layers are damaged during the bundling of the element wires or during the covering of the element wires with the insulating coat, the contact areas between the electrical conductors would be very small and thus the contact resistances between the electrical conductors would be very high. Therefore, even if the electrical conductors are not completely insulated from each other, it is still possible to suppress eddy current from flowing between the electrical conductors.

In view of the above, according to the present disclosure, the fusing layers are provided directly on the electrical conductors without insulating layers provided on the surfaces of the electrical conductors; and the fusing layers are fused to one another. Consequently, it becomes possible to eliminate the time and effort required to provide insulating layers on the surfaces of the electrical conductors. Moreover, with the fusing layers provided on the electrical conductors, it becomes easy to keep the element wires in the bundled state and to cover the bundled element wires with the insulating coat. As a result, it becomes easy to manufacture the electrical conductor wire and thus the rotating electric machine. In addition, since the element wires have no insulating layers provided on the electrical conductors thereof, it becomes possible to improve the space factor of the electrical conductors.

Furthermore, there are cases where the armature coil is formed by: winding the electrical conductor wire around a cylindrical bobbin; then pulling out the electrical conductor wire from the cylindrical bobbin; and further winding the pulled-out electrical conductor wire to form the armature coil. In such cases, deviation occurs in the straightness of the electrical conductor wire due to the difference between the curvatures on the outer peripheral side and the inner peripheral side during the winding of the electrical conductor wire around the cylindrical bobbin; thus the electrical conductor wire is imparted with a wavy habit. Consequently, it becomes easy for gaps to be formed between adjacent parts of the electrical conductor wire when the electrical conductor wire is further wound to form the armature coil. Moreover, with the gaps formed therein, it becomes easy for the electrical conductor wire to vibrate; and electrical breakdown may occur due to friction caused by vibration of the electrical conductor wire. In view of the above, according to the present disclosure, a filler is filled into gaps formed between adjacent parts of the electrical conductor wire. Consequently, with the filler filled in the gaps, it becomes possible to reduce vibration of the electrical conductor wire and thus becomes possible to prevent the insulating coat of the electrical conductor wire from being damaged due to friction caused by vibration of the electrical conductor wire.

BRIEF DESCRIPTION OF THE DRAWINGS

FIG. 44 is a schematic diagram illustrating a manufacturing process of the stator coil according to the second embodiment.

FIG. 46 is a flow chart illustrating a method of manufacturing a stator coil according to a modification of the second embodiment.

DESCRIPTION OF EMBODIMENTS

Figure 1:
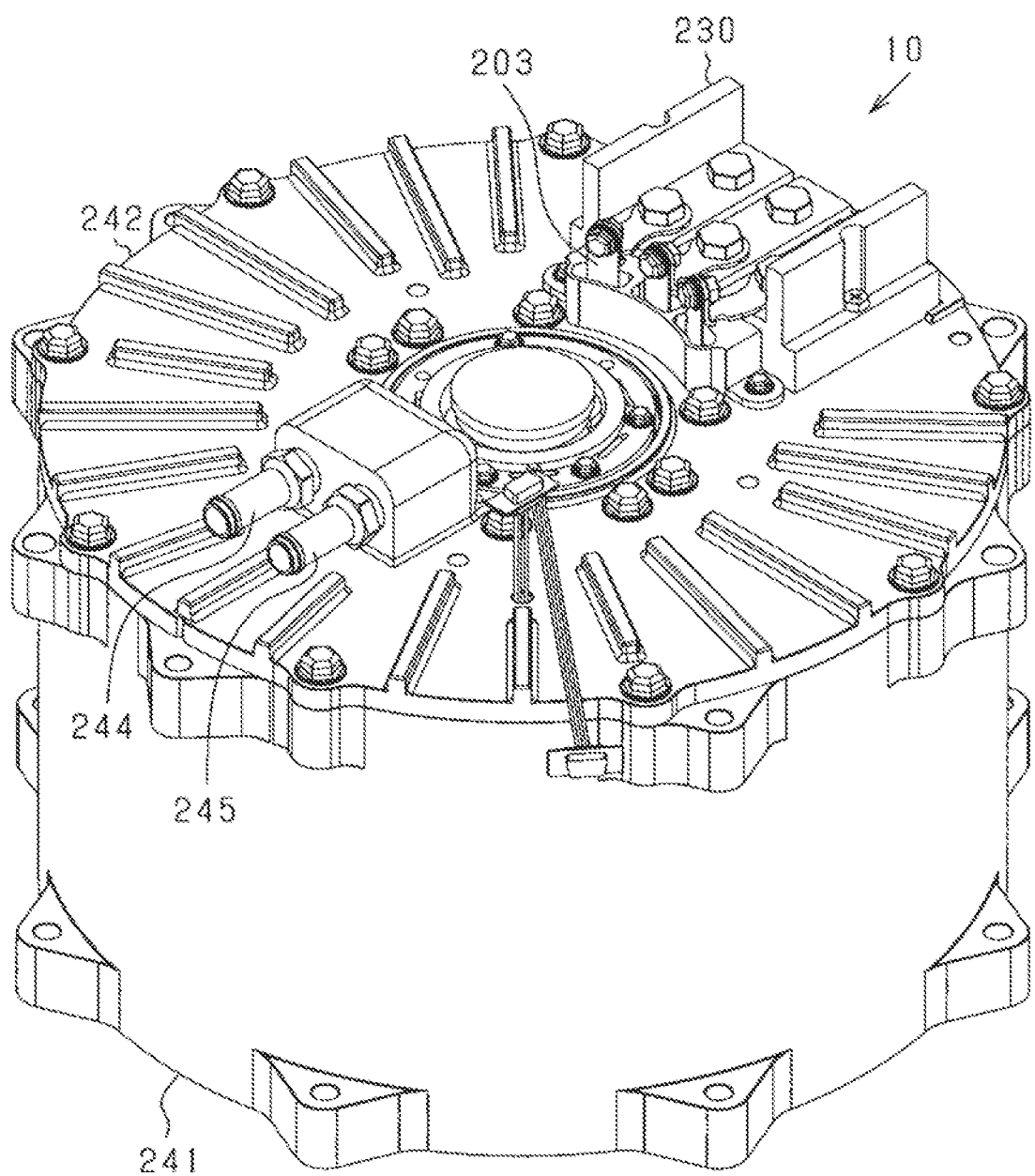
FIG. 1 is a perspective view showing an overview of a rotating electric machine according to a first embodiment.

Embodiments will be described with reference to the drawings. In the embodiments, parts functionally and/or structurally corresponding to each other and/or parts associated with each other will be designated by the same reference signs or by reference signs which are different in the hundreds place from each other. The corresponding parts and/or the associated parts may refer to the explanation of the other embodiments.

Rotating electric machines in the embodiments are configured to be used, for example, as vehicular power sources. However, the rotating electric machines may also be widely used for other applications, such as industrial, automotive, household, office automation and amusement applications. In addition, in the following embodiments, identical or equivalent parts will be designated by the same reference signs in the drawings, and explanation thereof will not be repeated.

First Embodiment

Figure 2:
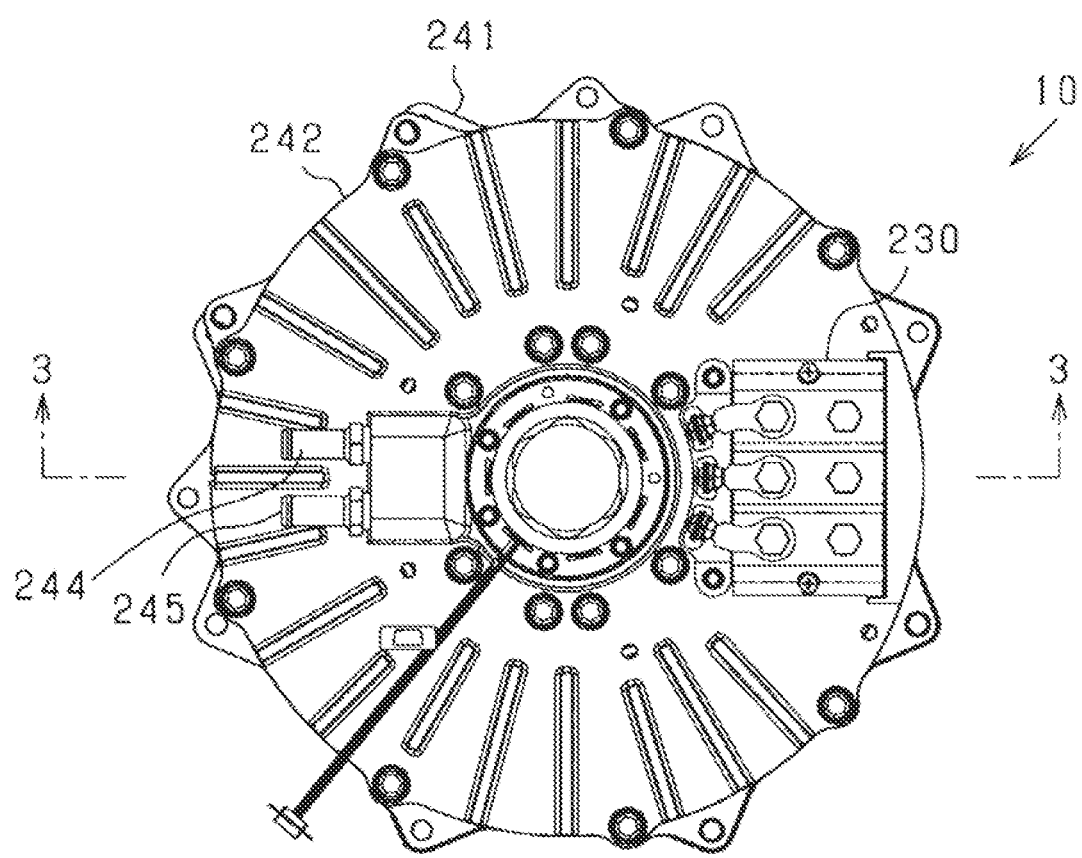
FIG. 2 is a plan view of the rotating electric machine.
Figure 3:
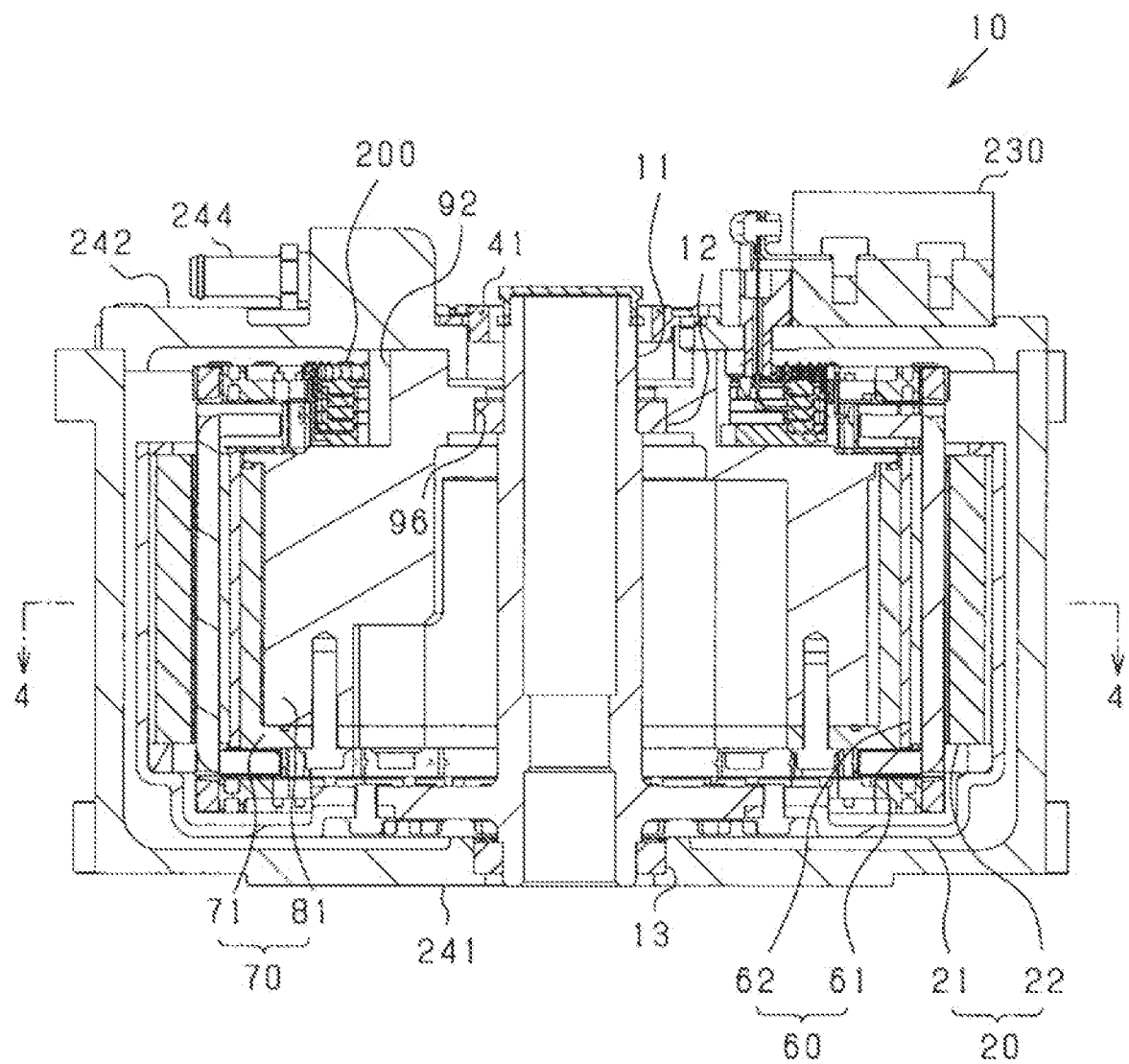
FIG. 3 is a longitudinal cross-sectional view of the rotating electric machine.
Figure 4:
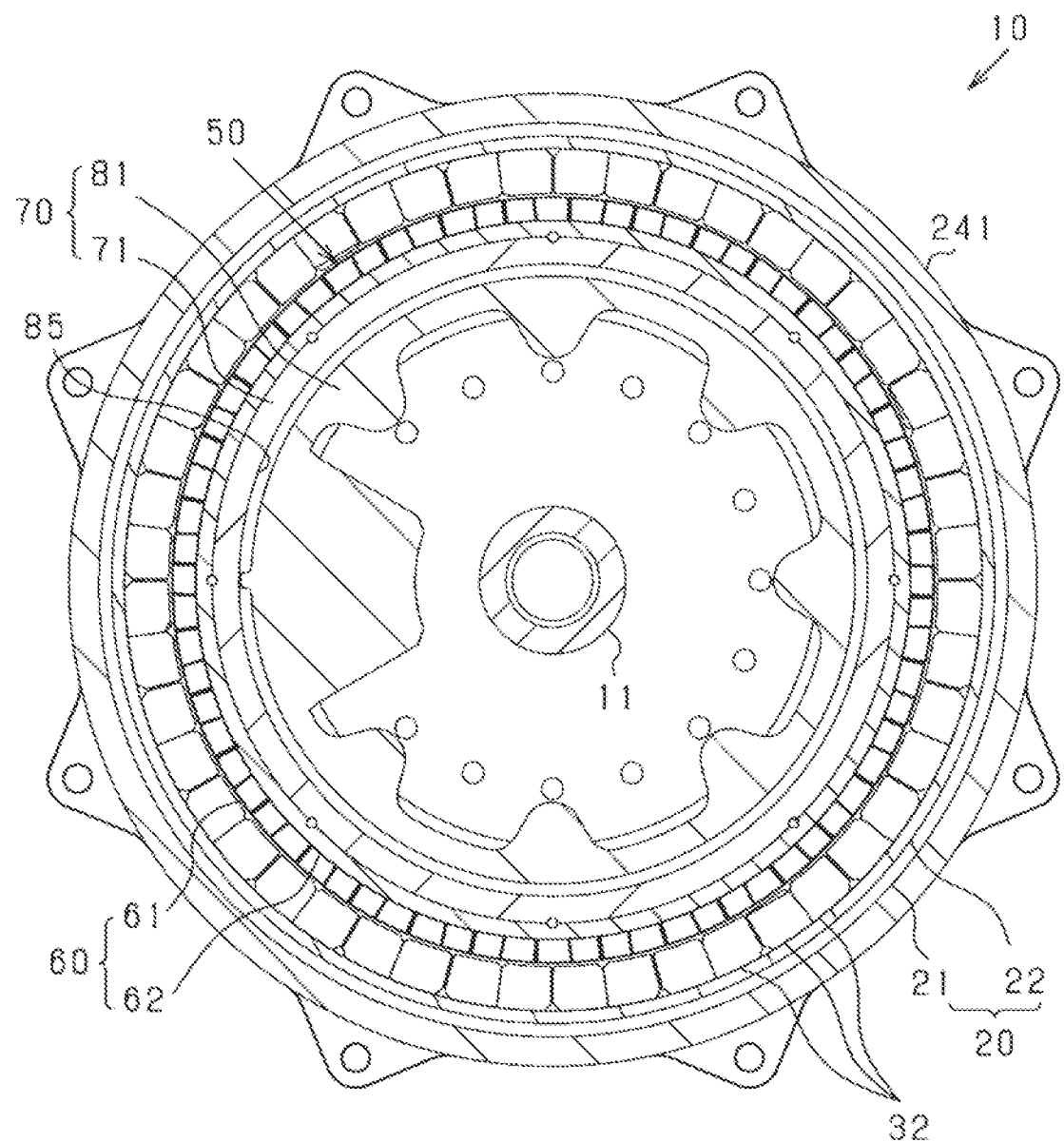
FIG. 4 is a transverse cross-sectional view of the rotating electric machine.
Figure 5:
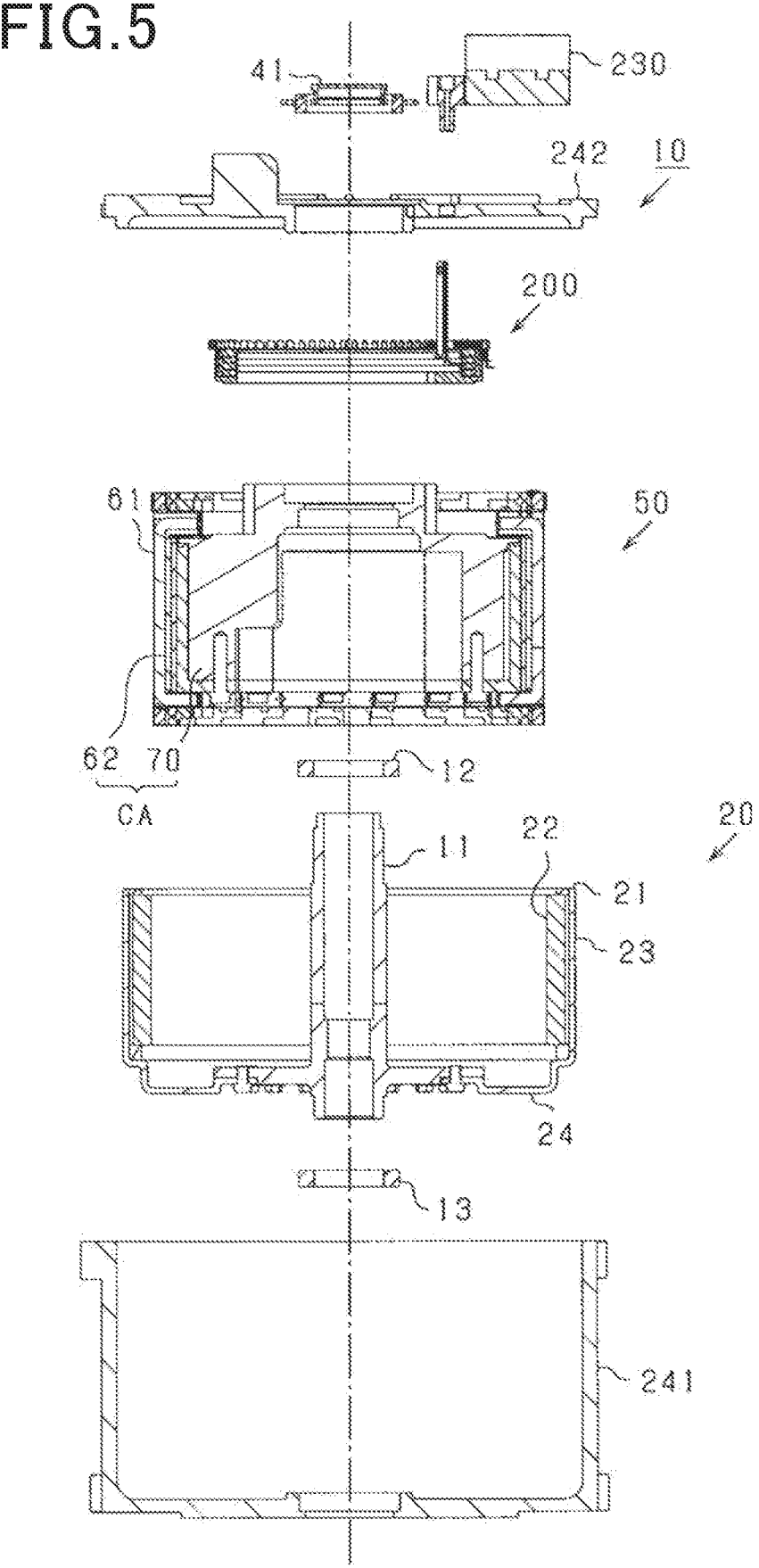
FIG. 5 is an exploded cross-sectional view of the rotating electric machine.

A rotating electric machine 10 according to the present embodiment is a synchronous multi-phase AC motor with an outer rotor structure (i.e., an outer rotating structure). The outline of the rotating electric machine 10 is illustrated in FIGS. 76-80. FIG. 1 is a perspective view showing an overview of the rotating electric machine 10. FIG. 2 is a plan view of the rotating electric machine 10. FIG. 3 is a longitudinal cross-sectional view (i.e., cross-sectional view taken along the line 3-3 in FIG. 2) of the rotating electric machine 10. FIG. 4 is a transverse cross-sectional view (i.e., cross-sectional view taken along the line 4-4 in FIG. 3) of the rotating electric machine 10. FIG. 5 is an exploded cross-sectional view showing components of the rotating electric machine 10 in an exploded manner. In the following explanation, in the rotating electric machine 10, the direction in which a rotating shaft 11 extends will be referred to as the axial direction; the directions extending radially from the center of the rotating shaft 11 will be referred to as the radial directions; and the direction extending along a circle centering on the rotating shaft 11 will be referred to as the circumferential direction.

The rotating electric machine 10 mainly includes a rotating electric machine main body, which is composed of a rotor 20, a stator unit 50 and a busbar module 200, and a housing 241 and a housing cover 242 that are provided to together surround the rotating electric machine main body. These components are each arranged coaxially with the rotating shaft 11 that is provided integrally with the rotor 20. These components are assembled in a predetermined sequence in the axial direction to together constitute the rotating electric machine 10. The rotating shaft 11 is supported by a pair of bearings 12 and 13 provided respectively in the stator unit 50 and the housing 241; and the rotating shaft 11 is rotatable in the supported state. In addition, the bearings 12 and 13 may be implemented by, for example, radial ball bearings each of which includes an inner ring, an outer ring and a plurality of balls disposed between the inner and outer rings. With rotation of the rotating shaft 11, for example, an axle of a vehicle rotates. The rotating electric machine 10 can be mounted to the vehicle by fixing the housing 241 to a vehicle body frame or the like.

In the rotating electric machine 10, the stator unit 50 is provided so as to surround the rotating shaft 11; and the rotor 20 is arranged radially outside the stator unit 50. The stator unit 50 includes a stator 60 and a stator holder 70 assembled to the radially inner periphery of the stator 60. The rotor 20 and the stator 60 are radially opposed to each other with an air gap formed therebetween. The rotor 20 rotates, along with the rotating shaft 11, on the radial outer side of the stator 60. In the present embodiment, the rotor 20 functions as a "field system" and the stator 60 functions as an "armature".

Figure 6:
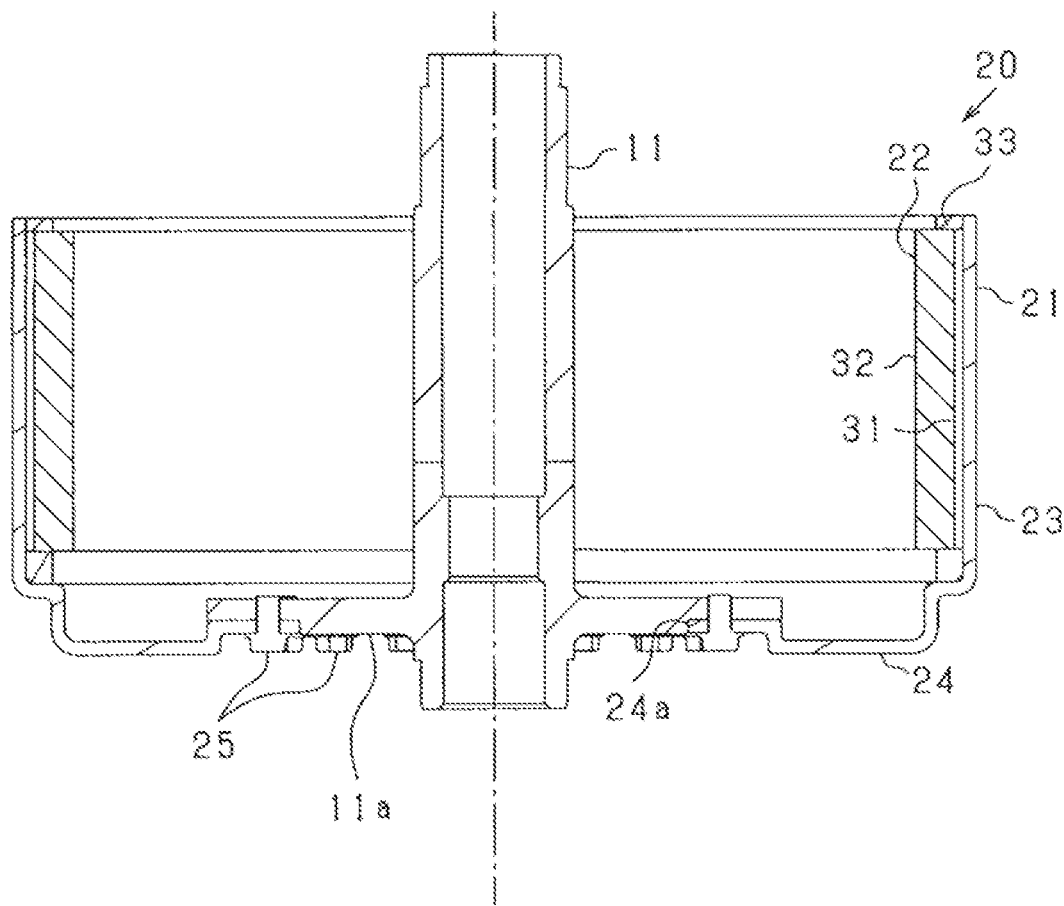
FIG. 6 is a cross-sectional view of a rotor of the rotating electric machine.

FIG. 6 is a longitudinal cross-sectional view of the rotor 20. As shown in FIG. 6, the rotor 20 has a substantially cylindrical rotor carrier 21 and an annular magnet unit 22 fixed to the rotor carrier 21. The rotor carrier 21 has a cylindrical portion 23 and an end plate portion 24 provided at one axial end of the cylindrical portion 23. The cylindrical portion 23 and the end plate portion 24 are integrally formed to together constitute the rotor carrier 21. The rotor carrier 21, which functions as a magnet holding member, has the magnet unit 22 fixed in an annular shape on the radially inner side of the cylindrical portion 23. In a central part of the end plate portion 24, there is formed a through-hole 24a. The rotating shaft 11 is fixed, in a state of being inserted in the through-hole 24a, to the end plate portion 24 by fasteners 25 such as bolts. More specifically, the rotating shaft 11 has a flange 11a formed to extend in a direction intersecting (or perpendicular to) the axial direction. The rotating shaft 21 is fixed to the rotor carrier 21 with the flange 11a of the rotating shaft 11 in surface contact with the end plate portion 24 of the rotor carrier 21.

The magnet unit 22 includes a cylindrical magnet holder 31, a plurality of magnets 32 fixed on an inner circumferential surface of the magnet holder 31, and an end plate 33 fixed on the opposite axial side of the magnet holder 31 and the magnets 32 to the end plate portion 24 of the rotor carrier 21. The magnet holder 31 has the same axial length as the magnets 32. The magnets 32 are provided so as to be surrounded by the magnet holder 31 from the radially outer side. The magnet holder 31 and the magnets 32 are fixed so as to abut, at ends thereof on one axial side, the end plate 33. In addition, the magnet unit 22 corresponds to a "magnet section".

Figure 7:
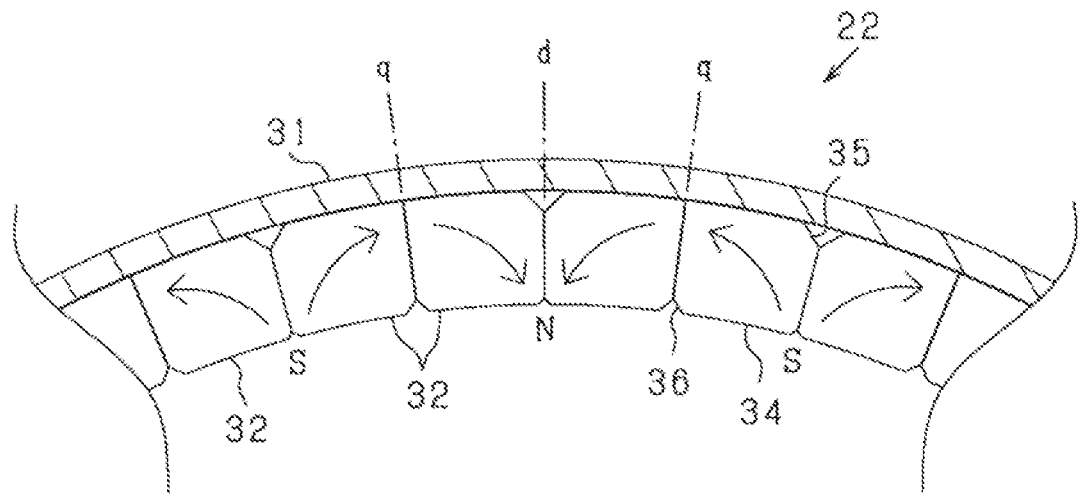
FIG. 7 is a transverse partial cross-sectional view illustrating the cross-sectional structure of a magnet unit of the rotor.

FIG. 7 is a transverse partial cross-sectional view illustrating the cross-sectional structure of the magnet unit 22. In FIG. 7, the orientation of easy axes of magnetization of the magnets 32 is indicated by arrows.

In the magnet unit 22, the magnets 32 are provided in alignment with each other in the circumferential direction of the rotor 20 so as to have their polarities alternately changing in the circumferential direction. Consequently, in the magnet unit 22, there are formed a plurality of magnetic poles along the circumferential direction. The magnets 32 are polar anisotropic permanent magnets. Moreover, the magnets 32 are implemented by sintered neodymium magnets whose intrinsic coercive force is higher than or equal to 400 [kA/m] and residual flux density Br is higher than or equal to 1.0 [T].

Radially inner peripheral surfaces of the magnets 32 constitute magnetic flux acting surfaces 34 through which magnetic flux flows into or out of the magnets 32. Moreover, in the magnets 32, the orientation of the easy axes of magnetization on the d-axis side (or in the d-axis-side parts) is different from the orientation of the easy axes of magnetization on the q-axis side (or in the q-axis-side parts). On the d-axis side, the easy axes of magnetization are oriented to be parallel to the d-axis. In contrast, on the q-axis side, the easy axes of magnetization are oriented to be perpendicular to the q-axis. Consequently, depending on the change in the orientation of the easy axes of magnetization, arc-shaped magnet magnetic paths are formed in the magnets 32. In short, the magnets 32 are configured to have the easy axes of magnetization oriented such that the easy axes of magnetization are more parallel to the d-axis on the d-axis side than on the q-axis side; the d-axis represents the centers of the magnetic poles while the q-axis represents the boundaries between the magnetic poles.

In the magnets 32, since the magnet magnetic paths are arc-shaped, the magnet magnetic paths become longer than the radial thickness of the magnets 32. Consequently, the permeance of the magnets 32 is increased, thereby making it possible to exert, without changing the volume of the magnets 32, the same ability as magnets having a larger volume than the magnets 32.

Each of the magnetic poles is formed of a circumferentially-adjacent pair of the magnets 32. That is, the magnets 32, which are circumferentially aligned in the magnet unit 22, have division surfaces at both the d-axis positions and the q-axis positions. The magnets 32 are arranged in contact with or in close proximity to each other. Moreover, the magnets 32 have the arc-shaped magnet magnetic paths as described above. At the q-axis, the N pole and the S pole of circumferentially-adjacent magnets 32 face each other. Consequently, it becomes possible to improve the permeance in the vicinity of the q-axis. Moreover, every two magnets 32 arranged with the q-axis interposed therebetween attract each other and thus can be kept in contact with each other. Such an arrangement also constitutes to improvement of the permeance.

Figure 8:
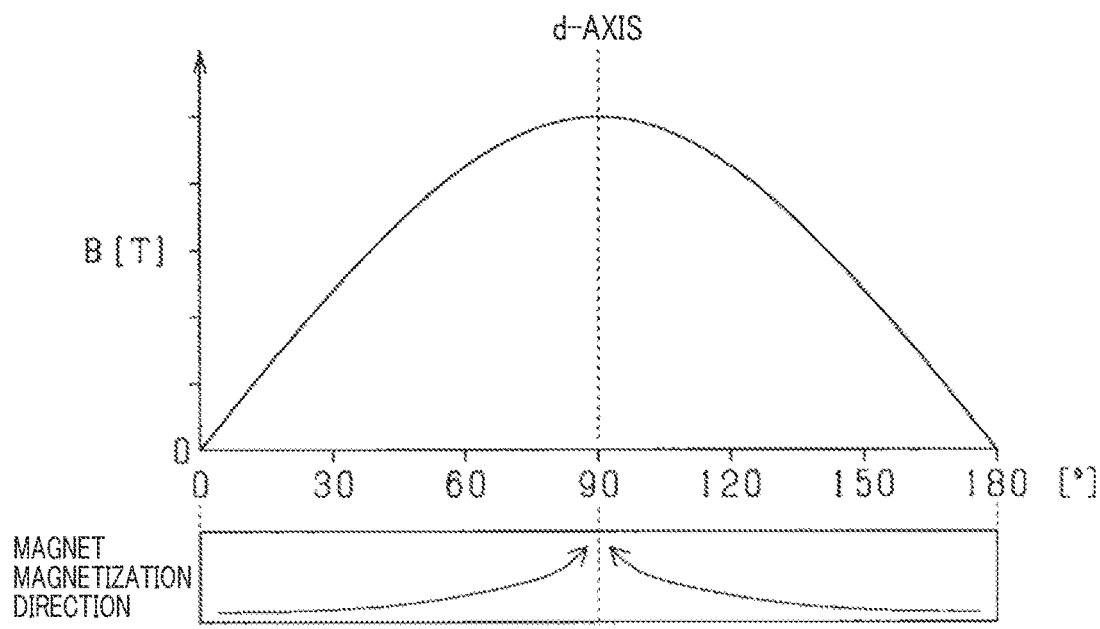
FIG. 8 is a diagram illustrating the relationship between electrical angle and magnetic flux density in magnets of the first embodiment.
Figure 9:
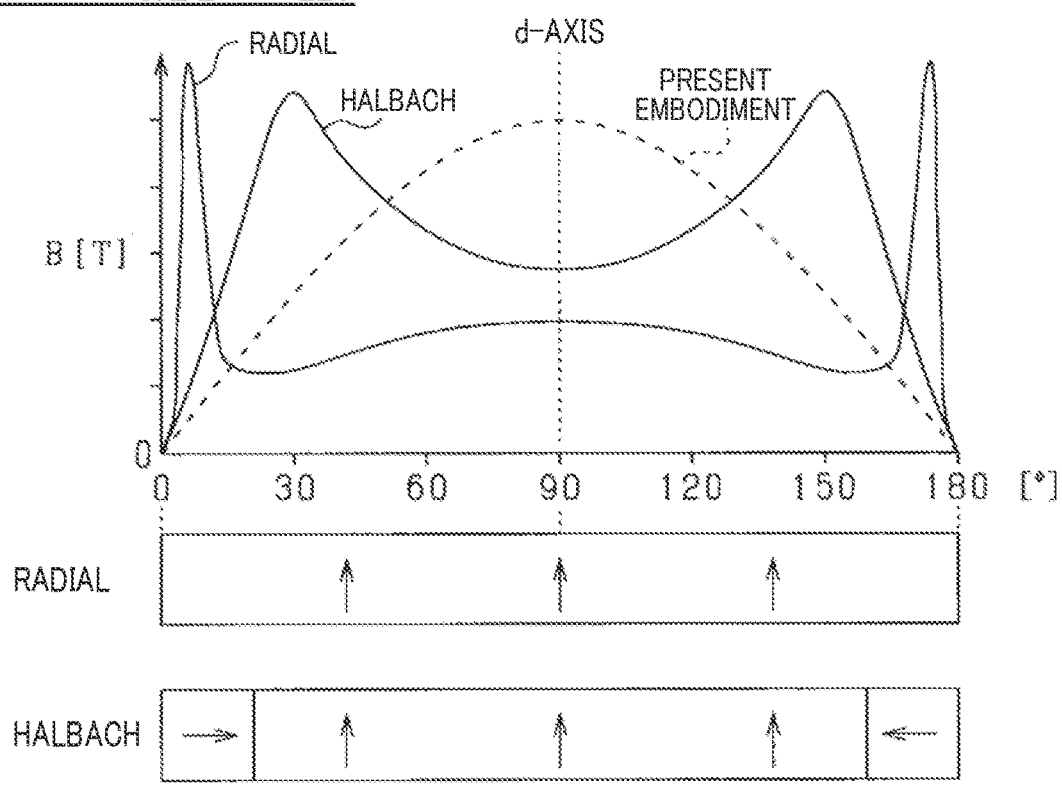
FIG. 9 is a diagram illustrating the relationship between electrical angle and magnetic flux density in magnets of comparative examples.

In the magnet unit 22, magnetic flux flows along the arc-shaped magnet magnetic paths between the adjacent N and S poles, i.e., between the adjacent magnets 32. Therefore, the magnet magnetic paths are lengthened in comparison with the case of employing, for example, radial anisotropic magnets. Consequently, as shown in FIG. 8, the magnetic flux density distribution becomes approximate to a sine wave. As a result, as shown in FIG. 9, unlike the magnetic flux density distribution in a comparative example where radial anisotropic magnets are employed, it becomes possible to concentrate magnetic flux on the magnetic pole center side, thereby increasing the torque of the rotating electric machine 10. Moreover, it can be seen from FIG. 9 that the magnetic flux density distribution in the magnet unit 22 according to the present embodiment is also different from the magnetic flux density distribution in a comparison example where magnets are arranged in a conventional Halbach array. In addition, in each of FIGS. 8 and 9, the horizontal axis represents electrical angle and the vertical axis represents magnetic flux density; 90° on the horizontal axis represents the d-axis (i.e., the magnetic pole center) and 0° and 180° on the horizontal axis represent the q-axis.

Accordingly, with the configuration of the magnets 32 according to the present embodiment, in the magnet unit 22, the magnet magnetic flux on the d-axis is intensified and the magnetic flux change in the vicinity of the q-axis is suppressed. Consequently, it becomes possible to suitably realize the magnet unit 22 where the surface magnetic flux gradually changes from the q-axis to the d-axis in each of the magnetic poles.

The sine wave matching percentage of the magnetic flux density distribution may be, for example, 40% or higher. In this case, it is possible to reliably increase the amount of magnetic flux at the central portion of the waveform in comparison with the case of employing radial-oriented magnets and the case of employing parallel-oriented magnets. In the case of employing radial-oriented magnets, the sine wave matching percentage is about 30%. Moreover, setting the sine wave matching percentage to be higher than or equal to 60%, it is possible to reliably increase the amount of magnetic flux at the central portion of the waveform in comparison with the case of employing magnets arranged in a magnetic flux concentration array such as a Halbach array.

As shown in FIG. 9, in the comparative example where radial anisotropic magnets are employed, the magnetic flux density changes sharply in the vicinity of the q-axis. The sharp change in the magnetic flux density causes the amount of eddy current generated in a stator coil 61 of the stator 60 to increase; the stator coil 61 will be described in detail later. Moreover, the magnetic flux on the stator coil 61 side also changes sharply. In contrast, in the present embodiment, the waveform of the magnetic flux density distribution is approximate to a sine wave. Consequently, the change in the magnetic flux density in the vicinity of the q-axis is gentler than in the comparative example where radial anisotropic magnets are employed. As a result, it becomes possible to suppress generation of eddy current in the stator coil 61.

In the magnets 32, there are formed recesses 35 in the radially outer peripheral surfaces of the magnets 32 within a predetermine range including the d-axis; and there are formed recesses 36 in the radially inner peripheral surfaces of the magnets 32 within a predetermined range including the q-axis. Specifically, with the orientation of the easy axes of magnetization of the magnets 32 according to the present embodiment, on the radially outer peripheral surfaces of the magnets 32, the magnet magnetic paths are shortened in the vicinity of the d-axis; on the radially inner peripheral surfaces of the magnets 32, the magnet magnetic paths are shortened in the vicinity of the q-axis. Therefore, in consideration of the fact that it is difficult to generate sufficient magnet magnetic flux at those locations in the magnets 32 where the magnet magnetic paths are short, the magnets 32 are cut off at those locations where the magnet magnetic flux is weak.

In addition, the magnet unit 22 may alternatively be configured so that the number of the magnets 32 is equal to the number of the magnetic poles. For example, each of the magnets 32 may be provided between the centers of a circumferentially-adjacent pair of the magnetic poles, the centers of the magnetic poles are represented by the d-axis. In this case, the q-axis is located at the circumferential center in each of the magnets 32; and the magnets 32 have division surfaces only at the d-axis positions. Moreover, instead of the q-axis, the d-axis may be located at the circumferential center in each of the magnets 32. Furthermore, instead of the configurations where the number of the magnets 32 is twice or equal to the number of the magnetic poles, a configuration may be employed where there is provided only an annular magnet in the magnet unit 22.

As shown in FIG. 3, a resolver 41, which is a rotation angle sensor, is provided on an end portion (i.e., upper end portion in the FIG. 3) of the rotating shaft 11 on the opposite side to the location where the rotor carrier 21 is joined to the rotating shaft 11. The resolver 41 includes a resolver rotor fixed on the rotating shaft 11 and a resolver stator arranged radially outside the resolver rotor to face the resolver rotor. The resolver rotor is annular plate-shaped and has the rotating shaft 11 inserted therein so as to be coaxial with the rotating shaft 11. The resolver stator includes a stator core and a stator coil and is fixed to the housing cover 242.

Figure 10:
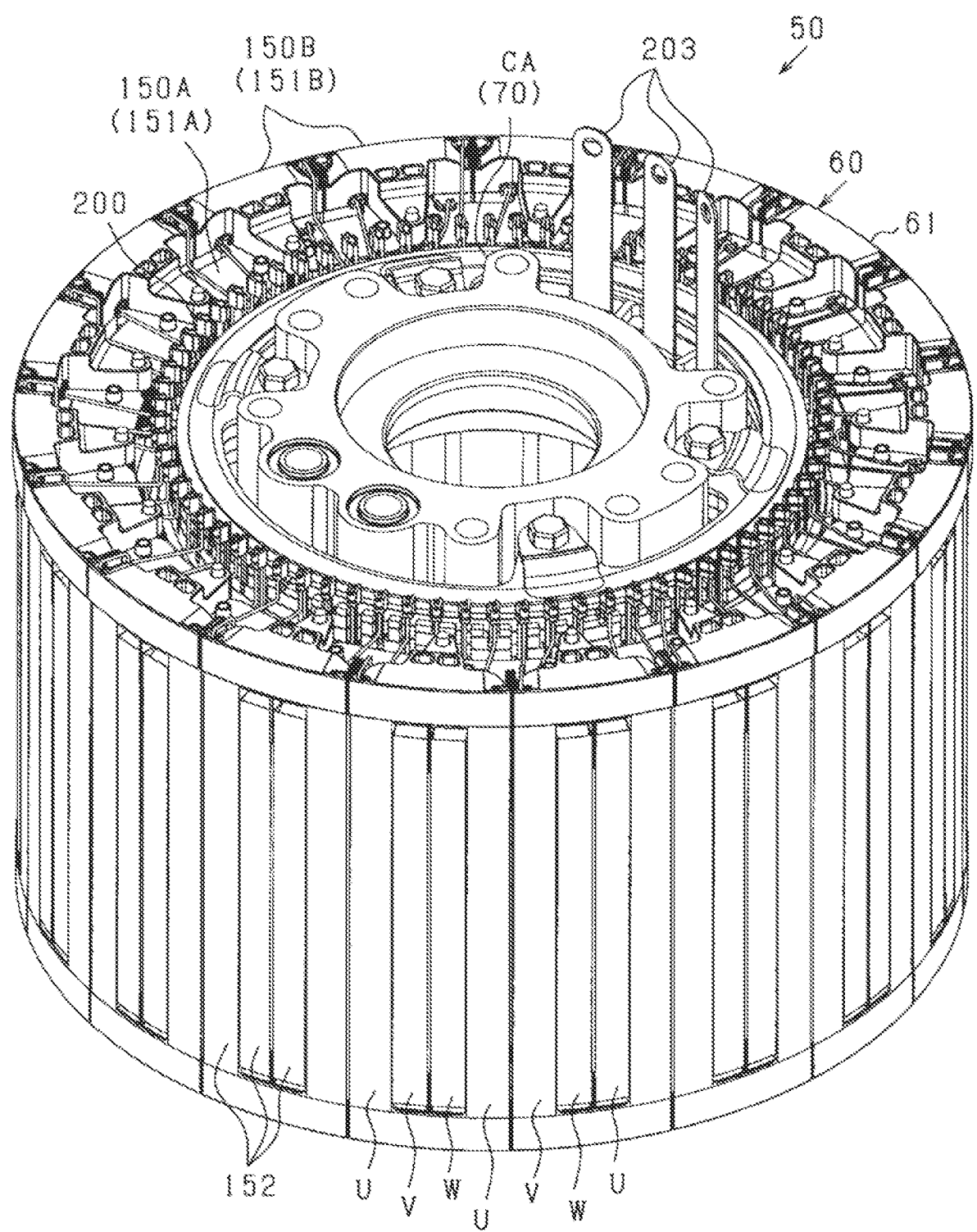
FIG. 10 is a perspective view of a stator unit of the rotating electric machine.
Figure 11:
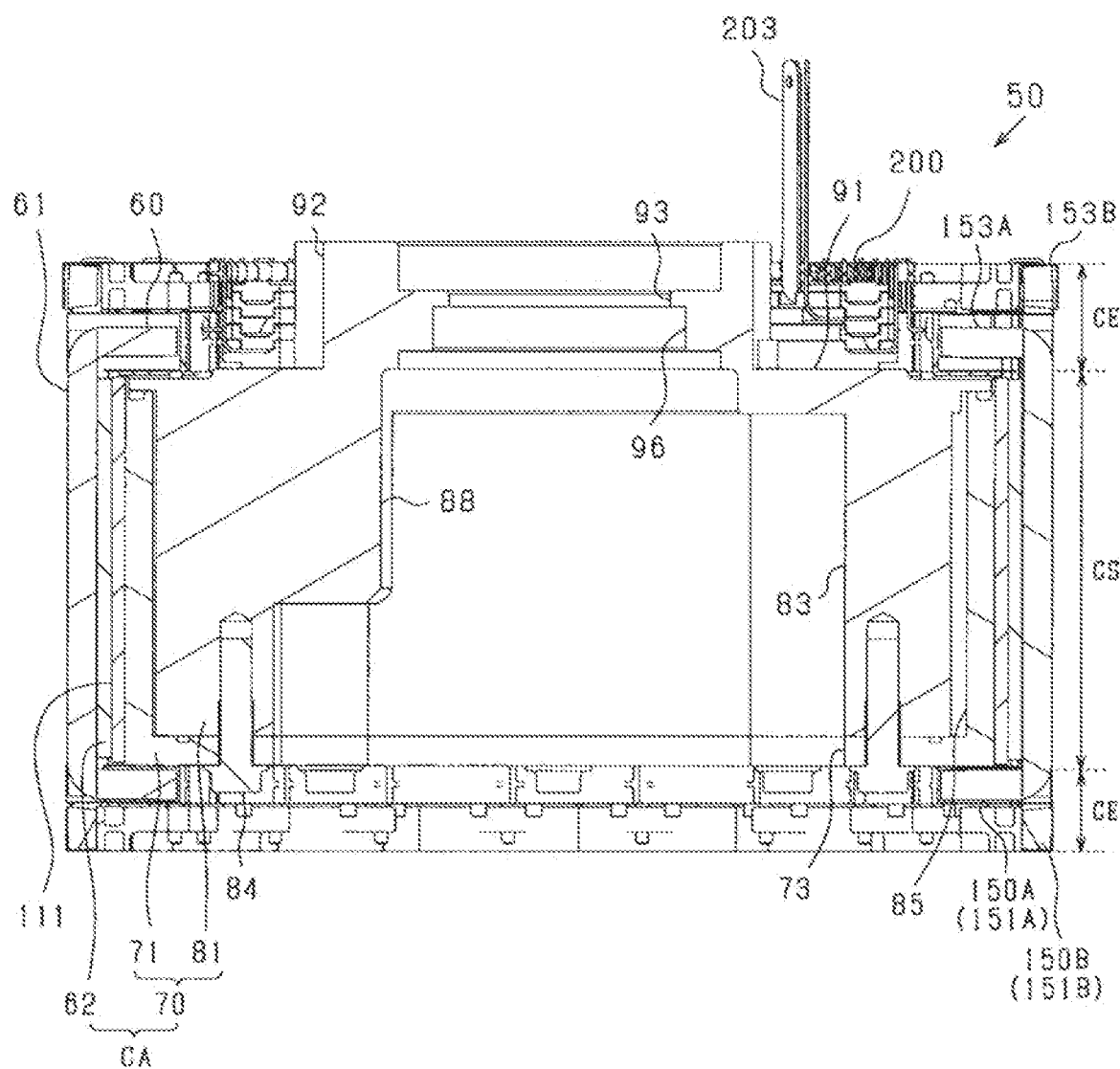
FIG. 11 is a longitudinal cross-sectional view of the stator unit.

Next, the configuration of the stator unit 50 will be described. FIG. 10 is a perspective view of the stator unit 50. FIG. 11 is a longitudinal cross-sectional view of the stator unit 50, which is taken at the same position as FIG. 3.

The stator unit 50 includes the stator 60 and the stator holder 70 arranged radially inside the stator 60. Further, the stator 60 includes the aforementioned stator coil 61 and a stator core 62. Moreover, the stator core 62 and the stator holder 70 are integrated into a core assembly CA. To the core assembly CA, there are assembled a plurality of partial windings 151 which constitute the stator coil 61. In addition, in the present modification, the stator coil 61 corresponds to an "armature coil"; the stator core 62 corresponds to an "armature core"; the stator holder 70 corresponds to an "armature holding member"; and the core assembly CA corresponds to a "support member".

Figure 12:
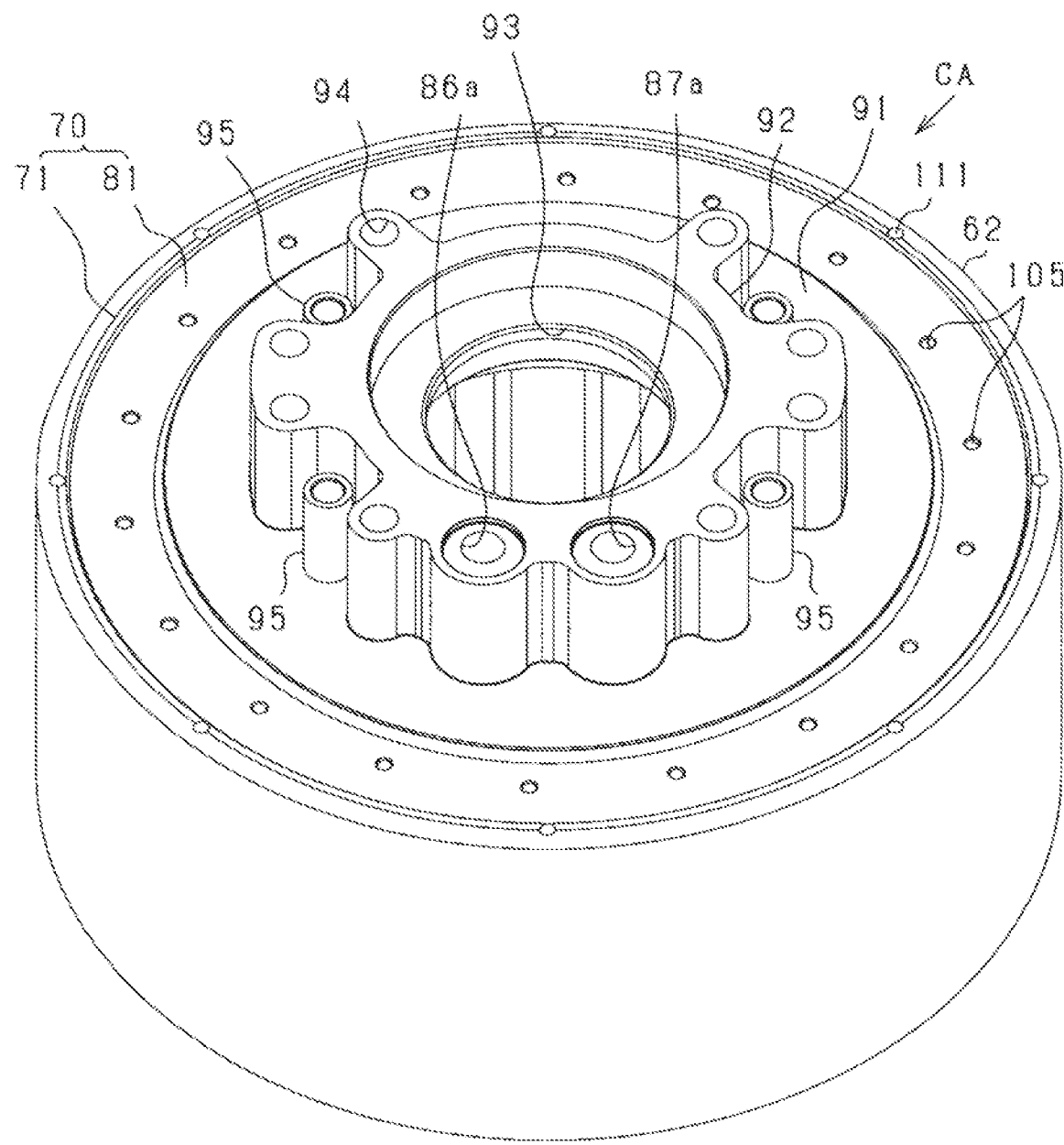
FIG. 12 is a perspective view, from one axial side, of a core assembly of the stator unit.
Figure 13:
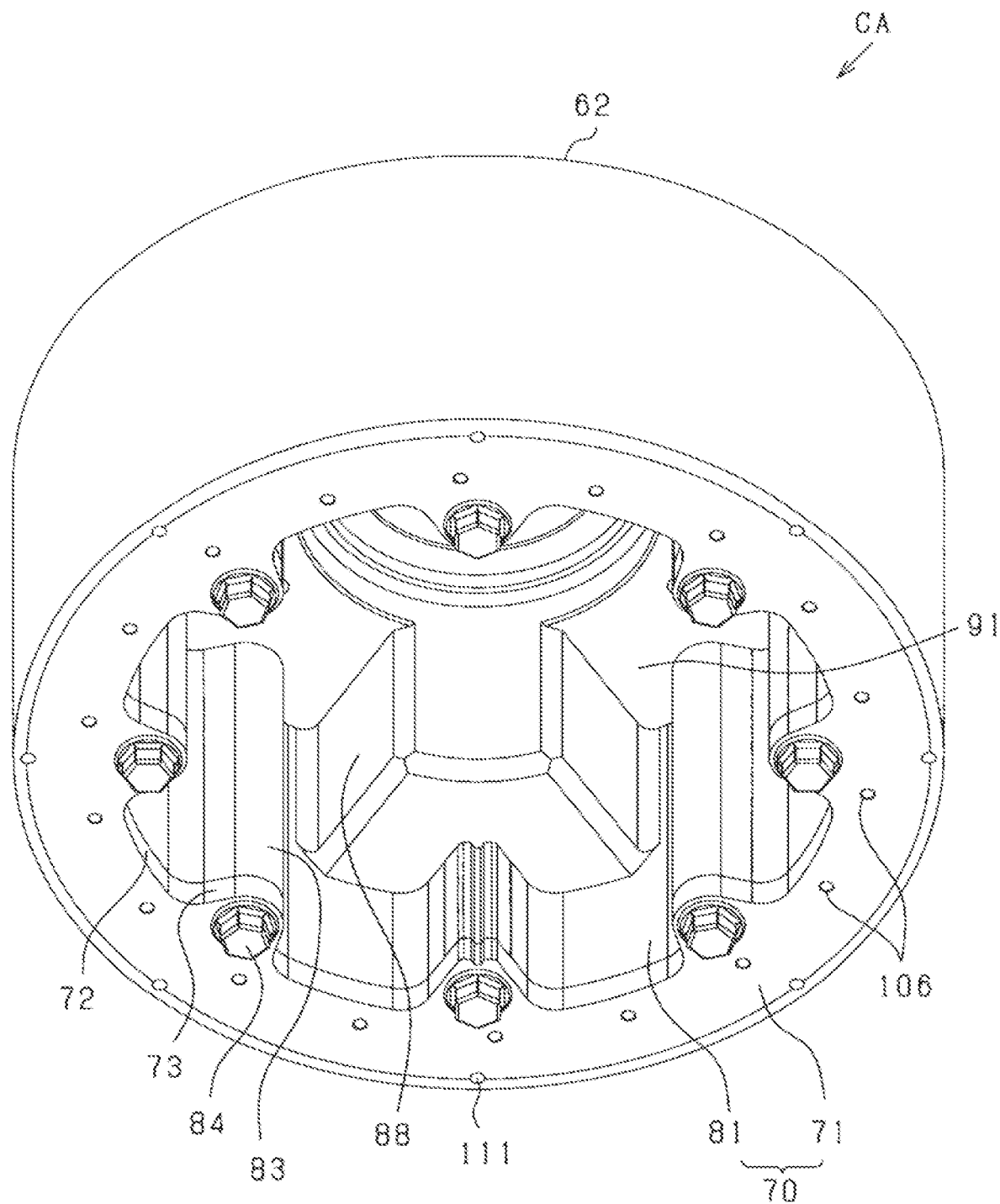
FIG. 13 is a perspective view, from the other axial side, of the core assembly.
Figure 14:
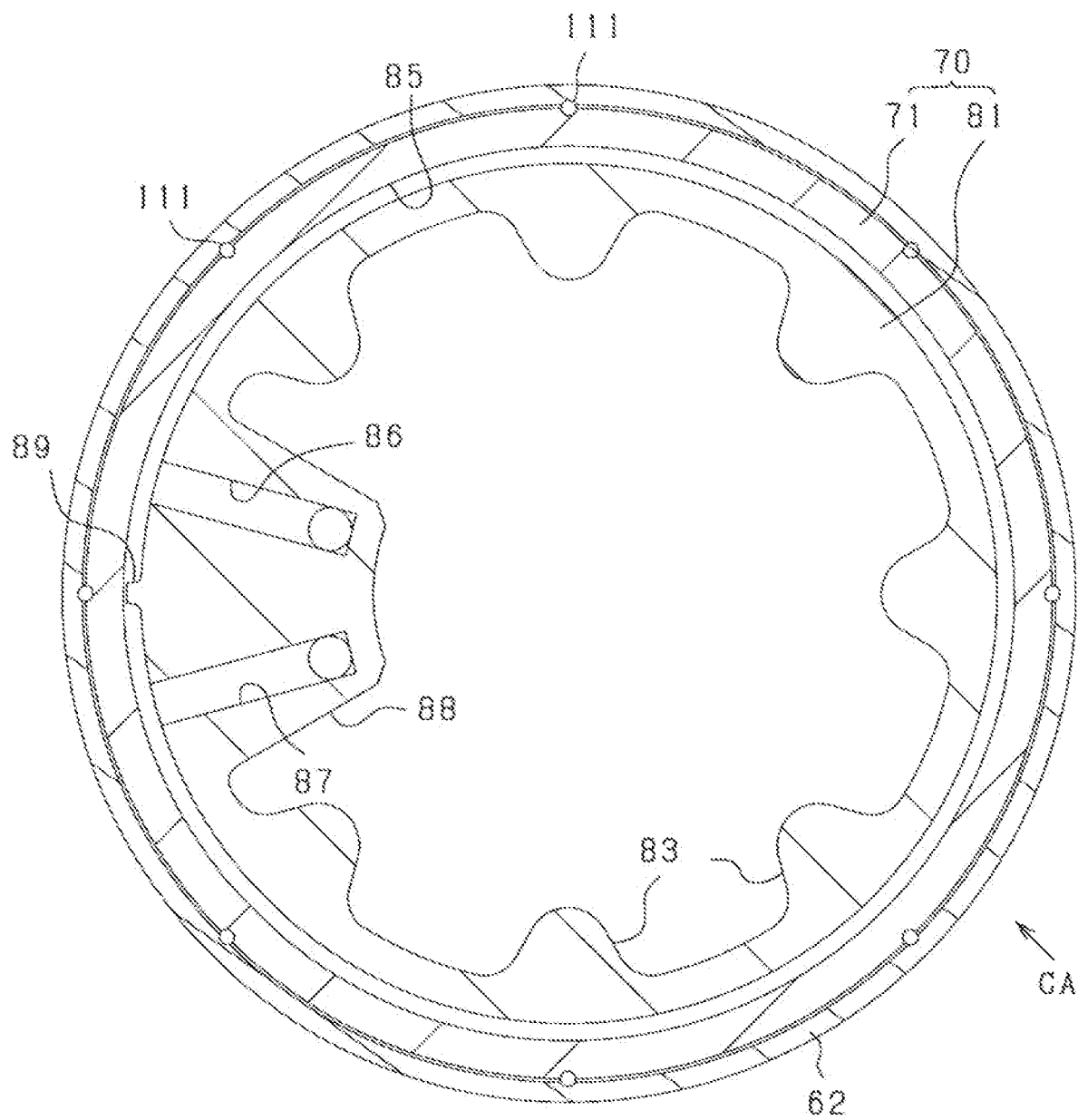
FIG. 14 is a transverse cross-sectional view of the core assembly.
Figure 15:
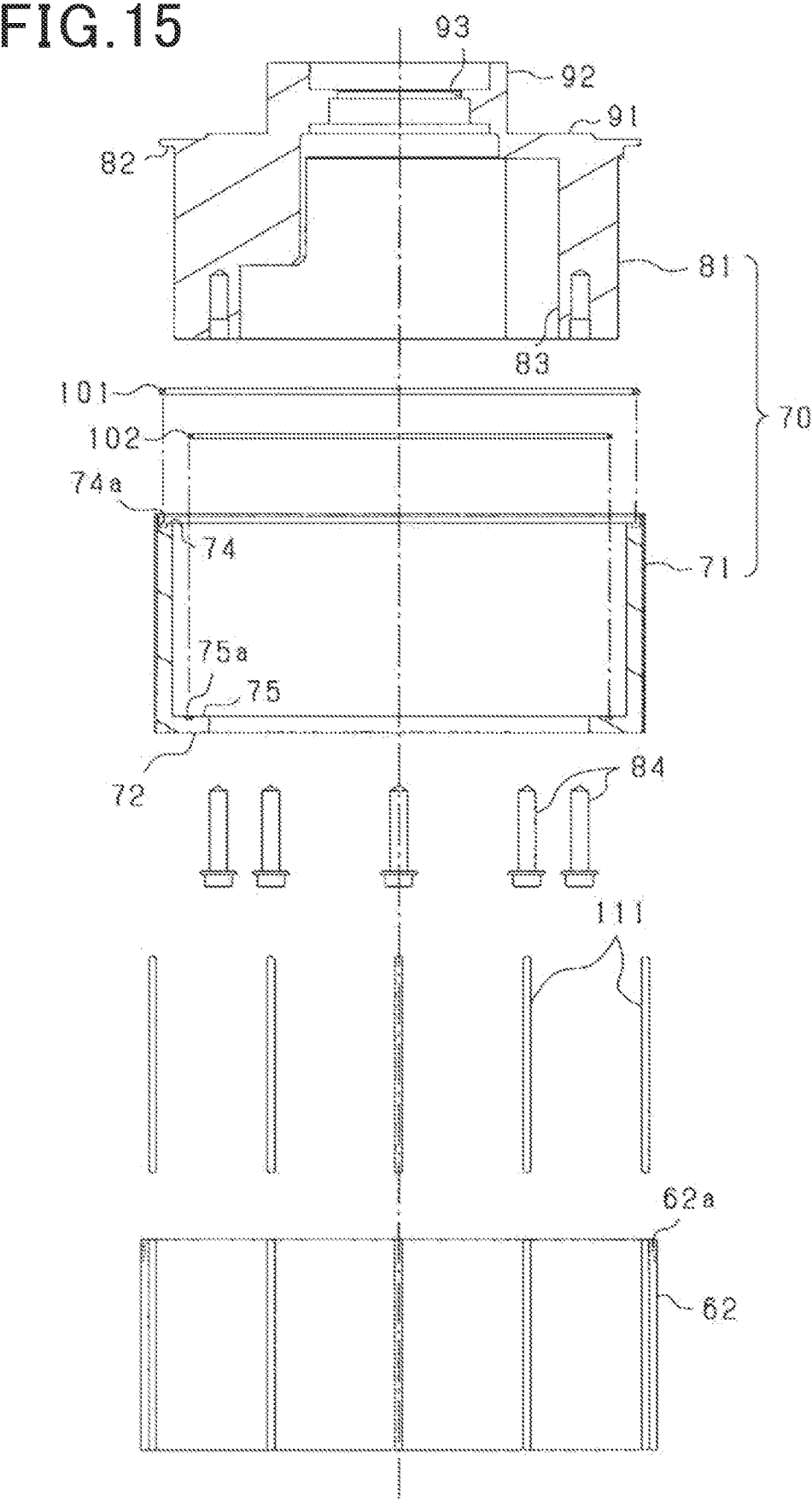
FIG. 15 is an exploded cross-sectional view of the core assembly.

First, the core assembly CA will be described. FIG. 12 is a perspective view, from one axial side, of the core assembly CA. FIG. 13 is a perspective view, from the other axial side, of the core assembly CA. FIG. 14 is a transverse cross-sectional view of the core assembly CA. FIG. 15 is an exploded cross-sectional view of the core assembly CA.

As described above, the core assembly CA is composed of the stator core 62 and the stator holder 70 assembled to the radially inner periphery of the stator core 62. In other words, the stator core 62 is integrally assembled to the outer circumferential surface of the stator holder 70.

The stator core 62 is constituted of a core sheet laminate in which a plurality of core sheets 62a are laminated in the axial direction; the core sheets 62a are formed of a magnetic material such as a magnetic steel sheet. The stator core 62 has a cylindrical shape with a predetermined radial thickness. The stator coil 61 is provided on the radially outer side (i.e., the rotor 20 side) of the stator core 62. The stator core 62 has an outer circumferential surface that is a curved surface without unevenness. The stator core 62 functions as a back yoke. The stator core 62 is obtained by axially laminating the core sheets 62a that are formed, for example by blanking, into an annular shape. In addition, the stator core 62 may alternatively have a helical core structure. In this case, the cylindrical stator core 62 may be obtained by annularly winding a strip of core sheet while laminating the annularly-wound turns of the strip in the axial direction.

In the present embodiment, the stator 60 has a slot-less structure without teeth for forming slots. Moreover, the stator 60 may have any of the following configurations (A)-(C).

(A) In the stator 60, inter-conductor members are provided between the electrical conductor sections (i.e., intermediate conductor portions 152 to be described later) in the circumferential direction. The inter-conductor members are formed of a magnetic material satisfying the following relationship: $Wt \times Bs \leq Wm \times Br$, where Wt is the circumferential width of the inter-conductor members in each magnetic pole, Bs is the saturation flux density of the inter-conductor members, Wm is the circumferential width of the magnets 32 in each magnetic pole and Br is the residual flux density of the magnets 32.

(B) In the stator 60, inter-conductor members are provided between the electrical conductor sections (i.e., the intermediate conductor portions 152) in the circumferential direction. The inter-conductor members are formed of a nonmagnetic material.

(C) In the stator 60, no inter-conductor members are provided between the electrical conductor sections (i.e., the intermediate conductor portions 152) in the circumferential direction.

As shown in FIG. 15, the stator holder 70 includes an outer cylinder member 71 and an inner cylinder member 81, which are assembled together with the outer cylinder member 71 located on the radially outer side and the inner cylinder member 81 located on the radially inner side. Each of these members 71 and 81 may be formed of a metal, such as aluminum or cast iron, or Carbon Fiber-Reinforced Plastic (CFRP).

The outer cylinder member 71 is a hollow cylindrical member having both an outer circumferential surface and an inner circumferential surface formed as perfect cylindrical surfaces. At one axial end of the outer cylinder member 71, there is formed an annular flange 72 that extends radially inward. Moreover, on the radially inner periphery of the flange 72, there are formed, at predetermined intervals in the circumferential direction, a plurality of protrusions 73 extending radially inward (see FIG. 13). Furthermore, at one axial end and the other axial end of the outer cylinder member 71, there are respectively formed facing surfaces 74 and 75 each of which faces the inner cylinder member 81 in the axial direction. Further, in the facing surfaces 74 and 75, there are respectively formed annular grooves 74a and 75a each of which extends in an annular shape.

The inner cylinder member 81 is a hollow cylindrical member having an outer diameter smaller than the inner diameter of the outer cylinder member 71. The inner cylinder member 81 has an outer circumferential surface formed as a perfect cylindrical surface concentric with the outer cylinder member 71. At one axial end of the inner cylinder member 81, there is formed an annular flange 82 that extends radially outward. The inner cylinder member 81 is assembled to the outer cylinder member 71 so as to abut both the facing surfaces 74 and 75 of the outer cylinder member 71 in the axial direction. As shown in FIG. 13, the outer cylinder member 71 and the inner cylinder member 81 are assembled to each other by fasteners 84 such as bolts. Specifically, on the radially inner periphery of the inner cylinder member 81, there are formed, at predetermined intervals in the circumferential direction, a plurality of protrusions 83 extending radially inward. The protrusions 73 of the outer cylinder member 71 and the protrusions 83 of the inner cylinder member 81 are fastened together by the fasteners 84 with the protrusions 73 superposed respectively on axial end faces of the protrusions 83.

As shown in FIG. 14, after the outer cylinder member 71 and the inner cylinder member 81 are assembled to each other, there is an annular gap formed between the inner circumferential surface of the outer cylinder member 71 and the outer circumferential surface of the inner cylinder member 81. The annular gap constitutes a coolant passage 85 through which coolant such as cooling water flows. The coolant passage 85 is formed in an annular shape along the circumferential direction of the stator holder 70. More specifically, on the radially inner periphery of the inner cylinder member 81, there is formed a passage forming portion 88 that protrudes radially inward. In the passage forming portion 88, there are formed both an inlet-side passage 86 and an outlet-side passage 87. Each of these passages 86 and 87 opens on the outer circumferential surface of the inner cylinder member 81. Moreover, on the outer circumferential surface of the inner cylinder member 81, there is formed a partition portion 89 that partitions the coolant passage 85 into an inlet-side part and an outlet-side part. Consequently, the coolant flowing in from the inlet-side passage 86 flows through the coolant passage 85 in the circumferential direction, and then flows out from the outlet-side passage 87.

Each of the inlet-side passage 86 and the outlet-side passage 87 has one end portion extending radially to open on the outer circumferential surface of the inner cylinder member 81 and the other end portion extending axially to open on an axial end face of the inner cylinder member 81. In FIG. 12, there are shown both an inlet opening 86a leading to the inlet-side passage 86 and an outlet opening 87a leading to the outlet-side passage 87. In addition, the inlet-side passage 86 and the outlet-side passage 87 communicate respectively with an inlet port 244 and an outlet port 245 (see FIG. 1) both of which are mounted to the housing cover 242; the coolant flows in and flows out through these ports 244 and 245.

At the joint portions between the outer cylinder member 71 and the inner cylinder member 81, there are respectively provided sealing members 101 and 102 (see FIG. 15) to suppress leakage of the coolant from the coolant passage 85. Specifically, the sealing members 101 and 102 may be implemented by, for example, O-rings. The sealing members 101 and 102 are received respectively in the annular grooves 74a and 75a of the outer cylinder member 71 and kept in a state of being compressed between the outer cylinder member 71 and the inner cylinder member 81.

As shown in FIG. 12, the inner cylinder member 81 has an end plate portion 91 at one axial end thereof. On the end plate portion 91, there is formed a hollow cylindrical boss portion 92 that extends in the axial direction. The boss portion 92 is formed so as to surround an insertion hole 93 through which the rotating shaft 11 is inserted inside the inner cylinder member 81. In the boss portion 92, there are formed a plurality of fastening portions 94 for fixing the housing cover 242. Moreover, on the end plate portion 91, there are formed, on the radially outer side of the boss portion 92, a plurality of pillar portions 95 that extend in the axial direction. As will be described in detail later, the pillar portions 95 serve as fixing portions for fixing the busbar module 200. Furthermore, the boss portion 92 serves as a bearing holding member for holding the bearing 12. Specifically, the bearing 12 is fixed to a bearing fixing portion 96 formed on the radially inner periphery of the boss portion 92 (see FIG. 3).

As shown in FIGS. 12 and 13, in the outer cylinder member 71 and the inner cylinder member 81, there are formed recesses 105 and 106 for fixing a plurality of coil modules 150 which will be described later.

Specifically, as shown in FIG. 12, on an axial end face of the inner cylinder member 81, more specifically, on an axially-outer end face of the end plate portion 91 around the boss portion 92, there are formed a plurality of recesses 105 at equal intervals in the circumferential direction. Moreover, as shown in FIG. 13, on an axial end face of the outer cylinder member 71, more specifically, on an axially-outer end face of the flange 72, there are formed a plurality of recesses 106 at equal intervals in the circumferential direction. Furthermore, the recesses 105 are formed so as to be aligned on an imaginary circle concentric with the core assembly CA; and the recesses 106 are also formed so as to be aligned on an imaginary circle concentric with the core assembly CA. In addition, the recesses 105 are formed at the same circumferential positions as the recesses 106; the intervals between the recesses 105 are equal to the intervals between the recesses 106; and the number of the recesses 105 is equal to the number of the recesses 106.

In order to secure the assembly strength, the stator core 62 is assembled to the stator holder 70 with a radial compressive force induced with respect to the stator holder 70. Specifically, the stator core 62 is fixedly fitted, by shrink fitting or press fitting, to the stator holder 70 with a predetermined interference therebetween. In other words, the stator core 62 and the stator holder 70 are assembled together with a radial stress induced by one of them to the other. Moreover, the torque of the rotating electric machine 10 may be increased by, for example, increasing the outer diameter of the stator 60. In this case, the tightening force of the stator core 62 is increased to strengthen the joining of the stator core 62 to the stator holder 70. However, with increase in the compressive stress (in other words, the residual stress) of the stator core 62, the stator core 62 may become damaged.

In view of the above, in the present embodiment, in the configuration where the stator core 62 and the stator holder 70 are fixedly fitted to each other with the predetermined interference therebetween, there are provided restricting members between portions of the stator core 62 and the stator holder 70 radially facing each other. The restricting members engage with the stator core 62 in the circumferential direction, thereby restricting circumferential displacement of the stator core 62. Specifically, as shown in FIGS. 12-14, a plurality of engaging members 111, which constitute the restricting members, are radially interposed between the stator core 62 and the outer cylinder member 71 of the stator holder 70 and arranged at predetermined intervals in the circumferential direction. Consequently, with the engaging members 111, it becomes possible to suppress relative displacement between the stator core 62 and the stator holder 70 in the circumferential direction. In addition, in this case, recesses may be formed in at least one of the stator core 62 and the outer cylinder member 71; and the engaging members 111 may be respectively fitted the recesses to engage with them. Alternatively, instead of the engaging members 111, protrusions may be formed on either of the stator core 62 and the outer cylinder member 71.

In the above configuration, the stator core 62 and the stator holder 70 (more specifically, the outer cylinder member 71) are fixedly fitted to each other with the predetermined interference therebetween; and relative circumferential displacement between the stator core 62 and the stator holder 70 is restricted by the engaging members 111. Consequently, even if the interference between the stator core 62 and the stator holder 70 is relatively small, it will still be possible to suppress circumferential displacement of the stator core 62 relative to the stator holder 70. Moreover, since the desired displacement-suppressing effect can be achieved even if the interference is relatively small, it becomes possible to prevent the stator core 62 from being damaged due to an excessively large interference between the stator core 62 and the stator holder 70. As a result, it becomes possible to suitably suppress displacement of the stator core 62.

On the radially inner side of the inner cylinder member 81, there is formed an annular internal space so as to surround the rotating shaft 11. In the internal space, there may be arranged, for example, electrical components constituting an inverter that is an electric power converter. The electrical components may be, for example, electrical modules each of which is formed by packaging a semiconductor switching element or a capacitor. By arranging the electrical modules in contact with the inner circumferential surface of the inner cylinder member 81, it becomes possible to cool the electrical modules with the coolant flowing through the coolant passage 85. It should be noted that the internal space formed on the radially inner side of the inner cylinder member 81 may be expanded by eliminating the protrusions 83 or reducing the protruding height of the protrusions 83.

Next, the configuration of the stator coil 61 will be described in detail. FIGS. 10 and 11 show the stator coil 61 in a state of having been assembled to the core assembly CA. As shown in FIGS. 10 and 11, the partial windings 151 constituting the stator coil 61 are assembled to the radially outer periphery of the core assembly CA (i.e., the radially outer periphery of the stator core 62) so as to be aligned with each other in the circumferential direction.

The stator coil 61 includes a plurality of phase windings and is formed into a hollow cylindrical (or an annular) shape by arranging the phase windings in a predetermined sequence in the circumferential direction. In the present embodiment, the stator coil 61 is configured as a three-phase coil which includes U-phase, V-phase and W-phase windings.

As shown in FIG. 11, the stator 60 has, in the axial direction, a part thereof corresponding to a coil side CS that radially faces the magnet unit 22 of the rotor 20, and parts thereof corresponding respectively to coil ends CE that are located respectively on opposite axial sides of the coil side CS. In addition, the stator core 62 is provided in the axial range corresponding to the coil side CS.

Each of the phase windings of the stator coil 61 is constituted of a plurality of partial windings 151 (see FIG. 16); the partial windings 151 are individually provided as coil modules 150. That is, each of the coil modules 150 has one of the partial windings 151 of the phase windings provided integrally therein. The number of the coil modules 150 constituting the stator coil 61 is set according to the number of the magnetic poles of the rotor 20. In the coil side CS of the stator coil 61, the electrical conductor sections of the plurality of phases are arranged in a predetermined sequence and in alignment with each other in the circumferential direction by arranging the coil modules 150 (i.e., the partial windings 151) of the plurality of phases in the predetermined sequence and in alignment with each other in the circumferential direction. In FIG. 10, there is shown the arrangement sequence of the electrical conductor sections of the U, V and W phases in the coil side CS of the stator coil 61. In addition, in the present embodiment, the number of the magnetic poles is set to 24; however, the number of the magnetic poles may be arbitrarily set.

Figure 16:
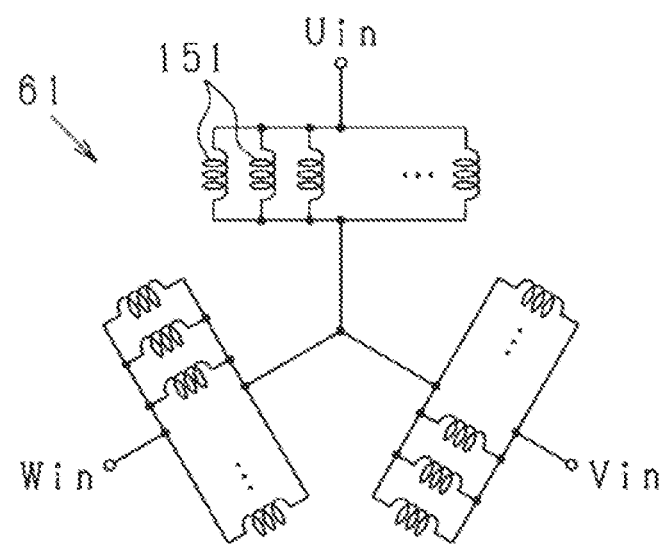
FIG. 16 is an electric circuit diagram illustrating the electrical connection between partial windings in each of three phase windings of a stator coil.

In the stator coil 61, each of the phase windings is formed by connecting the partial windings 151 of the phase winding, which are included in the respective coil modules 150, in parallel or in series with each other. FIG. 16 is an electric circuit diagram illustrating the electrical connection between the partial windings 151 in each of the three phase windings of the stator coil 61. In FIG. 16, each of the phase windings has the partial windings 151 thereof connected in parallel with each other.

As shown in FIG. 11, the coil modules 150 are assembled to the radially outer periphery of the stator core 62. As described above, the stator coil 61 has the coil side CS radially facing the magnet unit 22 of the rotor 20 and the coil ends CE located respectively on opposite axial sides of the coil side CS. The coil modules 150 are assembled to the stator core 62 so that opposite axial end portions of each of the coil modules 150 protrude axially outward respectively from opposite axial end faces of the stator core 62 (i.e., protrude respectively to opposite axial sides of the stator core 62 where the coil ends CE are respectively located).

In the present embodiment, the coil modules 150 include two types of coil modules having different shapes. The first-type coil modules 150 have the partial windings 151 thereof bent radially inward (i.e., to the stator core 62 side) at the coil ends CE. In contrast, the second-type coil modules 150 have the partial windings 151 thereof extending straight in the axial direction without being bent radially inward at the coil ends CE. In the following explanation, for the sake of convenience, those partial windings 151 which are bent at the coil ends CE will be referred to as the "first partial windings 151A"; and those coil modules 150 which respectively include the first partial windings 151A will be referred to as the "first coil modules 150A". On the other hand, those partial windings 151 which are not bent at the coil ends CE will be referred to as the "second partial windings 151B"; and those coil modules 150 which respectively include the second partial windings 151B will be referred to as the "second coil modules 150B".

Figure 17:
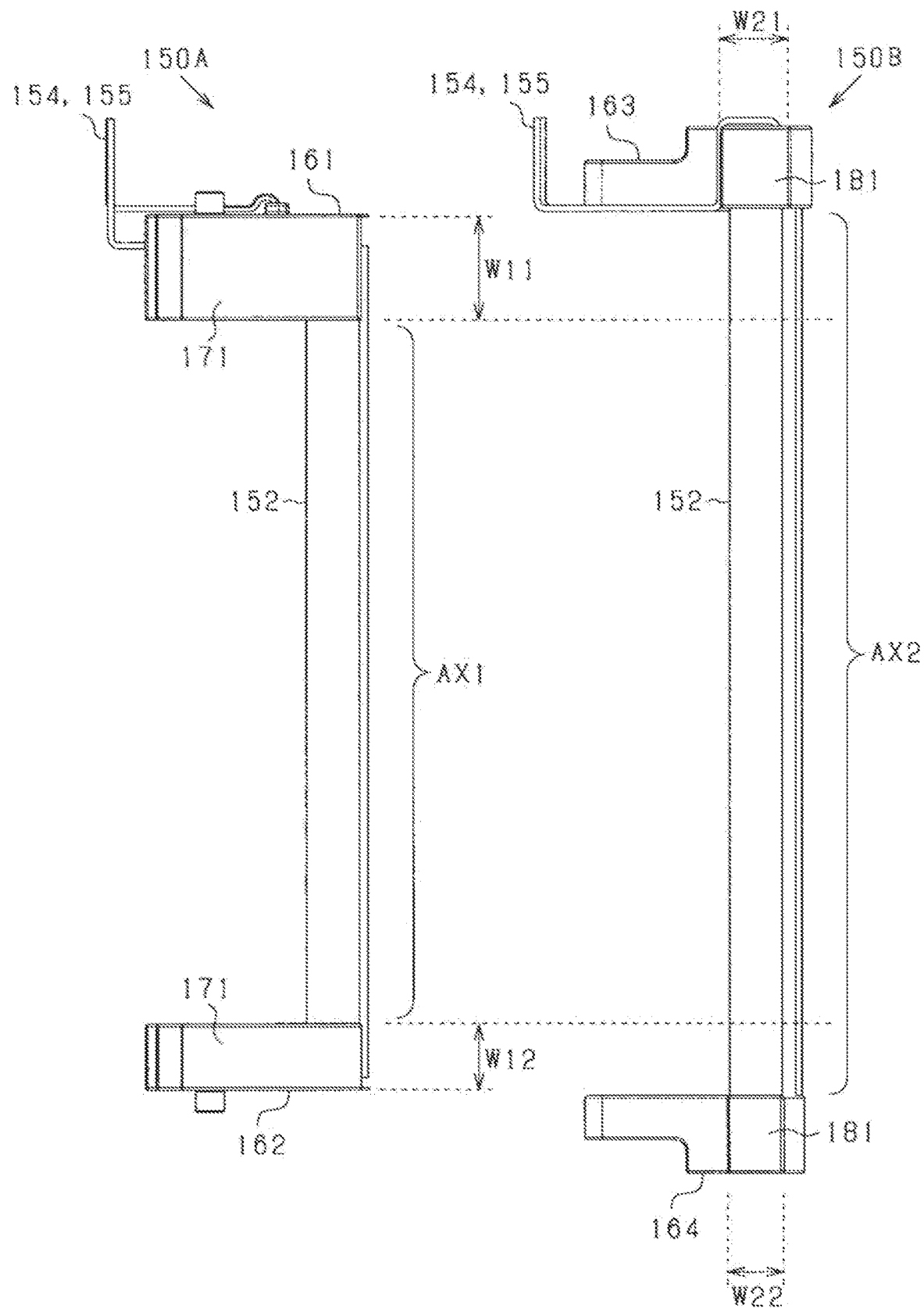
FIG. 17 is a side view comparatively showing a first coil module and a second coil module side by side.
Figure 18:
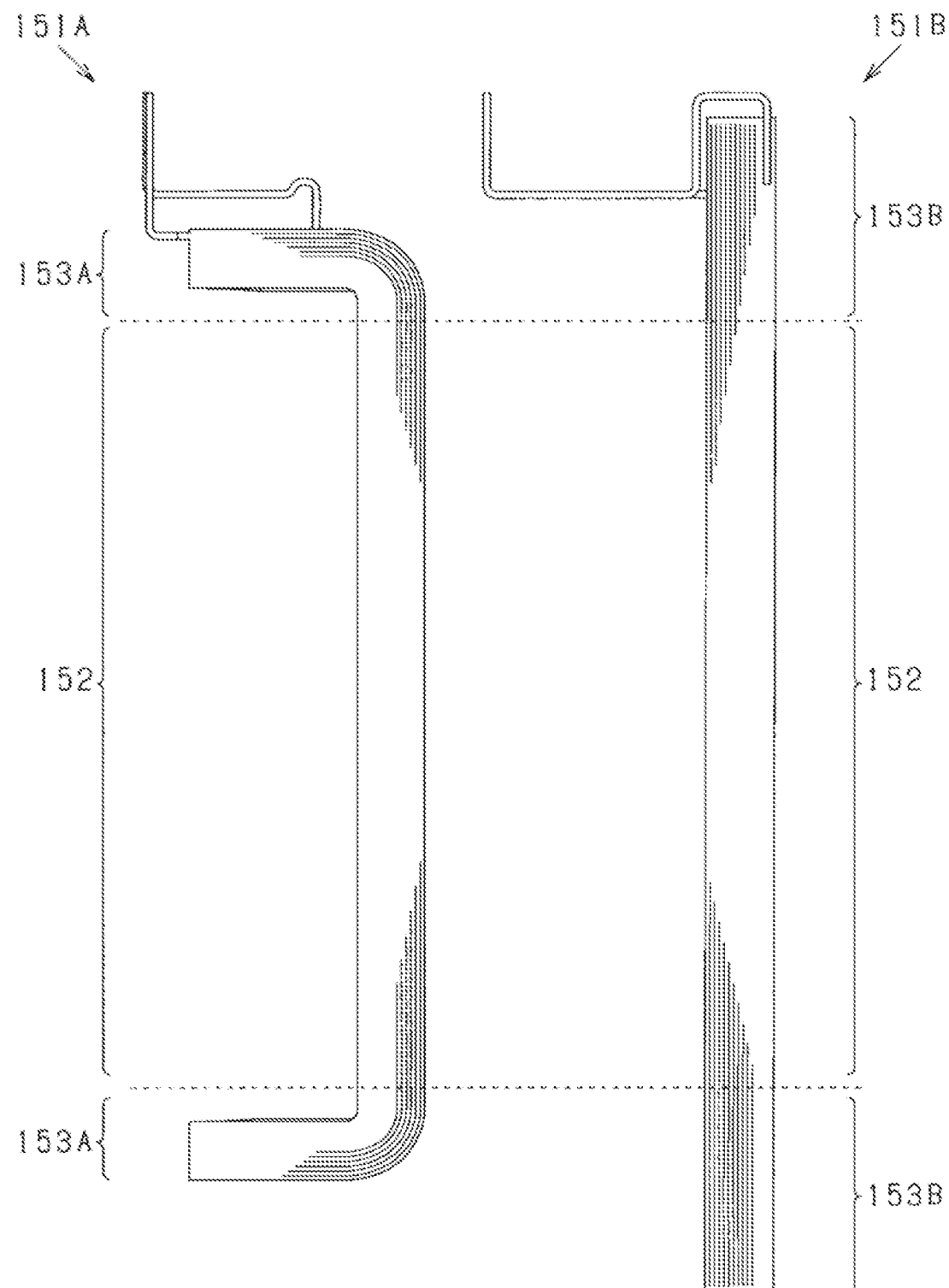
FIG. 18 is a side view comparatively showing a first partial winding and a second partial winding side by side.

FIG. 17 is a side view comparatively showing one of the first coil modules 150A and one of the second coil modules 150B side by side. FIG. 18 is a side view comparatively showing one of the first partial windings 151A and one of the second partial windings 151B side by side. As shown in FIG. 17, the axial length of the first coil modules 150A is different from the axial length of the second coil modules 150B; and axial end portions of the first coil modules 150A are different in shape from axial end portions of the second coil modules 150B. Accordingly, as shown in FIG. 18, the axial length of the first partial windings 151A is different from the axial length of the second partial windings 151B; and axial end portions of the first partial windings 151A are different in shape from axial end portions of the second partial windings 151B. Specifically, each of the first partial windings 151A has a substantially C-shape in a side view, whereas each of the second partial windings 151B has a substantially I-shape in a side view. Moreover, each of the first partial windings 151A has a pair of insulating covers 161 and 162 as "first insulating covers" mounted respectively on opposite axial end portions thereof, whereas each of the second partial windings 151B has a pair of insulating covers 163 and 164 as "second insulating covers" mounted respectively on opposite axial end portions thereof.

Next, the configurations of the first and second coil modules 150A and 150B will be described in detail.

Figure 19A:
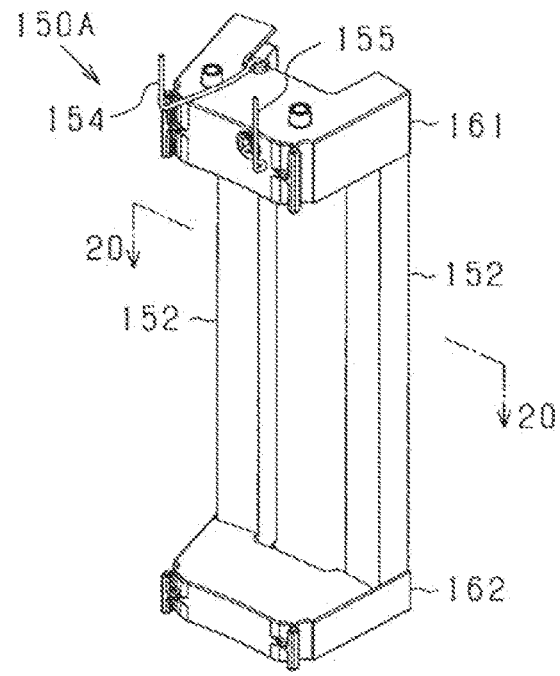
FIGS. 19(a) and 19(b) are perspective views illustrating the configuration of the first coil module.
Figure 19B:
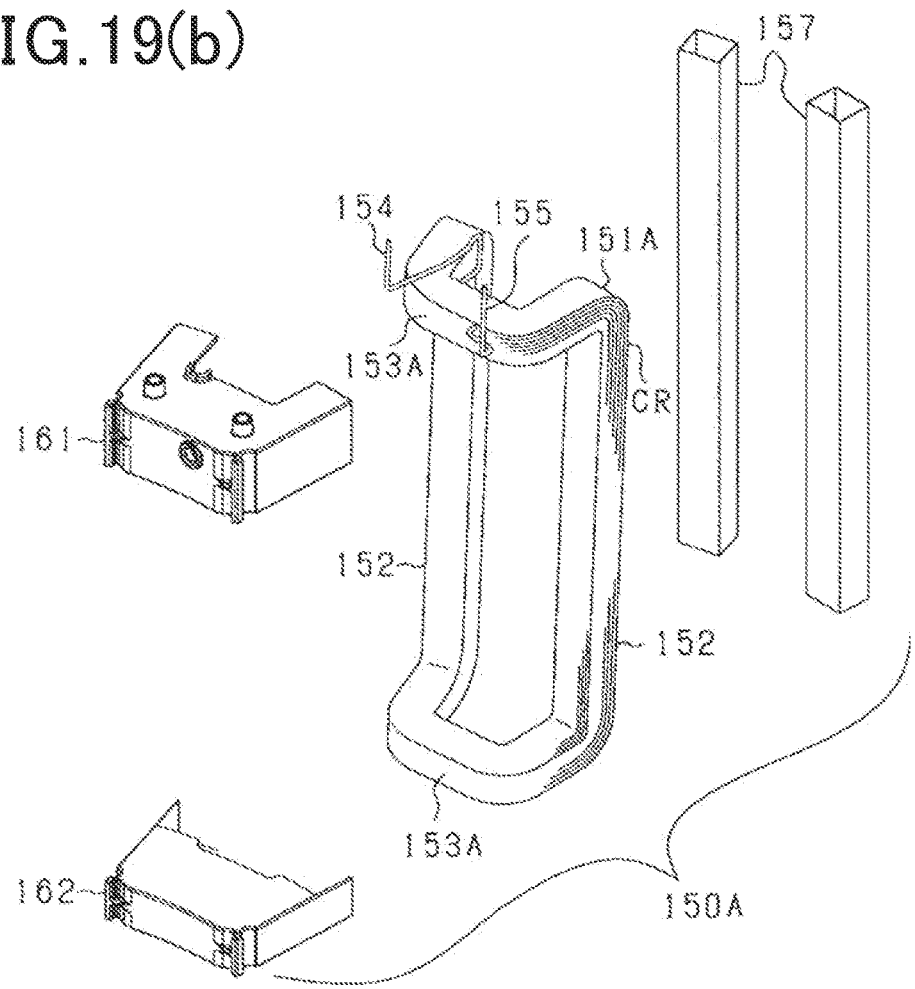
Figure 20:
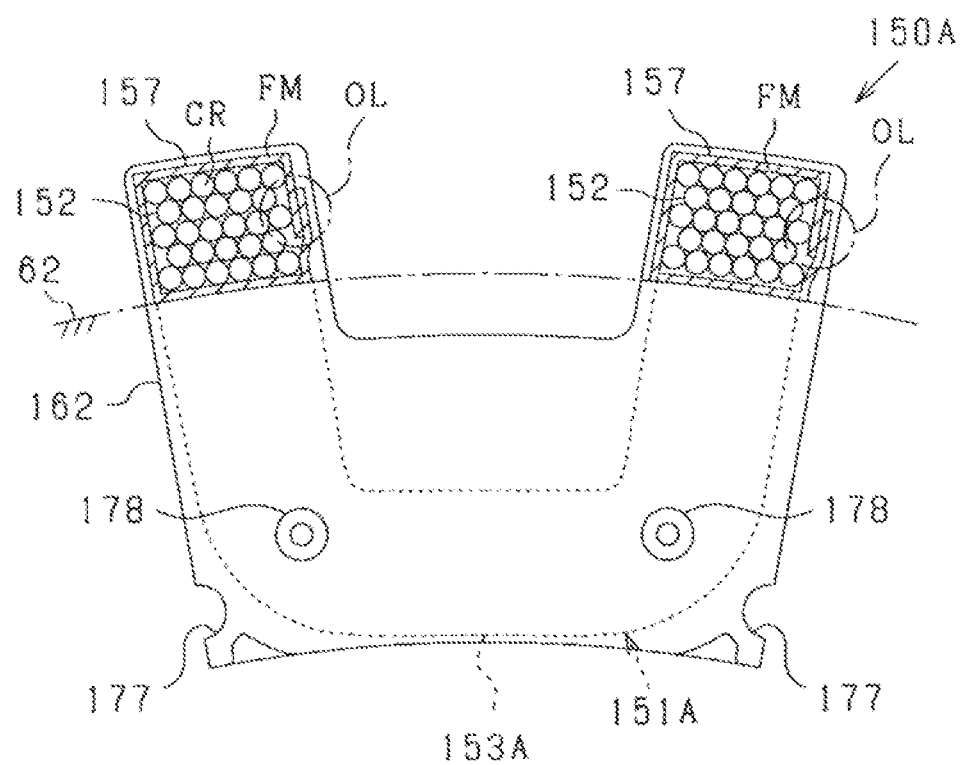
FIG. 20 is a cross-sectional view taken along the line 20-20 in FIG. 19(a).

First, the configuration of each of the first coil modules 150A will be described. FIG. 19(*a*) is a perspective view illustrating the configuration of each of the first coil modules 150A. FIG. 19(*b*) is a perspective view showing the components of each of the first coil modules 150A in an exploded manner. FIG. 20 is a cross-sectional view taken along the line 20-20 in FIG. 19(*a*).

As shown in FIGS. 19(*a*) and 19(*b*), each of the first coil modules 150A has the first partial winding 151A formed by winding an electrical conductor wire CR multiply and the insulating covers 161 and 162 mounted respectively on opposite axial end portions of the first partial winding 151A. The insulating covers 161 and 162 are formed of an electrically-insulative material such as a synthetic resin.

The first partial winding 151A has a pair of intermediate conductor portions 152 extending straight and parallel to each other, and a pair of bridging portions 153A connecting the pair of intermediate conductor portions 152 respectively on opposite axial sides of the pair of intermediate conductor portions 152. The first partial winding 151A is formed into a ring shape by the pair of intermediate conductor portions 152 and the pair of bridging portions 153A. The pair of intermediate conductor portions 152 are formed apart from each other by a predetermined multiple of one coil-pitch, so as to allow the intermediate conductor portions 152 of the partial windings 151 of the other phases to be arranged therebetween in the circumferential direction. More particularly, in the present embodiment, the pair of intermediate conductor portions 152 are formed apart from each other by two coil-pitches and have one intermediate conductor portion 152 of one partial winding 151 of each of the other two phases arranged therebetween in the circumferential direction.

The pair of bridging portions 153A are formed in the same shape respectively on opposite axial sides of the pair of intermediate conductor portions 152. Each of the bridging portions 153A constitutes a portion of a corresponding one of the coil ends CE (see FIG. 11). Moreover, each of the bridging portions 153A is bent in a direction perpendicular to the pair of intermediate conductor portions 152, i.e., in a direction perpendicular to the axial direction.

As shown in FIG. 18, each of the first partial windings 151A has the pair of bridging portions 153A, whereas each of the second partial windings 151B has a pair of bridging portions 153B. The bridging portions 153A of the first partial windings 151A are different in shape from the bridging portions 153B of the second partial windings 151B. For the sake of definitely distinguishing them from each other, hereinafter, the bridging portions 153A of the first partial windings 151A will also be referred to as the "first bridging portions 153A" and the bridging portions 153B of the second partial windings 151B will also be referred to as the "second bridging portions 153B".

Each of the intermediate conductor portions 152 of the partial windings 151A and 151B is provided as one of coil side conductor portions that are arranged one by one in the circumferential direction at the coil side CS. On the other hand, each of the bridging portions 153A and 153B of the partial windings 151A and 151B is provided as a coil end conductor portion that connects, at a corresponding one of the coil ends CE, a pair of the intermediate conductor portions 152 of the same phase located respectively at two different circumferential positions.

As shown in FIG. 20, each of the first partial windings 151A is formed, by winding the electrical conductor wire CR multiply, so as to have a quadrangular transverse cross section. FIG. 20 shows a transverse cross section of one of the first coil modules 150A at the intermediate conductor portions 152 of the first partial winding 151A. As seen from FIG. 20, in the intermediate conductor portions 152 of the first partial winding 151A, the electrical conductor wire CR is wound multiply so that parts of the electrical conductor wire CR extend parallel to each other and are aligned with one another circumferentially and radially. That is, each of the first partial windings 151A is formed to have a substantially rectangular transverse cross section with parts of the electrical conductor wire CR both circumferentially aligned in a plurality of rows and radially-aligned in a plurality of rows in the intermediate conductor portions 152. On the other hand, in distal end parts of the first bridging portions 153A, due to the radial bending of the first partial winding 151A, the electrical conductor wire CR is wound multiply so that parts of the electrical conductor wire CR extend parallel to each other and are aligned with one another axially and radially. In addition, in the present embodiment, the electrical conductor wire CR is multiply wound in a concentric-winding manner. However, the electrical conductor wire CR may alternatively be multiply wound in other winding manners, such as in an alpha winding manner.

In each of the first partial windings 151A, both end portions of the electrical conductor wire CR are led out from only one of the two first bridging portions 153A (i.e., from the upper first bridging portion 153A in FIG. 91(b)); the end portions respectively constitute winding end portions 154 and 155 of the first partial winding 151A. Moreover, the winding end portions 154 and 155 respectively represent the winding start end and the winding finish end of the electrical conductor wire CR. In addition, one of the winding end portions 154 and 155 is connected to an electric current input/output terminal, whereas the other of the winding end portions 154 and 155 is connected to a neutral point.

Moreover, in each of the first partial windings 151A, each of the intermediate conductor portions 152 is covered with a sheet-like insulating coat 157. In addition, in FIG. 19(a), there is shown one of the first coil modules 150A in a state where the intermediate conductor portions 152 are covered with and thus present inside the corresponding insulating coats 157; however, for the sake of convenience, the intermediate conductor portions 152 covered with the corresponding insulating coats 157 are still designated by the reference numeral 152 (the same applies to FIG. 22(a) as well).

Each of the insulating coats 157 is formed by wrapping a film member FM around the corresponding intermediate conductor portion 152. The film member FM has an axial length not smaller than the axial length of an insulation covering range of the corresponding intermediate conductor portion 152. The film member FM may be implemented by, for example, a PEN (polyethylene naphthalate) film. More specifically, the film member FM includes a film substrate and a foamable adhesive layer provided on one of two major surfaces of the film substrate. The film member FM is wrapped around the corresponding intermediate conductor portion 152 in such a manner as to be bonded by the adhesive layer to the corresponding intermediate conductor portion 152. In addition, the adhesive layer may alternatively be implemented by a non-formable adhesive.

As shown in FIG. 20, each of the intermediate conductor portions 152 has a substantially rectangular transverse cross section with parts of the electrical conductor wire CR aligned with one another circumferentially and radially. Moreover, each of the intermediate conductor portions 152 has the film member FM wrapped therearound so as to have end portions of the film member FM overlapping each other in the circumferential direction. The film member FM is a rectangular sheet whose longitudinal dimension is longer than the axial length of the intermediate conductor portion 152 and whose lateral dimension is longer than the length of one circumference of the intermediate conductor portion 152. The film member FM is wrapped, in a state of being folded according to the cross-sectional shape of the intermediate conductor portion 152, around the intermediate conductor portion 152. After the film member FM is wrapped around the intermediate conductor portion 152, the gap between the electrical conductor wire CR of the intermediate conductor portion 152 and the film substrate is filled by the foaming of the adhesive layer. Further, at an overlap part OL where the end portions of the film member FM overlap each other in the circumferential direction, the end portions of the film member FM are bonded together by the adhesive layer.

For each of the intermediate conductor portions 152, the corresponding insulating coat 157 is provided so as to cover all of two circumferential side surfaces and two radial side surfaces of the intermediate conductor portion 152. Moreover, the corresponding insulating coat 157 has the overlap part OL where the end portions of the film member FM overlap each other in the circumferential direction; the overlap part OL is located on a part of the intermediate conductor portion 152 which faces one of the intermediate conductor portions 152 of the partial windings 151 of the other phases, i.e., on one of the two circumferential side surfaces of the intermediate conductor portion 152. In the present embodiment, for the pair of intermediate conductor portions 152 of each of the partial windings 151, the overlap parts OL of the corresponding insulating coats 157 are located on the same side in the circumferential direction.

In each of the first partial windings 151A, the corresponding insulating coats 157 are provided in a range extended from the intermediate conductor portions 152 to parts of the first bridging portions 153A that are located respectively on opposite axial sides of the intermediate conductor portions 152 and covered respectively with the insulating covers 161 and 162 (i.e., to parts of the first partial winding 151A which are located respectively inside the insulating covers 161 and 162). More specifically, referring to FIG. 17, in each of the first coil modules 150A, the first partial winding 151A is covered with neither of the insulating covers 161 and 162 in a range of AX1; and the corresponding insulating coats 157 are provided in a range extended both upward and downward than the range of AX1.

Next, the configurations of the insulating covers 161 and 162 will be described.

In each of the first partial windings 151A, the insulating cover 161 is mounted on that first bridging portion 153A of the first partial winding 151A which is located on one axial side, whereas the insulating cover 162 is mounted on that first bridging portion 153A of the first partial winding 151A which is located on the other axial side. The configuration of the insulating cover 161 is illustrated in FIGS. 21(a) and 21(b), which are perspective views of the insulating cover 161 respectively from two different directions.

Figure 21A:
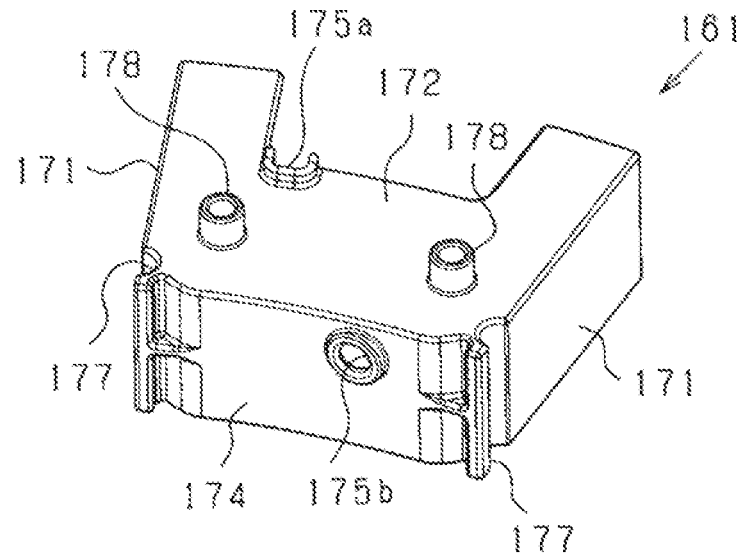
FIGS. 21(a) and 21(b) are perspective views illustrating the configuration of an insulating cover of the first coil module.
Figure 21B:
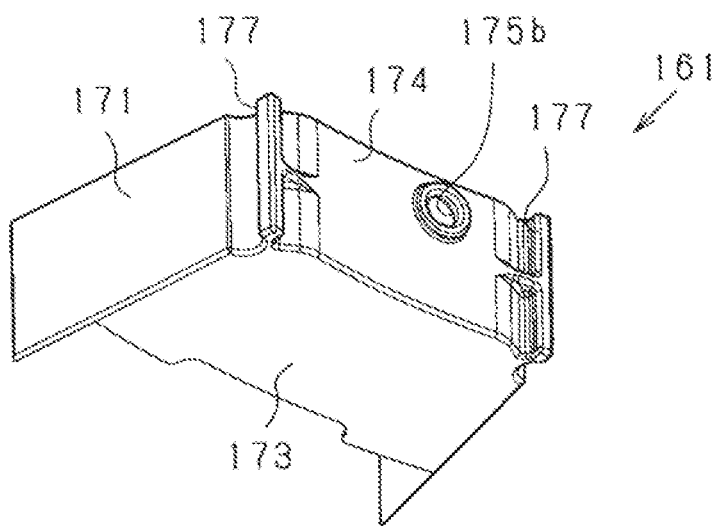

As shown in FIGS. 21(a) and 21(b), the insulating cover 161 has a pair of side walls 171 respectively on opposite sides in the circumferential direction, an outer wall 172 on the axially outer side, an inner wall 173 on the axially inner side, and a front wall 174 on the radially inner side. These walls 171-174 are each plate-shaped, and connected to each other in a three-dimensional shape such that the insulating cover 161 opens only on the radially outer side. Each of the side walls 171 is provided so as to extend, after the assembly of the coil modules 150 to the core assembly CA, toward the axis of the core assembly CA. After all the first coil modules 150A are arranged in alignment with each other in the circumferential direction, for each circumferentially-adjacent pair of the first coil modules 150A, a pair of the side walls 171 of the insulating covers 161 of the pair of the first coil modules 150A circumferentially face each other in a state of being in contact with or in close proximity to each other. Consequently, it becomes possible to suitably arrange all the first coil modules 150A in an annular shape while securing electrical insulation between each circumferentially-adjacent pair of the first coil modules 150A.

In the insulating cover 161, the outer wall 172 has an opening 175a for leading out the winding end portion 154 of the first partial winding 151A; and the front wall 174 has an opening 175b for leading out the winding end portion 155 of the first partial winding 151A. In addition, the winding end portion 154 of the first partial winding 151A is led out from the opening 175a of the outer wall 172 in the axial direction, whereas the winding end portion 155 of the first partial winding 151A is led out from the opening 175b of the front wall 174 in the radial direction.

Moreover, in the insulating cover 161, a pair of recesses 177 are formed respectively in the pair of side walls 171 and at the positions of the circumferential ends of the front wall 174, i.e., the positions where the front wall 174 intersects the pair of side walls 171; each of the recesses 177 is semicircular in cross-sectional shape and extends in the axial direction. Further, a pair of protrusions 178 are formed on the outer wall 172 and respectively on opposite sides of a centerline of the insulating cover 161 in the circumferential direction so as to be symmetrical with respect to the centerline; each of the protrusions 178 extends in the axial direction.

The explanation of the recesses 177 of the insulating cover 161 is supplemented here. As shown in FIG. 20, each of the first bridging portions 153A of the first partial windings 151A has such a curved shape as to be convex radially inward, i.e., toward the core assembly CA. Consequently, between each circumferentially-adjacent pair of the first bridging portions 153A of the first partial windings 151A, there is formed a gap whose width increases in the direction toward the distal ends of the first bridging portions 153A, i.e., in the radially inward direction. In view of the above, in the present embodiment, the recesses 177 are respectively formed, in the side walls 171, at positions outside the curved parts of the first bridging portions 153A by utilizing the gaps between the first bridging portions 153A located adjacent to one another in the circumferential direction.

In addition, each of the first partial windings 151A may have a temperature detector (e.g., thermistor) provided therein. In this case, the insulating cover 161 may further have formed therein an opening for leading out a signal line extending from the temperature detector. Consequently, the temperature detector could be suitably received in the insulating cover 161.

Although not illustrated in detail in the drawings, the insulating cover 162 provided on the other axial side has almost the same configuration as the insulating cover 161. Specifically, similar to the insulating cover 161, the insulating cover 162 has a pair of side walls 171 respectively on opposite sides in the circumferential direction, an outer wall 172 on the axially outer side, an inner wall 173 on the axially inner side, and a front wall 174 on the radially inner side. Moreover, in the insulating cover 162, a pair of semicircular recesses 177 are formed respectively in the pair of side walls 171 and at the positions of the circumferential ends of the front wall 174. Further, a pair of protrusions 178 are formed on the outer wall 172. On the other hand, unlike the insulating cover 161, the insulating cover 162 has no openings for leading out the winding end portions 154 and 155 of the first partial winding 151A.

The insulating covers 161 and 162 differ from each other in the axial height (i.e., the width of the pair of side walls 171 and the front wall 174 in the axial direction). Specifically, as shown in FIG. 17, the axial height W11 of the insulating cover 161 and the axial height W12 of the insulating cover 162 are set to satisfy the relationship of W11>W12. More specifically, when the electrical conductor wire CR is wound multiply, it is necessary to switch the winding turns of the electrical conductor wire CR (or to lane-change the electrical conductor wire CR) in a direction perpendicular to the winding direction (or circumferential direction); thus, the winding width may be increased due to the switching. In addition, of the insulating covers 161 and 162, the insulating cover 161 is a cover which covers the first bridging portion 153A that includes the winding start end and the winding finish end of the electrical conductor wire CR. At the first bridging portion 153A that includes the winding start end and the winding finish end of the electrical conductor wire CR, the winding margin (or overlapping margin) of the electrical conductor wire CR and thus the winding width may become larger than at the other portions of the first partial winding 151A. Taking this fact into account, the axial height W11 of the insulating cover 161 is set to be larger than the axial height W12 of the insulating cover 162. Consequently, unlike in the case of setting the axial heights W11 and W12 of the insulating covers 161 and 162 to be equal to each other, it becomes possible to prevent the number of turns of the electrical conductor wire CR from being limited by the insulating covers 161 and 162.

Next, the configuration of each of the second coil modules 150B will be described.

Figure 22A:
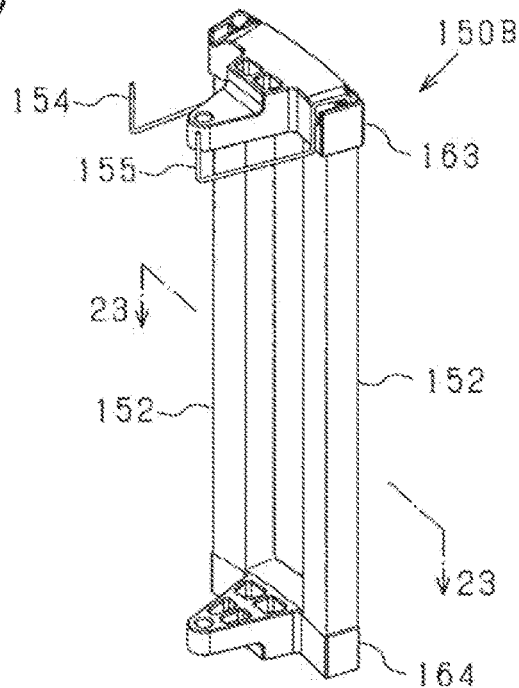
FIGS. 22(a) and 22(b) are perspective views illustrating the configuration of the second coil module.
Figure 22B:
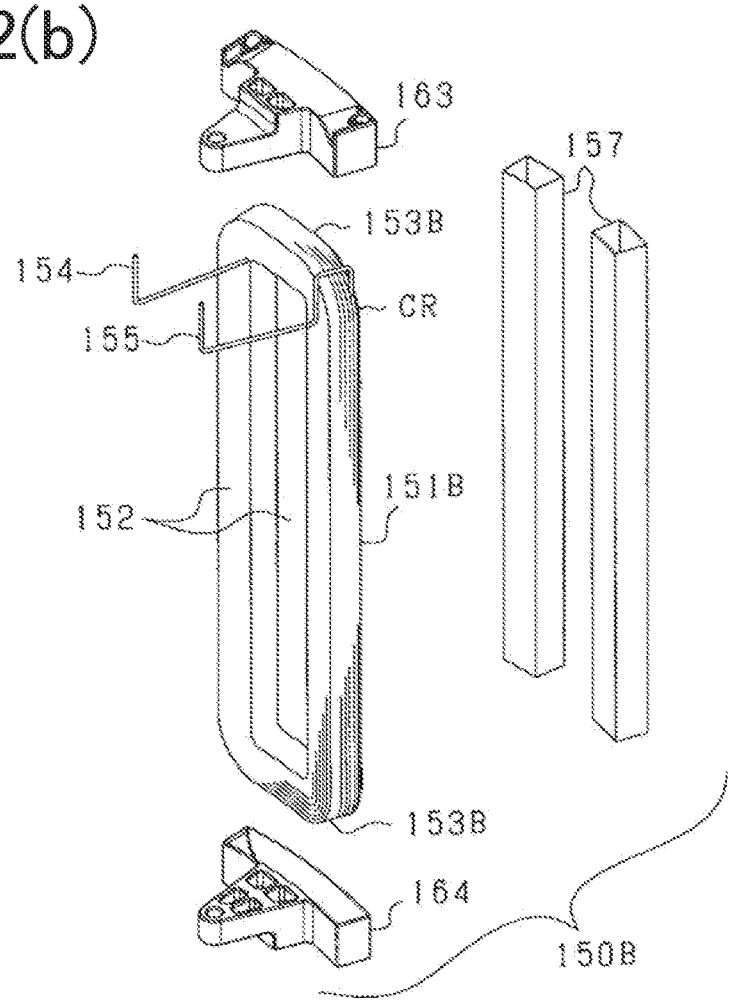
Figure 23:
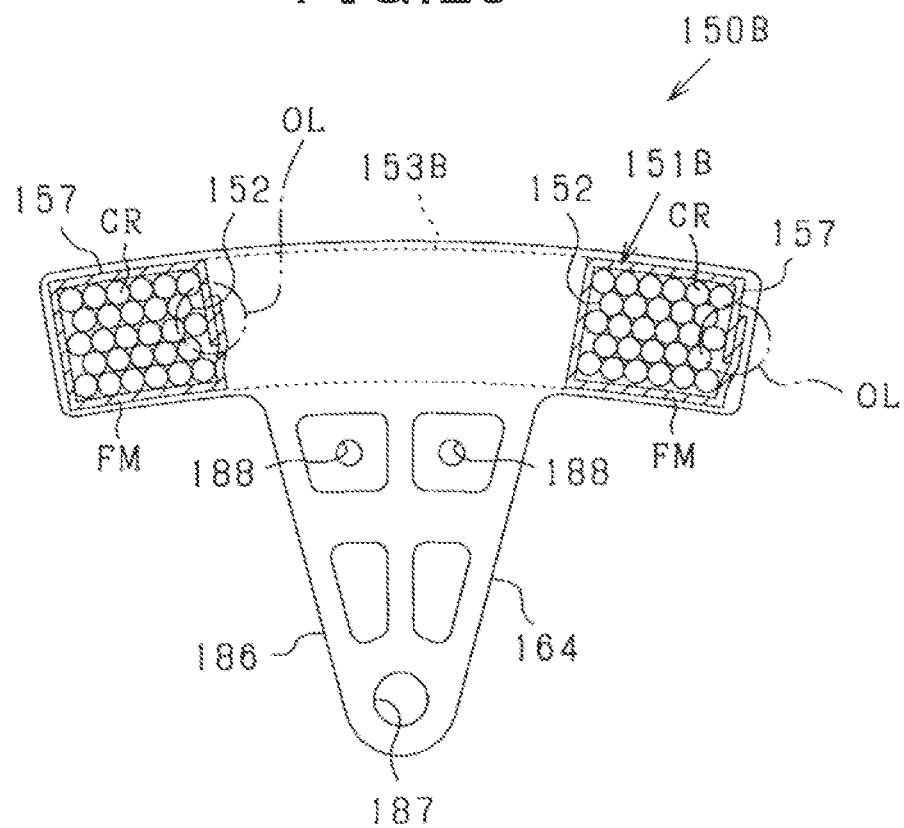
FIG. 23 is a cross-sectional view taken along the line 23-23 in FIG. 22(a).

FIG. 22(a) is a perspective view illustrating the configuration of each of the second coil modules 150B. FIG. 22(b) is a perspective view showing the components of each of the second coil modules 150B in an exploded manner. FIG. 23 is a cross-sectional view taken along the line 23-23 in FIG. 22(a).

As shown in FIGS. 22(a) and 22(b), each of the second coil modules 150B has the second partial winding 151B formed by winding the electrical conductor wire CR multiply and the insulating covers 163 and 164 mounted respectively on opposite axial end portions of the second partial winding 151B. The insulating covers 163 and 164 are formed of an electrically-insulative material such as a synthetic resin.

The second partial winding 151B has a pair of intermediate conductor portions 152 extending straight and parallel to each other, and a pair of second bridging portions 153B connecting the pair of intermediate conductor portions 152 respectively on opposite axial sides of the pair of intermediate conductor portions 152. The second partial winding 151B is formed into a ring shape by the pair of intermediate conductor portions 152 and the pair of second bridging portions 153B. The intermediate conductor portions 152 of the second partial winding 151B have the same configuration as the intermediate conductor portions 152 of the first partial winding 151A described above. On the other hand, the second bridging portions 153B of the second partial winding 151B have a different configuration from the first bridging portions 153A of the first partial winding 151A described above. That is, unlike the first bridging portions 153A of the first partial winding 151A, the second bridging portions 153B of the second partial winding 151B extend straight in the axial direction from the intermediate conductor portions 152 without being radially bent. The difference between the first and second partial windings 151A and 151B is clearly shown in FIG. 18.

In the second partial winding 151B, both end portions of the electrical conductor wire CR are led out from only one of the two second bridging portions 153B (i.e., from the upper second bridging portion 153B in FIG. 22(*b*)): the end portions respectively constitute winding end portions 154 and 155 of the second partial winding 151B. Moreover, the winding end portions 154 and 155 respectively represent the winding start end and the winding finish end of the electrical conductor wire CR. In addition, one of the winding end portions 154 and 155 is connected to an electric current input/output terminal, whereas the other of the winding end portions 154 and 155 is connected to the neutral point.

In the second partial winding 151B, each of the intermediate conductor portions 152 is covered with a sheet-like insulating coat 157. Each of the insulating coats 157 is formed by wrapping a film member FM around the corresponding intermediate conductor portion 152. The film member FM has an axial length not smaller than the axial length of an insulation covering range of the corresponding intermediate conductor portion 152.

The configuration of the insulating coats 157 is substantially the same for the first and second partial windings 151A and 151B. That is, as shown in FIG. 23, in the second partial winding 151B, each of the intermediate conductor portions 152 has the film member FM wrapped therearound so as to have end portions of the film member FM overlapping each other in the circumferential direction. For each of the intermediate conductor portions 152, the corresponding insulating coat 157 is provided so as to cover all of two circumferential side surfaces and two radial side surfaces of the intermediate conductor portion 152. Moreover, the corresponding insulating coat 157 has an overlap part OL where the end portions of the film member FM overlap each other in the circumferential direction; the overlap part OL is located on a part of the intermediate conductor portion 152 which faces one of the intermediate conductor portions 152 of the partial windings 151 of the other phases, i.e., on one of the two circumferential side surfaces of the intermediate conductor portion 152. In the present embodiment, for the pair of intermediate conductor portions 152 of the second partial winding 151B, the overlap parts OL of the corresponding insulating coats 157 are located on the same side in the circumferential direction.

In the second partial winding 151B, the corresponding insulating coats 157 are provided in a range extended from the intermediate conductor portions 152 to parts of the second bridging portions 153B that are located respectively on opposite axial sides of the intermediate conductor portions 152 and covered respectively with the insulating covers 163 and 164 (i.e., to parts of the second partial winding 151B which are located respectively inside the insulating covers 163 and 164). More specifically, referring to FIG. 17, in each of the second coil modules 150B, the second partial winding 151B is covered with neither of the insulating covers 163 and 164 in a range of AX2; and the corresponding insulating coats 157 are provided in a range extended both upward and downward than the range of AX2.

As described above, in the present embodiment, in each of the first and second partial windings 151A and 151B, the corresponding insulating coats 157 are provided in a range including parts of the bridging portions 153A or 153B of the partial winding. That is, in each of the first and second partial windings 151A and 151B, the corresponding insulating coats 157 are provided on parts of the bridging portions 153A or 153B which extend straight respectively from the intermediate conductor portions 152 as well as on the intermediate conductor portions 152. However, since the axial length of the first partial windings 151A is different from the axial length of the second partial windings 151B, the axial range of the corresponding insulating coats 157 is accordingly different between the first partial windings 151A and the second partial windings 151B.

Next, the configurations of the insulating covers 163 and 164 will be described.

In each of the second partial windings 151B, the insulating cover 163 is mounted on that second bridging portion 153B of the second partial winding 151B which is located on one axial side, whereas the insulating cover 164 is mounted on that second bridging portion 153B of the second partial winding 151B which is located on the other axial side. The configuration of the insulating cover 163 is illustrated in FIGS. 24(*a*) and 24(*b*), which are perspective views of the insulating cover 163 respectively from two different directions.

Figure 24A:
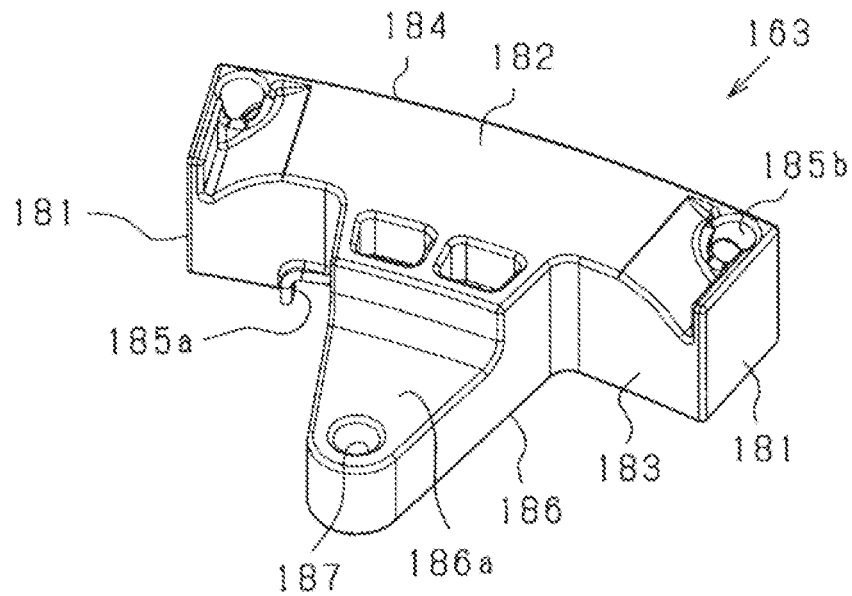
FIGS. 24(a) and 24(b) are perspective views illustrating the configuration of an insulating cover of the second coil module.
Figure 24B:
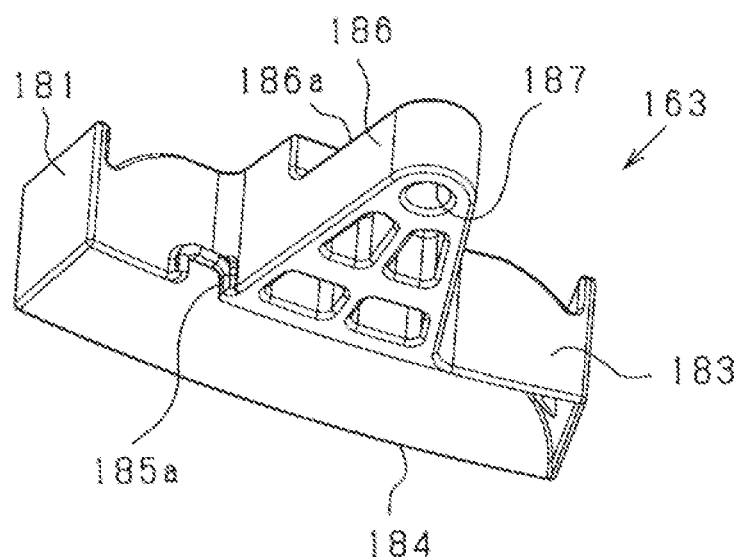

As shown in FIGS. 24(*a*) and 24(*b*), the insulating cover 163 has a pair of side walls 181 respectively on opposite sides in the circumferential direction, an outer wall 182 on the axially outer side, a front wall 183 on the radially inner side and a rear wall 184 on the radially outer side. These walls 181-184 are each plate-shaped, and connected to each other in a three-dimensional shape such that the insulating cover 163 opens only on the axially inner side. Each of the side walls 181 is provided so as to extend, after the assembly of the coil modules 150 to the core assembly CA, toward the axis of the core assembly CA. After all the second coil modules 150B are arranged in alignment with each other in the circumferential direction, for each circumferentially-adjacent pair of the second coil modules 150B, a pair of the side walls 181 of the insulating covers 163 of the pair of the second coil modules 150B circumferentially face each other in a state of being in contact with or in close proximity to each other. Consequently, it becomes possible to suitably arrange all the second coil modules 150B in an annular shape while securing electrical insulation between each circumferentially-adjacent pair of the second coil modules 150B.

In the insulating cover 163, the front wall 183 has an opening 185*a* for leading out the winding end portion 154 of the second partial winding 151B; and the outer wall 182 has an opening 185b for leading out the winding end portion 155 of the second partial winding 151B.

On the front wall 183 of the insulating cover 163, there is formed a protruding portion 186 that protrudes radially inward. Specifically, the protruding portion 186 is formed, at the center position between the two ends of the insulating cover 163 in the circumferential direction, so as to protrude radially inward from the second bridging portion 153B of the second partial winding 151B. The protruding portion 186 has such a tapered shape as to taper radially inward in a plan view. In a distal end part of the protruding portion 186, there is formed a through-hole 187 that extends in the axial direction. In addition, the configuration of the protruding portion 186 may be arbitrary, provided that it protrudes radially inward from the second bridging portion 153B of the second partial winding 151B and has the through-hole 187 formed at the center position between the two ends of the insulating cover 163 in the circumferential direction. However, considering a state of the insulating cover 163 overlapping the insulating covers 161 of the first coil modules 150A located axially inside the insulating cover 163, it is preferable for the insulating cover 163 to be formed with a small circumferential width so as to avoid interference with the winding end portions 154 and 155.

The axial thickness of the protruding portion 186 is reduced stepwise at the distal end part thereof on the radially inner side. The through-hole 187 is formed in a lower step part 186a of the protruding portion 186 which has a reduced axial thickness. After the second coil module 150B is assembled to the core assembly CA, the height from the axial end face of the inner cylinder member 81 is smaller at the lower step part 186a than at the second bridging portion 153B of the second partial winding 151B.

Moreover, as shown in FIG. 23, in the protruding portion 186, there are also formed through-holes 188 that penetrate the protruding portion 186 in the axial direction. Consequently, it becomes possible to fill, in a state of the insulating covers 161 and 163 overlapping each other in the axial direction, an adhesive between the insulating covers 161 and 163 through the through-holes 188.

Although not illustrated in detail in the drawings, the insulating cover 164 provided on the other axial side has almost the same configuration as the insulating cover 163. Specifically, similar to the insulating cover 163, the insulating cover 164 has a pair of side walls 181 respectively on opposite sides in the circumferential direction, an outer wall 182 on the axially outer side, a front wall 183 on the radially inner side and a rear wall 184 on the radially outer side. Moreover, the insulating cover 164 also has a protruding portion 186 formed on the front wall 183 to protrude radially inward, and a through-hole 187 formed in a distal end part of the protruding portion 186. On the other hand, unlike the insulating cover 163, the insulating cover 164 has no openings for leading out the winding end portions 154 and 155 of the second partial winding 151B.

The insulating covers 163 and 164 differ from each other in the radial width of the pair of side walls 181. Specifically, as shown in FIG. 17, the radial width W21 of the side walls 181 of the insulating cover 163 and the radial width W22 of the side walls 181 of the insulating cover 164 are set to satisfy the relationship of W21>W22. More specifically, of the insulating covers 163 and 164, the insulating cover 163 is a cover which covers the second bridging portion 153B that includes the winding start end and the winding finish end of the electrical conductor wire CR. At the second bridging portion 153B that includes the winding start end and the winding finish end of the electrical conductor wire CR, the winding margin (or overlapping margin) of the electrical conductor wire CR and thus the winding width may become larger than at the other portions of the second bridging portion 153B. Taking this fact into account, the radial width W21 of the side walls 181 of the insulating cover 163 is set to be larger than the radial width W22 of the side walls 181 of the insulating cover 164. Consequently, unlike in the case of setting the radial widths W21 and W22 of the insulating covers 163 and 164 to be equal to each other, it becomes possible to prevent the number of turns of the electrical conductor wire CR from being limited by the insulating covers 163 and 164.

Figure 25:
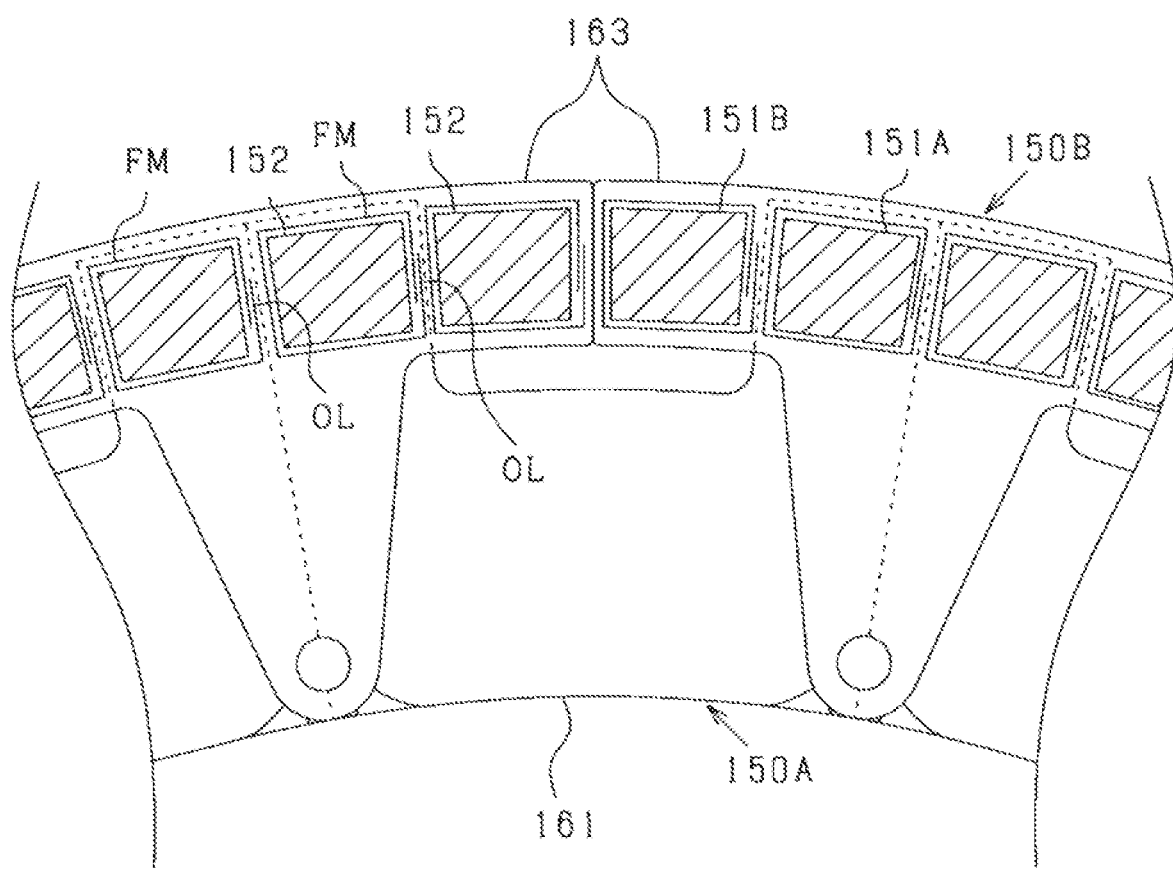
FIG. 25 is a partial cross-sectional view illustrating overlap position of film members in a state where coil modules are arranged in a circumferential direction.

FIG. 25 illustrates the overlap positions of the film members FM in a state where the first and second coil modules 150A and 150B are arranged in alignment with each other in the circumferential direction. As described above, in each of the first and second coil modules 150A and 150B, each of the intermediate conductor portions 152 has the film member FM wrapped therearound so that the end portions of the film member FM overlap each other in the circumferential direction on a part of the intermediate conductor portion 152 which faces one of the intermediate conductor portions 152 of the partial windings 151 of the other phases, i.e., on one of the two circumferential side surfaces of the intermediate conductor portion 152 (see FIGS. 20 and 23). Moreover, after the first and second coil modules 150A and 150B are arranged in alignment with each other in the circumferential direction, all the overlap parts OL of the film members FM in the coil modules 150A and 150B are located on the same side (i.e., the right side in FIG. 25) in the circumferential direction. Accordingly, in each circumferentially-adjacent pair of the intermediate conductor portions 152 of the partial windings 151A and 151B of different phases, the overlap parts OL of the film members FM are not superposed on each other in the circumferential direction. Consequently, between each circumferentially-adjacent pair of the intermediate conductor portions 152, there are interposed a maximum of three layers of the film member FM.

Next, the configuration related to the assembly of the coil modules 150A and 150B to the core assembly CA will be described.

In the present embodiment, the axial length of the first coil modules 150A is different from the axial length of the second coil modules 150B. Moreover, the shape of the first bridging portions 153A of the first partial windings 151A is different from the shape of the second bridging portions 153B of the second partial windings 151B. The coil modules 150A and 150B are mounted to the core assembly CA with the first bridging portions 153A of the first partial windings 151A located on the axially inner side and the second bridging portions 153B of the second partial windings 151B located on the axially outer side. Regarding the insulating covers 161-164, they are fixed to the core assembly CA so that: the insulating covers 161 and the insulating covers 163 overlap each other in the axial direction on one axial side of the coil modules 150A and 150B; and the insulating covers 162 and the insulating covers 164 overlap each other in the axial direction on the other axial side of the coil modules 150A and 150B.

Figure 26:
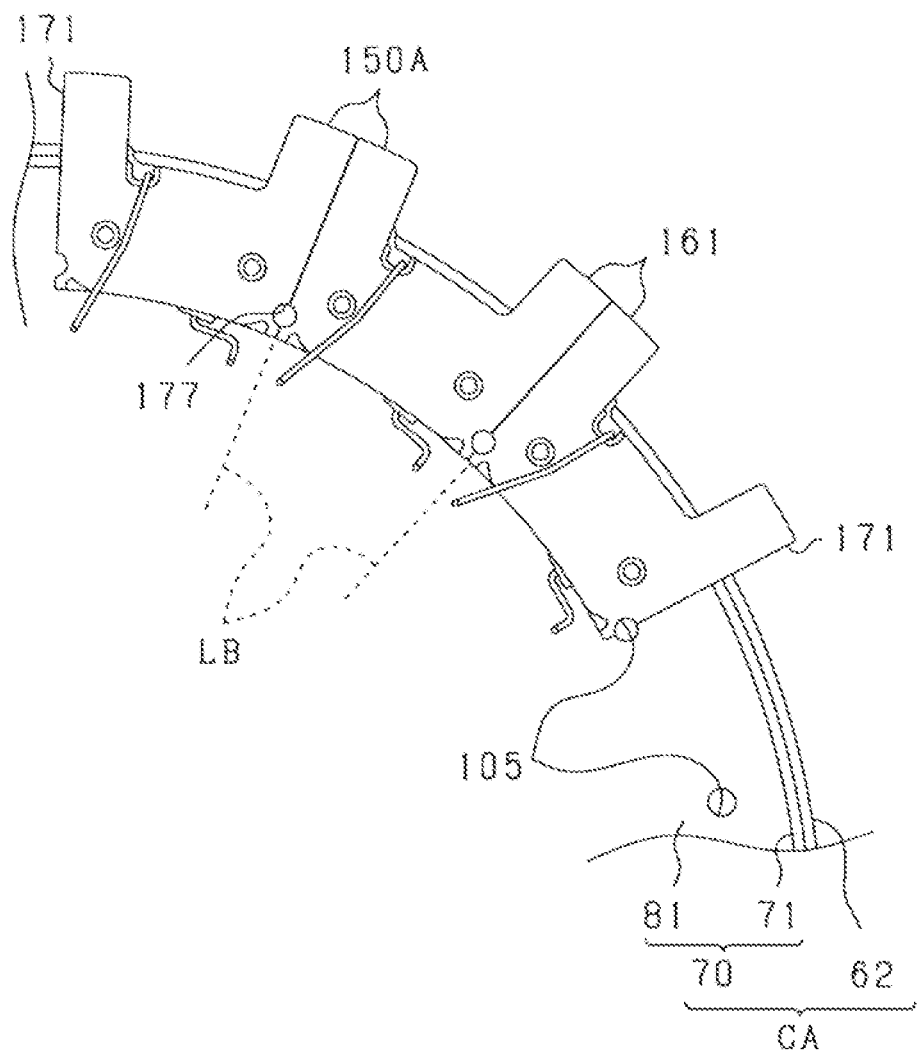
FIG. 26 is a plan view showing first coil modules in a state of having been assembled to the core assembly.
Figure 27:
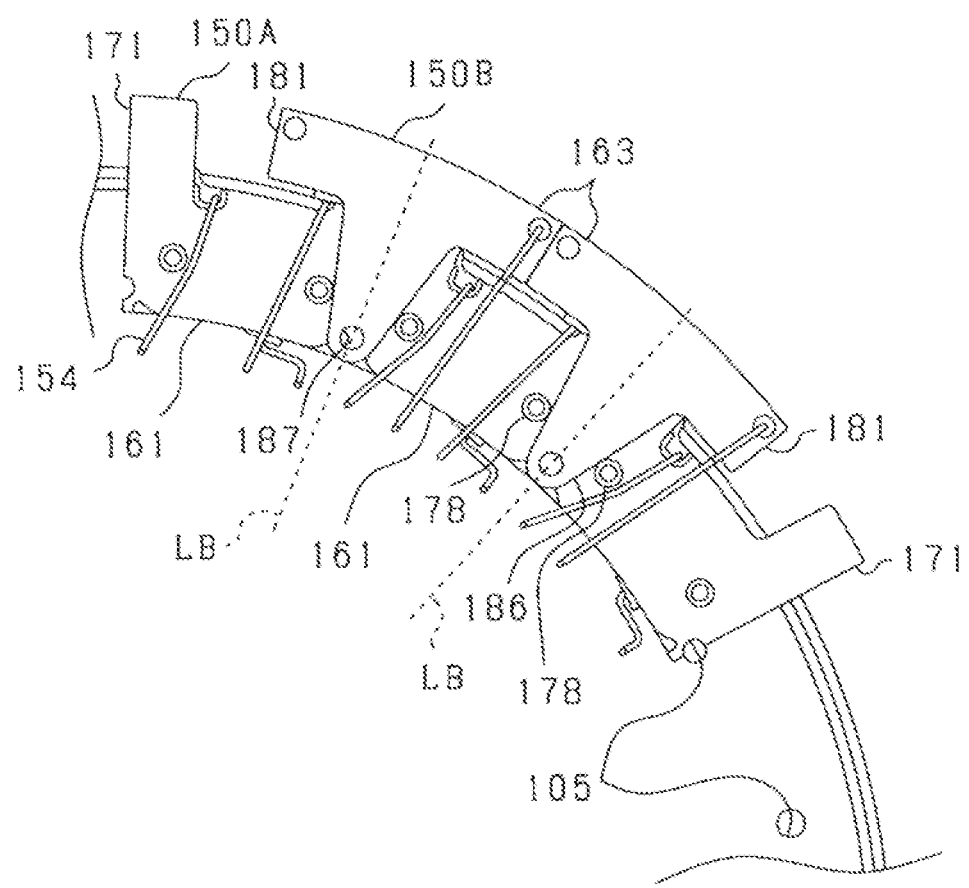
FIG. 27 is a plan view showing both the first coil modules and second coil modules in a state of having been assembled to the core assembly.
Figure 28A:
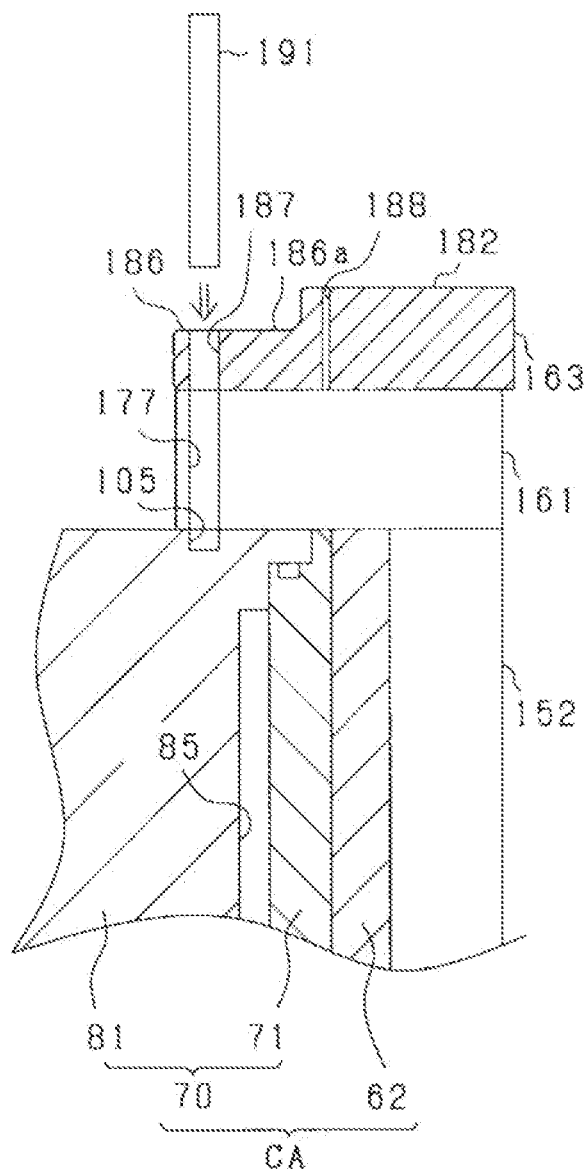
FIGS. 28(a) and 28(b) are longitudinal cross-sectional views illustrating the fixing of the first and second coil modules to the core assembly by fixing pins.
Figure 28B:
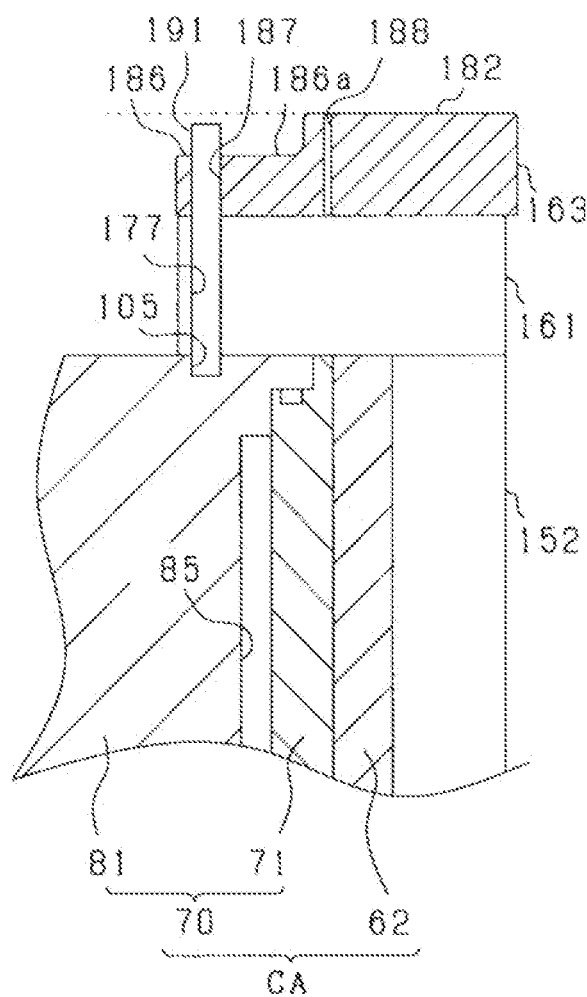

FIG. 26 is a plan view showing the insulating covers 161 arranged side by side in the circumferential direction in the state of the first coil modules 150A having been assembled to the core assembly CA. FIG. 27 is a plan view showing both the insulating covers 161 arranged side by side in the circumferential direction and the insulating covers 163 arranged side by side in the circumferential direction in the state of the first coil modules 150A and the second coil modules 150B having been assembled to the core assembly CA. FIG. 28(a) is a longitudinal cross-sectional view showing the assembly of the coil modules 150A and 150B to the core assembly CA before the fixing of the coil modules 150A and 150B to the core assembly CA by fixing pins 191. FIG. 28(b) is a longitudinal cross-sectional view showing the assembly of the coil modules 150A and 150B to the core assembly CA after the fixing of the coil modules 150A and 150B to the core assembly CA by the fixing pins 191.

As shown in FIG. 26, in a state of the first coil modules 150A having been assembled to the core assembly CA, the insulating covers 161 are arranged in the circumferential direction with the side walls 171 thereof in contact with or in close proximity to one another. More specifically, the insulating covers 161 are arranged such that the boundary lines LB between facing pairs of the side walls 171 respectively coincide with the recesses 105 formed in the axial end face of the inner cylinder member 81. Consequently, with each circumferentially-adjacent pair of the side walls 171 of the insulating covers 161 placed in contact with or in close proximity to each other, a plurality of through-holes are formed each of which is constituted of a circumferentially-adjacent pair of the recesses 177 of the insulating covers 161 and extends in the axial direction. In addition, the through-holes constituted of the recesses 177 of the insulating covers 161 are axially aligned respectively with the recesses 105 formed in the axial end face of the inner cylinder member 81.

Moreover, as shown in FIG. 27, the second coil modules 150B are further assembled to the core assembly CA and the first coil modules 150A which have been integrated into one piece. Consequently, the insulating covers 163 are arranged in the circumferential direction with the side walls 181 thereof in contact with or in close proximity to one another. Moreover, the first bridging portions 153A of the first partial windings 151A and the second bridging portions 153B of the second partial windings 151B are arranged so as to intersect one another on an imaginary circle on which the intermediate conductor portions 152 of the first and second partial windings 151A and 151B are aligned with each other in the circumferential direction. Furthermore, each of the insulating covers 163 is arranged so as to have the protruding portion 186 thereof axially overlapping a circumferentially-adjacent pair of the insulating covers 161 and the through-hole 187 of the protruding portion 186 axially connected with the through-hole constituted of a pair of the recesses 177 of the circumferentially-adjacent pair of the insulating covers 161.

Moreover, at this time, for each of the insulating covers 163, the protruding portion 186 of the insulating cover 163 is guided to a predetermined position by a pair of the protrusions 178 of a circumferentially-adjacent pair of the insulating covers 161. Consequently, the through-hole 187 formed in the protruding portion 186 is brought into axial alignment with both the through-hole constituted of a pair of the recesses 177 of the circumferentially-adjacent pair of the insulating covers 161 and a corresponding one of the recesses 105 formed in the axial end face of the inner cylinder member 81. More specifically, in the state of the coil modules 150A and 150B having been assembled to the core assembly CA, the recesses 177 of the insulating covers 161 are located behind the insulating covers 163; therefore, it may be difficult to axially align, for each of the insulating covers 163, the through-hole 187 formed in the protruding portion 186 of the insulating cover 163 with the through-hole constituted of a pair of the recesses 177 of a circumferentially-adjacent pair of the insulating covers 161. In this regard, in the present embodiment, with the protruding portion 186 of the insulating cover 163 being guided by a pair of the protrusions 178 of a circumferentially-adjacent pair of the insulating covers 161, the through-hole 187 formed in the protruding portion 186 can be easily brought into axial alignment with the through-hole constituted of a pair of the recesses 177 of the circumferentially-adjacent pair of the insulating covers 161.

Then, as shown in FIGS. 28(a) and 28(b), for each of the insulating covers 163, the protruding portion 186 of the insulating cover 163 is fixed, by a fixing pin 191, to the circumferentially-adjacent pair of the insulating covers 161 that axially overlap the protruding portion 186. More specifically, with the through-hole 187 of the protruding portion 186 axially aligned with both the through-hole constituted of a pair of the recesses 177 of the circumferentially-adjacent pair of the insulating covers 161 and a corresponding one of the recesses 105 of the inner cylinder member 81, the fixing pin 191 is inserted into the through-hole 187, the through-hole constituted of the pair of the recesses 177 and the corresponding recess 105. Consequently, the insulating covers 161 and 163 are together fixed to the inner cylinder member 81. With the above configuration, each of the second coil modules 150B is fixed, together with a circumferentially-adjacent pair of the first coil modules 150A, to the core assembly CA by a common fixing pin 191 at the coil end CE. It is preferable for the fixing pins 191 to be formed of a material having high thermal conductivity, such as a metal.

As shown in FIG. 28(b), each of the fixing pins 191 is assembled to the lower step part 186a of the protruding portion 186 of a corresponding one of the insulating covers 163. In this state, an upper end portion of the fixing pin 191 protrudes upward from the lower step portion 186a, but not beyond an upper surface (or the outer wall 182) of the corresponding insulating cover 163. That is, the fixing pin 191 is longer than the axial height of the overlap part between the protruding portion 186 (more specifically, the lower step portion 186a) of the corresponding insulating cover 163 and a corresponding pair of the insulating cover 161, and thus has a margin for protruding upward from the overlap part. Consequently, it becomes possible to facilitate the insertion of the fixing pin 191 into the recesses 105 and 177 and the through-hole 187 (i.e., facilitate the fixing of the corresponding coil modules 150A and 150B to the core assembly CA by the fixing pin 191). Moreover, since the upper end portion of the fixing pin 191 does not protrude beyond the upper surface (or the outer wall 182) of the corresponding insulating cover 163, the axial length of the stator 60 is prevented from being increased due to the protrusion of the fixing pin 191.

After the fixing of the insulating covers 161 and 163 by the fixing pins 191, the adhesive is filled between the insulating covers 161 and 163 through the through-holes 188 formed in the insulating covers 163. Consequently, the insulating covers 161 and 163 overlapping each other in the axial direction are firmly bonded together. In addition, in FIGS. 28(a) and 28(b), for the sake of convenience, the through-hole 188 is shown in the range from the upper surface to the lower surface of the insulating cover 163; however, the through-hole 188 is actually formed in a thin plate portion of the insulating cover 163 which is formed by wall thinning or the like.

As shown in FIG. 28(b), the position of fixing the insulating covers 161 and 163 by the fixing pins 191 is on an axial end face of the stator holder 70 located on the radially inner side (i.e., the left side in the figure) of the stator core 62. The insulating covers 161 and 163 are fixed by the fixing pins 191 to the stator holder 70. That is, the first bridging portions 153A of the first partial windings 151A are fixed to the axial end face of the stator holder 70. In this case, since the coolant passage 85 is formed in the stator holder 70, heat generated in the first partial windings 151A can be directly transferred from the first bridging portions 153A to the vicinity of the coolant passage 85 in the stator holder 70. Moreover, since the fixing pins 191 are inserted respectively in the recesses 105 of the stator holder 70, the heat transfer to the stator holder 70 can be enhanced through the fixing pins 191. Consequently, with the above configuration, it becomes possible to improve the performance of cooling the stator coil 61.

In the present embodiment, eighteen insulating covers 161 and eighteen insulating covers 163 are arranged respectively on the axially inner side and the axially outer side at the coil end CE so as to overlap each other in the axial direction. Moreover, eighteen recesses 105 are formed respectively at eighteen positions in the axial end face of the stator holder 70. That is, the number of the recesses 105 is equal to the number of the insulating covers 161 and to the number of the insulating covers 163. Furthermore, eighteen fixing pins 191 for fixing the insulating covers 161 and 163 are inserted respectively in the eighteen recesses 105.

Although not shown in the drawings, the insulating covers 162 and 164, which are located on the opposite axial side of the core assembly CA to the insulating covers 161 and 163, are fixed to the core assembly CA in a similar manner to the insulating covers 161 and 163. Specifically, in the state of the first coil modules 150A having been assembled to the core assembly CA, the insulating covers 162 are arranged in the circumferential direction with the side walls 171 thereof in contact with or in close proximity to one another. Consequently, a plurality of through-holes are formed each of which is constituted of a circumferentially-adjacent pair of the recesses 177 of the insulating covers 162 and extends in the axial direction. Moreover, the through-holes constituted of the recesses 177 of the insulating covers 162 are axially aligned respectively with the recesses 106 formed in the axial end face of the outer cylinder member 71. Further, in the state of the second coil modules 150B having been assembled to the assembly of the core assembly CA and the first coil modules 150A, the through-holes 187 of the insulating covers 164 are axially aligned respectively with the through-holes constituted of the recesses 177 of the insulating covers 162 and with the recesses 106 of the outer cylinder member 71. Then, the fixing pins 191 are inserted into the recesses 106 and 177 and the through-hole 187, thereby fixing the insulating covers 162 and 164 together to the outer cylinder member 71.

The coil modules 150A and 150B may be assembled to the core assembly CA by: first assembling all the first coil modules 150A to a radially outer part of the core assembly CA; then assembling all the second coil modules 150B to the assembly of the core assembly CA and the first coil modules 150A; and thereafter fixing all the coil modules 150A and 150B to the core assembly CA by the fixing pins 191. Alternatively, the coil modules 150A and 150B may be assembled to the core assembly CA by: first fixing a pair of the first coil modules 150A and one of the second coil modules 150B together to the core assembly CA by one of the fixing pins 191; and then repeating the assembling of one of the remaining first coil modules 150A, the assembling of one of the remaining second coil modules 150B and the fixing by one of the remaining fixing pins 191 in this order.

Next, the configuration of the busbar module 200 will be described.

Figure 29:
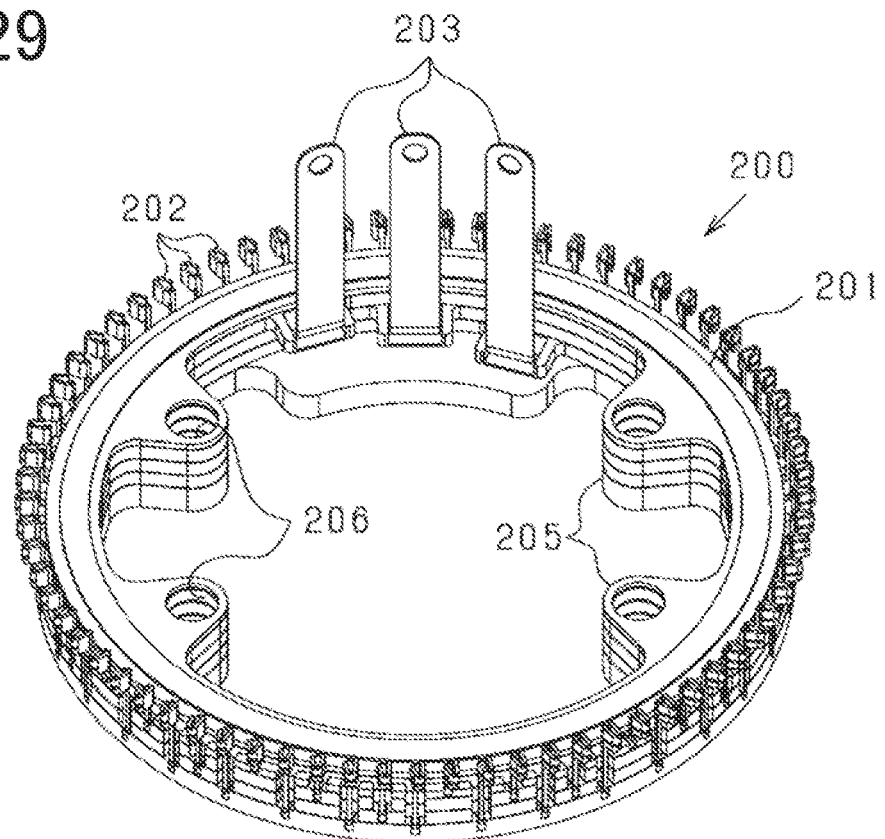
FIG. 29 is a perspective view of a busbar module of the rotating electric machine.
Figure 30:
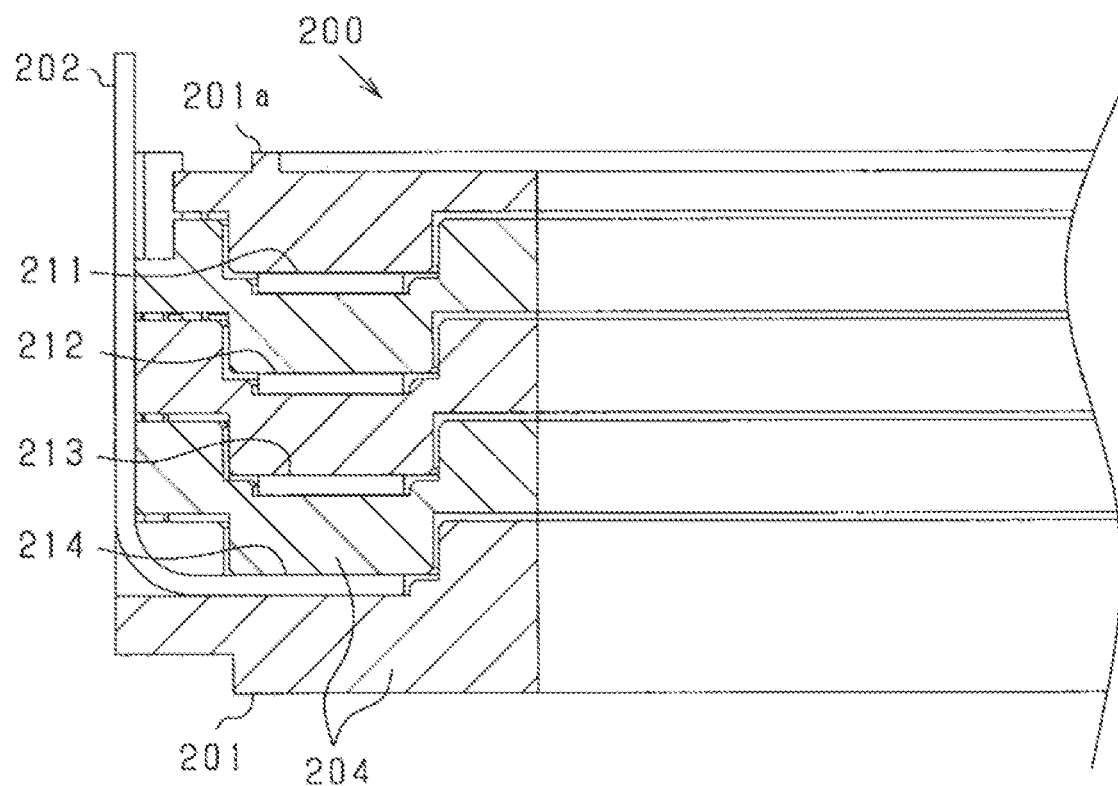
FIG. 30 is a cross-sectional view showing part of a longitudinal cross section of the busbar module.

The busbar module 200 is electrically connected with the partial windings 151 of the coil modules 150 of the stator coil 61. The busbar module 200 is a winding connecting member which connects, for each phase of the stator coil 61, first ends of the partial windings 151 of the phase in parallel with each other and second ends of the partial windings 151 of the phase together at the neutral point. FIG. 29 is a perspective view of the busbar module 200. FIG. 30 is a cross-sectional view showing part of a longitudinal cross section of the busbar module 200.

The busbar module 200 has an annular portion 201, a plurality of connection terminals 202 extending from the annular portion 201, and three input/output terminals 203 provided respectively for the three phase windings of the stator coil 61. The annular portion 201 is formed of an electrically insulative material, such as a resin, into an annular shape.

As shown in FIG. 30, the annular portion 201 includes a plurality (e.g., five in the present embodiment) of substantially annular lamination plates 204 that are laminated in the axial direction. Moreover, in the annular portion 201, there are embedded four busbars 211-214 each of which is annular-shaped and sandwiched between an axially-adjacent pair of the lamination plates 204. The busbars 211-214 include a U-phase busbar 211, a V-phase busbar 212, a W-phase busbar 213 and a neutral busbar 214. The busbars 211-214 are arranged in alignment with each other in the axial direction with plate surfaces thereof facing one another. The lamination plates 204 and the busbars 211-214 are joined to one another by an adhesive. It is preferable to employ adhesive sheets as the adhesive. Alternatively, a liquid or semiliquid adhesive may be applied between the lamination plates 204 and the busbars 211-214. Each of the connection terminals 202 is connected with a corresponding one of the busbars 211-214 so as to protrude radially outside from the annular portion 201.

On an upper surface of the annular portion 201, i.e., on an upper surface of that lamination plate 204 which is located axially outermost among all of the five lamination plates 204, there is formed a protrusion 201a that extends in an annular shape.

The busbar module 200 may be formed in any suitable manner such that the busbars 211-214 are embedded in the annular portion 201. For example, the busbar module 200 may be formed by insert-molding with the busbars 211-214 arranged at predetermined intervals. Moreover, the arrangement of the busbars 211-214 is not limited to the above-described configuration where all the busbars 211-214 are axially aligned with each other and all the plate surfaces of the busbars 211-214 are oriented in the same direction. For example, a configuration where all the busbars 211-214 are radially aligned with each other, a configuration where the busbars 211-214 are arranged in two rows in the axial direction as well as in two rows in the radial direction, or a configuration where the plate surfaces of the busbars 211-214 extend in different directions from each other may alternatively be employed.

As shown in FIG. 29, the connection terminals 202 are aligned with each other in the circumferential direction of the annular portion 201 and axially extend on the radially outer side of the annular portion 201. Moreover, the connection terminals 202 include U-phase connection terminals 202 connected with the U-phase busbar 211, V-phase connection terminals 202 connected with the V-phase busbar 212, and W-phase connection terminals 202 connected with the W-phase busbar 213, and neutral connection terminals 202 connected with the neutral busbar 214. The number of the connection terminals 202 is set to be equal to the number of the winding end portions 154 and 155 of the partial windings 151 of the coil modules 150. Each of the connection terminals 202 is connected to a corresponding one of the winding end portions 154 and 155 of the partial windings 151 of the coil modules 150. Consequently, the busbar module 200 is connected to each of the U-phase partial windings 151, the V-phase partial windings 151 and the W-phase partial windings 151.

The input/output terminals 203 are formed of, for example, a busbar material and arranged to extend in the axial direction. The input/output terminals 203 include a U-phase input/output terminal 203U, a V-phase input/output terminal 203V and a W-phase input/output terminal 203W. The U-phase, V-phase and W-phase input/output terminals 203U-203W are connected, in the annular portion 201, respectively with the U-phase, V-phase and W-phase busbars 211-213. Through these input/output terminals 203, electric power is inputted from an inverter (not shown in the drawings) to the phase windings of the stator coil 61 or outputted from the phase windings of the stator coil 61 to the inverter.

In addition, in the busbar module 200, there may be integrally provided current sensors that respectively detect phase currents flowing respectively through the phase windings of the stator coil 61. Further, in the busbar module 200, there may be provided a current detection terminal so that the detection results of the current sensors can be outputted to a controller (not shown in the drawings) through the current detection terminal.

The annular portion 201 has a plurality of protrusions 205 formed on the radially inner periphery thereof so as to protrude radially inward; the protrusions 205 serve as fixed portions of the busbar module 200 to the stator holder 70. Moreover, in each of the protrusions 205, there is formed a through-hole 206 that extends in the axial direction.

Figure 31:
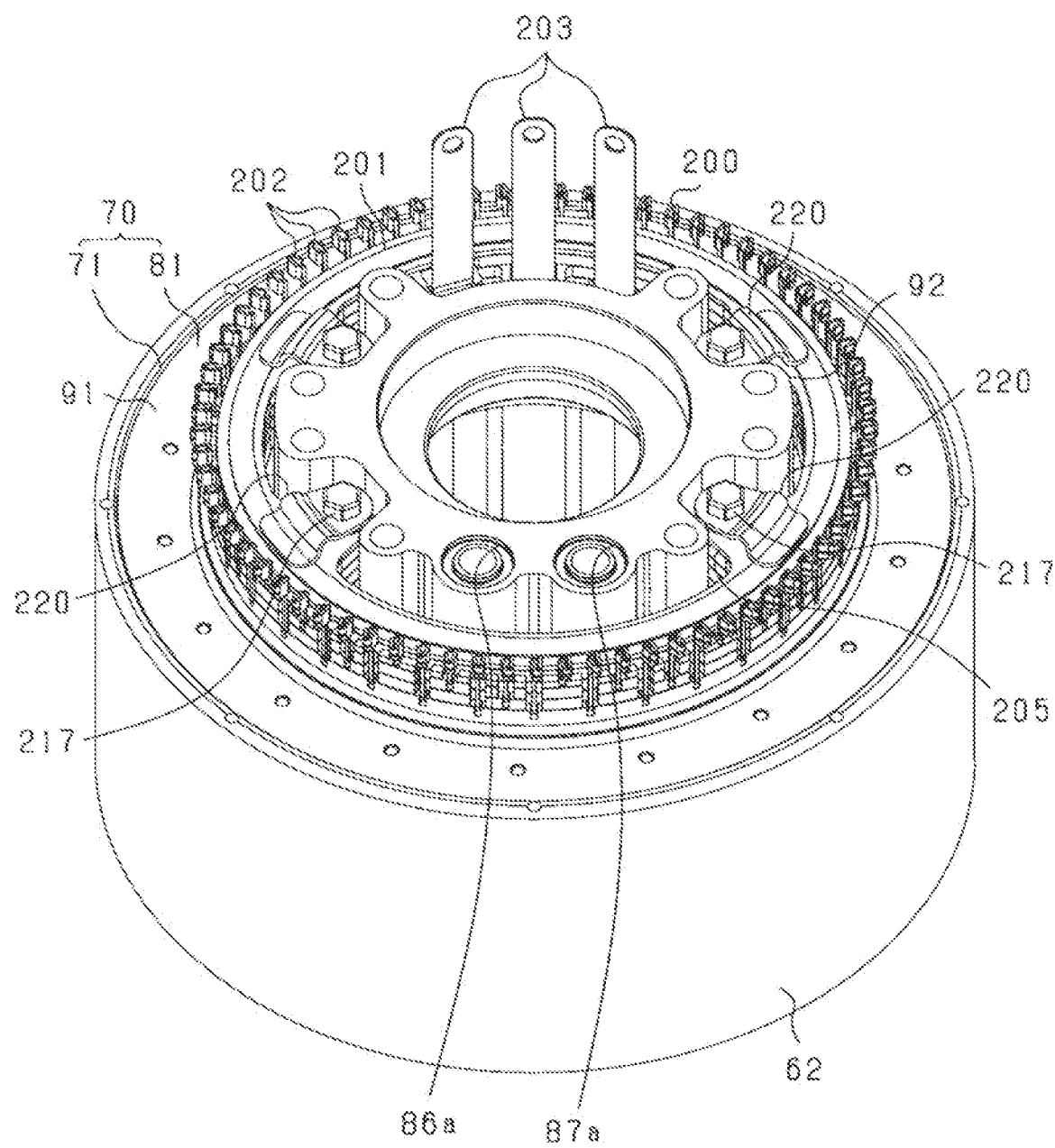
FIG. 31 is a perspective view showing the busbar module in a state of having been assembled to a stator holder.
Figure 32:
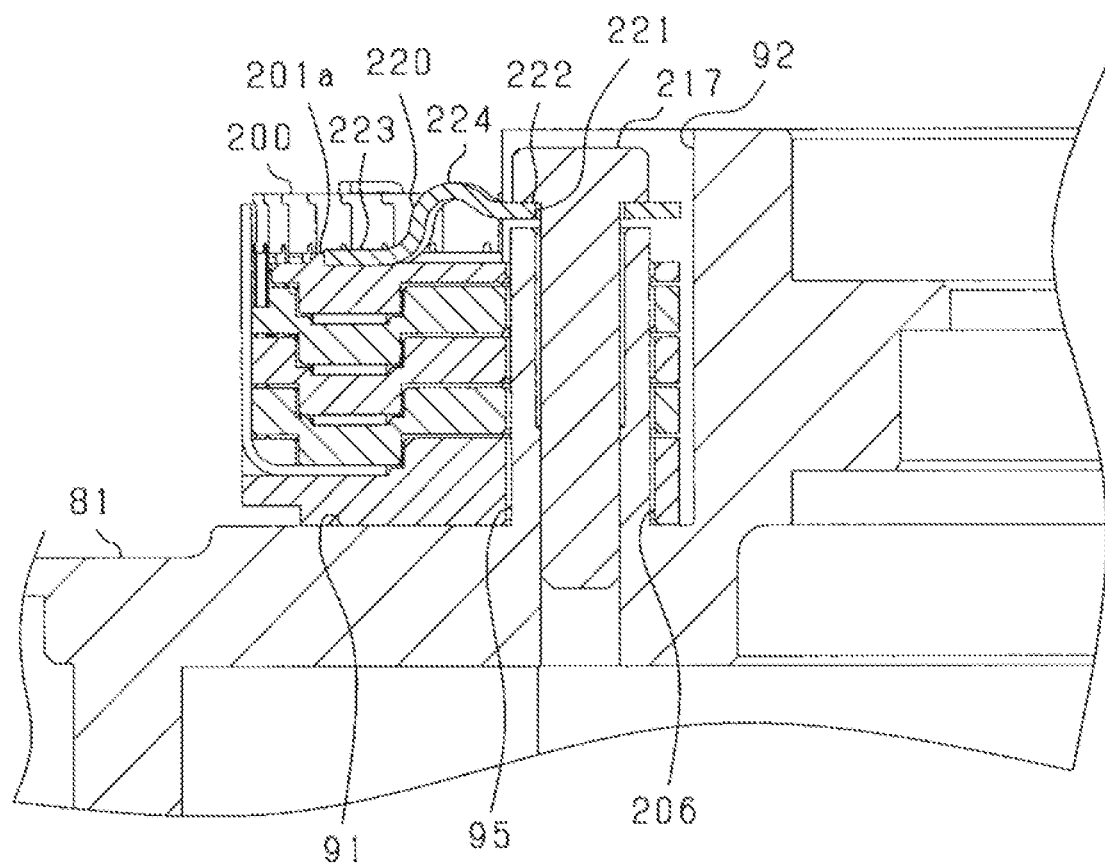
FIG. 32 is a longitudinal cross-sectional view illustrating the fixing of the busbar module to the stator holder.

FIG. 31 is a perspective view showing the busbar module 200 in a state of having been assembled to the stator holder 70. FIG. 32 is a longitudinal cross-sectional view illustrating the fixing of the busbar module 200 to the stator holder 70. In addition, the configuration of the stator holder 70 without the busbar module 200 assembled thereto is illustrated in FIG. 12.

As shown in FIG. 31, the busbar module 200 is placed on the end plate portion 91 so as to surround the boss portion 92 of the inner cylinder member 81. The busbar module 200 is fixed, in a state of being positioned by the assembly thereof to the pillar portions 95 (see FIG. 12) of the inner cylinder member 81, to the stator holder 70 (more specifically, to the inner cylinder member 81) by fastening fasteners 217 such as bolts.

More specifically, as shown in FIG. 32, each of the pillar portions 95 is formed on the end plate portion 91 of the inner cylinder member 81 so as to extend in the axial direction. Moreover, in the state of the pillar portions 95 being inserted respectively in the through-holes 206 formed in the protrusions 205 of the annular portion 201, the busbar module 200 is fixed to the pillar portions 95 by the fasteners 217. In the present embodiment, the busbar module 200 is fixed with retainer plates 220 that are formed of a metal material such as iron. Each of the retainer plates 220 has a fastened part 222, a pressing part 223 and a bend part 224. The fastened part 222 has an insertion hole 221 through which a corresponding one of the fasteners 217 is inserted. The pressing part 223 is provided to press the upper surface of the annular portion 201 of the busbar module 200. The bend part 224 is formed between the fastened part 222 and the pressing part 223.

In mounting each of the retainer plates 220, a corresponding one of the fasteners 217 is inserted through the insertion hole 221 formed in the fastened part 222 of the retainer plate 220 and screwed into the corresponding pillar portion 95 of the inner cylinder member 81. Moreover, the pressing part 223 of the retainer plate 220 is placed in contact with the upper surface of the annular portion 201 of the busbar module 200. As the corresponding fastener 217 is screwed into the corresponding pillar portion 95 of the inner cylinder member 81, the retainer plate 220 is pushed downward by the corresponding fastener 217, causing the annular portion 201 of the busbar module 200 to be pressed downward by the pressing part 223 of the retainer plate 220. In this case, the downward pressing force generated by the screwing of the corresponding fastener 217 is transmitted to the pressing part 223 through the bend part 224 of the retainer plate 220; therefore, the pressing by the pressing part 223 is made with elastic force of the bend part 224.

As described above, on the upper surface of the annular portion 201 of the busbar module 200, there is formed the annular protrusion 201a. Moreover, a distal end of the retainer plate 220 on the pressing part 223 side is configured to be capable of abutting the protrusion 201a. Consequently, it is possible to prevent the downward pressing force of the retainer plate 220 from escaping radially outward. That is, the pressing force generated with the screwing of the corresponding fastener 217 can be suitably transmitted to the pressing part 223 side.

In addition, as shown in FIG. 31, in the state of the busbar module 200 having been assembled to the stator holder 70, the input/output terminals 203 are located 180 degrees opposite in the circumferential direction to the inlet opening 86a and the outlet opening 87a both of which communicate with the coolant passage 85. It should be noted that the input/output terminals 203 may alternatively be provided at the same position as (or adjacent to) the openings 86a and 87a.

Next, explanation will be given of a relay member 230 for electrically connecting the input/output terminals 203 of the busbar module 200 to an external device provided outside the rotating electric machine 10.

As shown in FIG. 1, in the rotating electric machine 10, the input/output terminals 203 of the busbar module 200 are provided so as to protrude outward from the housing cover 242; and the input/output terminals 203 are connected to the relay member 230 on the outside of the housing cover 242. The relay member 230 is a member which relays the electrical connection between the input/output terminals 203 for respective phases extending from the busbar module 200 and electric power lines for respective phases extending from an external device such as an inverter.

Figure 33:
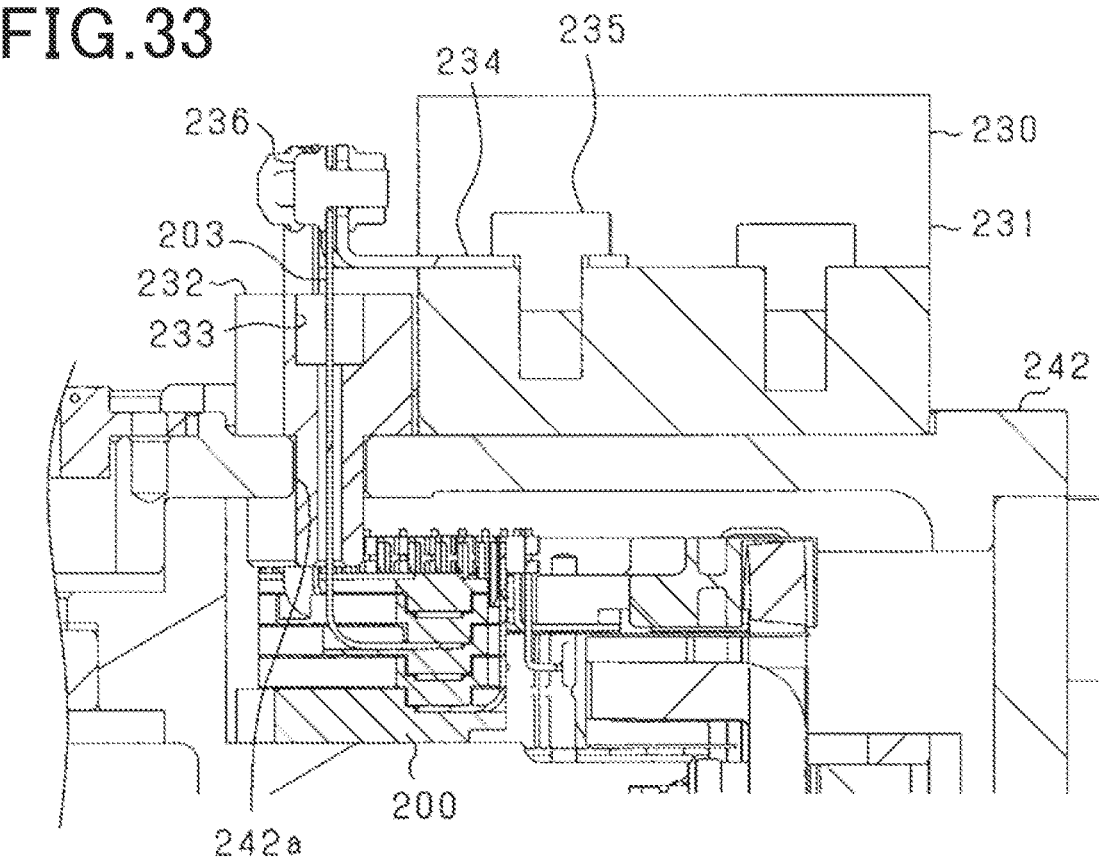
FIG. 33 is a longitudinal cross-sectional view showing a relay member in a state of having been mounted to a housing cover.
Figure 34:
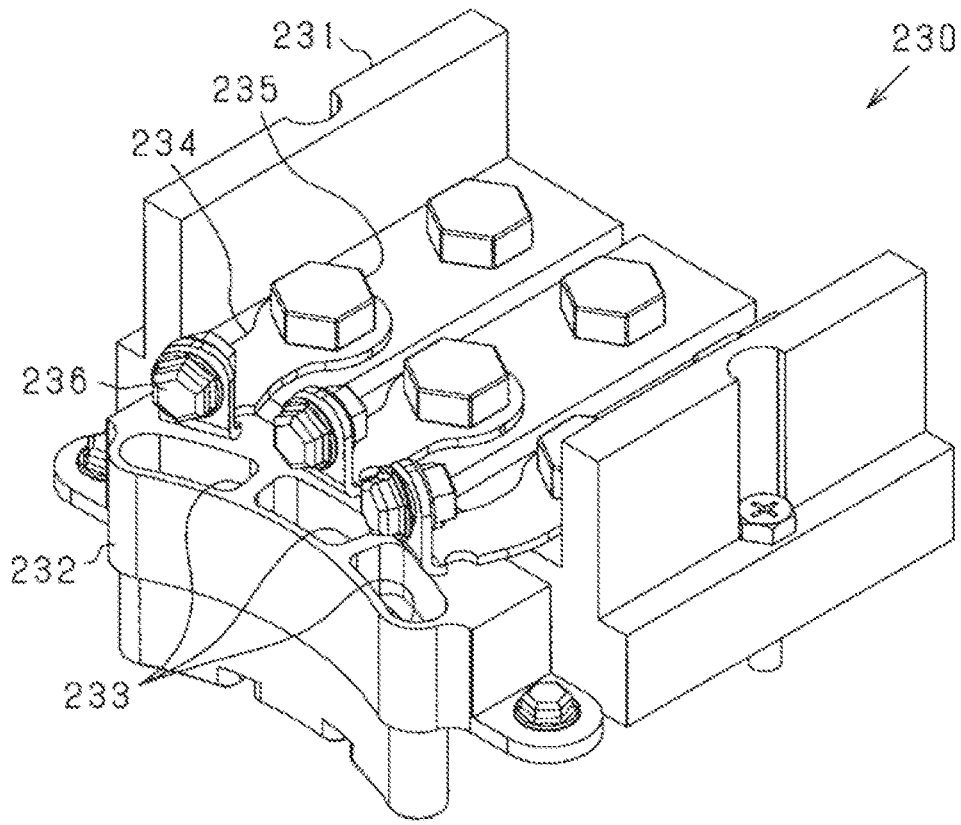
FIG. 34 is a perspective view of the relay member.

FIG. 33 is a longitudinal cross-sectional view showing the relay member 230 in a state of having been mounted to the housing cover 242. FIG. 34 is a perspective view of the relay member 230. As shown in FIG. 33, a through-hole 242a is formed in the housing cover 242, so that the input/output terminals 203 can be led out through the through-hole 242a.

The relay member 230 has a main body 231 fixed to the housing cover 242 and a terminal insertion portion 232 inserted in the through-hole 242a of the housing cover 242. The terminal insertion portion 232 has three insertion holes 233 in which the three input/output terminals 203 are respectively inserted. The insertion holes 233 have respective openings that are long in cross-sectional shape. Moreover, the insertion holes 233 are formed in alignment with each other in a direction substantially coinciding with each of the longitudinal directions thereof.

To the main body 231 of the relay member 230, there are mounted three relay busbars 234 for respective phases. Specifically, each of the relay busbars 234 is formed by bending in a substantially L-shape. Each of the relay busbars 234 is fastened to the main body 231 of the relay member 230 by a fastener 235 such as a bolt. Moreover, each of the relay busbars 234 is also fastened, by a fastener 236 such as a pair of a bolt and a nut, to a distal end portion of a corresponding one of the input/output terminals 203 that are inserted respectively in the insertion holes 233 formed in the terminal insertion portion 232 of the relay member 230.

In addition, although not shown in the drawings, the electric power lines for respective phases extending from the external device can be connected to the relay member 230 to input/output electric power respectively from/to the input/output terminals 203 of the busbar module 200.

Figure 35:
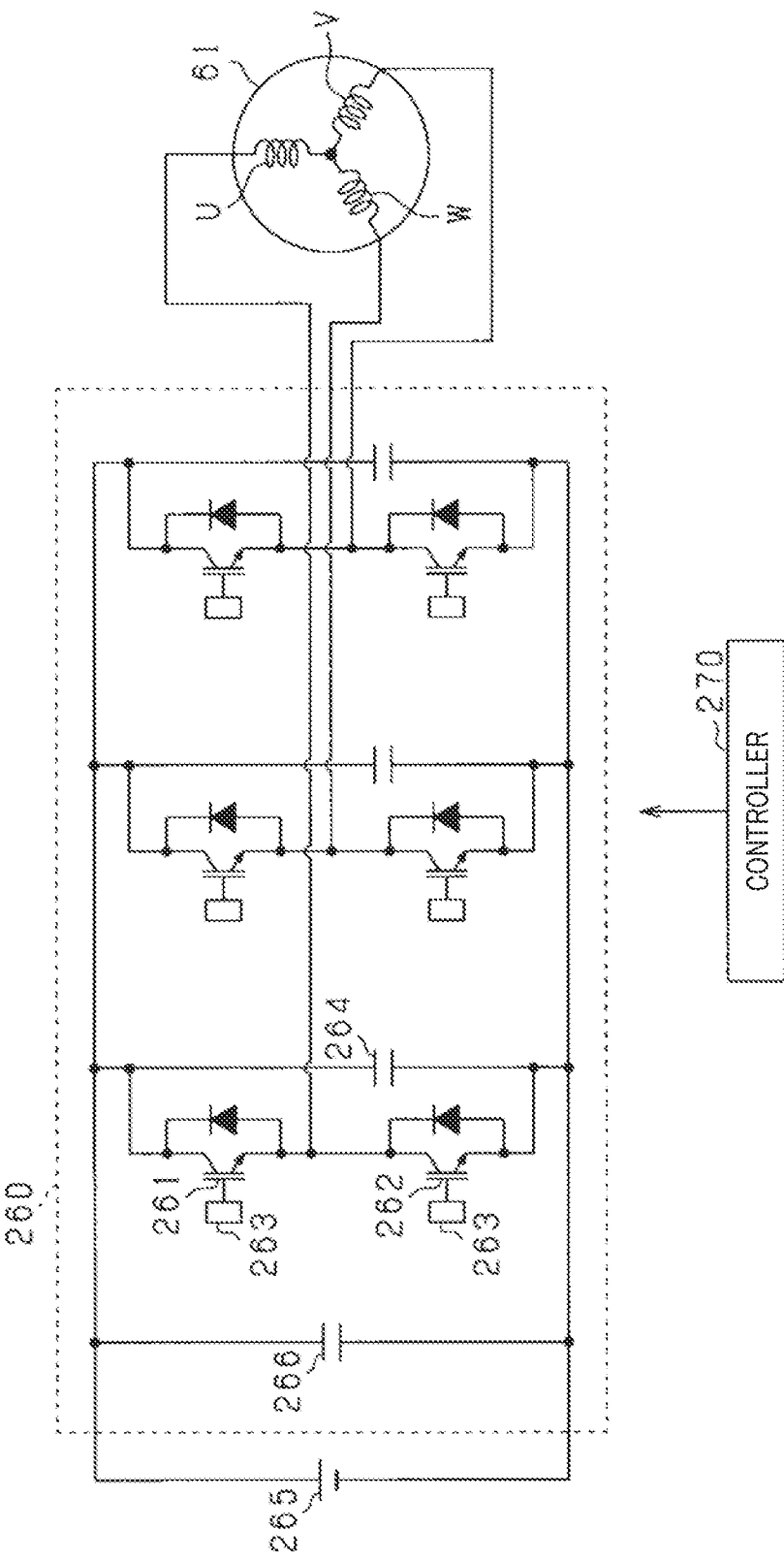
FIG. 35 is an electric circuit diagram of a control system of the rotating electric machine.
Figure 36:
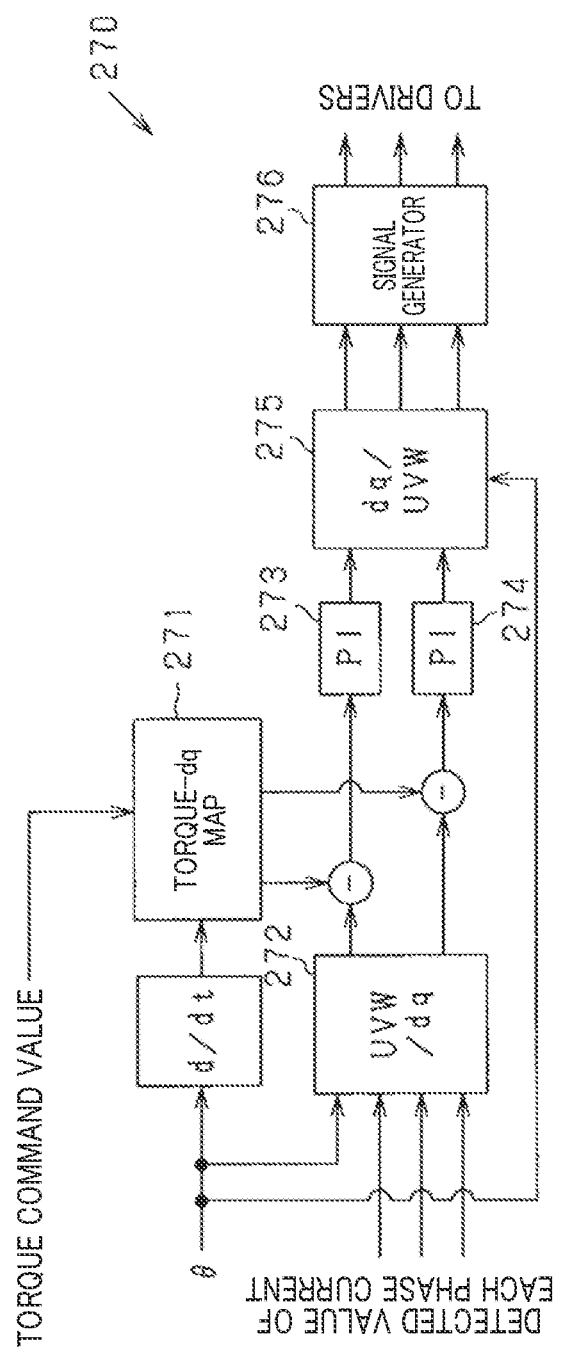
FIG. 36 is a functional block diagram illustrating a current feedback control process performed by a controller.

Next, the configuration of a control system that controls the rotating electric machine 10 will be described. FIG. 35 is an electric circuit diagram of the control system of the rotating electric machine 10. FIG. 36 is a functional block diagram illustrating a control process performed by a controller 270 of the control system.

As shown in FIG. 35, in the present embodiment, the stator coil 61 is comprised of the U, V and W phase windings. To the stator coil 61, there is connected an inverter 260 that is an electric power converter. In the inverter 260, there is formed a full bridge circuit having a plurality of pairs of upper and lower arms. The number of pairs of the upper and lower arms is equal to the number of the phase windings of the stator coil 61. The full bridge circuit includes, for each of the U, V and W phases, one serially-connected unit consisting of an upper-arm switch 261 and a lower-arm switch 262. Each of the switches 261 and 262 is turned on and off by a corresponding switch driver 263, so as to supply alternating current to a corresponding one of the U, V, and W phase windings. Each of the switches 261 and 262 is configured with a semiconductor switching element such as a MOSFET or an IGBT. Moreover, each serially-connected unit, which corresponds to one of the U, V and W phases and consists of one upper-arm switch 261 and one lower-arm switch 262, has a charge supply capacitor 264 connected in parallel therewith to supply electric charge required for the switching operation of the switches 261 and 262.

To an intermediate junction point between the upper-arm and lower-arm switches 261 and 262 of each of the serially-connected units for respective phases, there is connected a first end of a corresponding one of the U-phase, V-phase and W-phase windings. The U-phase, V-phase and W-phase windings are star-connected (or Y-connected) to define a neutral point therebetween, at which second ends of these phase windings are connected with each other.

The controller 270 includes a microcomputer that is configured with a CPU and various memories. Based on various types of detected information on the rotating electric machine 10 and power running drive and electric power generation requests, the controller 270 performs energization control by turning on and off the switches 261 and 262 of the inverter 260. The detected information on the rotating electric machine 10 includes, for example, a rotation angle (or electrical angle information) of the rotor 20 detected by an angle detector such as a resolver, a power supply voltage (or inverter input voltage) detected by a voltage sensor, and phase currents detected by respective current sensors. The controller 270 controls the on/off operation of each of the switches 261 and 262 by, for example, PWM control at a predetermined switching frequency (or carrier frequency) or a rectangular wave control. The controller 270 may be either a built-in controller incorporated in the rotating electric machine 10 or an external controller provided outside the rotating electric machine 10.

In addition, in the rotating electric machine 10 according to the present embodiment, with employment of the slot-less structure (or toothless structure), the inductance of the stator 60 is lowered; thus the electrical time constant is accordingly lowered. When the electrical time constant is low, it is preferable to increase the switching frequency (or carrier frequency) and the switching speed. In this regard, in the present embodiment, the wiring inductance is lowered with the charge supply capacitor 264 connected in parallel with the upper-arm and lower-arm switches 261 and 262 of each of the serially-connected units for respective phases. Consequently, even with the increased switching speed, it is still possible to suitably cope with surge.

The inverter 260 has its high potential-side terminal connected to a positive terminal of a DC power supply 265 and its low potential-side terminal connected to a negative terminal of the DC power supply 265 (or ground). The DC power supply 265 may be implemented by, for example, an assembled battery that is composed of a plurality of battery cells connected in series with each other. Moreover, between the high potential-side and low potential-side terminals of the inverter 260, there is further connected a smoothing capacitor 266 in parallel with the DC power supply 265.

FIG. 36 is a block diagram illustrating a current feedback control process for controlling the U-phase, V-phase and W-phase currents.

In FIG. 36, a current command value setter 271 is configured to set, using a torque-dq map, both a d-axis current command value and a q-axis current command value on the basis of a power running torque command value or an electric power generation torque command value to the rotating electric machine 10 and an electrical angular speed ω obtained by differentiating the electrical angle θ with respect to time. In addition, in the case of the rotating electric machine 10 being used as a vehicular power source, the electric power generation torque command value is a regenerative torque command value.

A dq converter 272 is configured to convert current detected values (three phase currents), which are detected by the current sensors provided for respective phases, into d-axis current and q-axis current which are current components in a Cartesian two-dimensional rotating coordinate system whose d-axis indicates a field direction (or direction of an axis of a magnetic field).

A d-axis current feedback controller 273 is configured to calculate a d-axis command voltage as a manipulated variable for feedback-controlling the d-axis current to the d-axis current command value. A q-axis current feedback controller 274 is configured to calculate a q-axis command voltage as a manipulated variable for feedback-controlling the q-axis current to the q-axis current command value. These feedback controllers 273 and 274 are configured to calculate, using a PI feedback method, the command voltages on the basis of the differences of the d-axis current and the q-axis current from the respective current command values.

A three-phase converter 275 is configured to convert the d-axis and q-axis command voltages into U-phase, V-phase and W-phase command voltages. In addition, the above units 271-275 together correspond to a feedback controller for performing feedback control of fundamental currents by a dq conversion method. The U-phase, V-phase and W-phase command voltages are the feedback-controlled values.

An operation signal generator 276 is configured to generate, using a well-known triangular-wave carrier comparison method, operation signals for the inverter 260 on the basis of the U-phase, V-phase and W-phase command voltages. Specifically, the operation signal generator 276 generates the operation signals (or duty signals) for operating the upper-arm and lower-arm switches of the U, V and W phases by PWM control based on comparison in amplitude between signals, which are obtained by normalizing the U-phase, V-phase and W-phase command voltages with respect to the power supply voltage, and a carrier signal such as a triangular-wave signal. The operation signals generated by the operation signal generator 276 are outputted to the switch drivers 263 of the inverter 260. Then, the switches 261 and 262 of the U, V and W phases are turned on and off by the switch drivers 263 based on the operation signals.

Next, a torque feedback control process will be described. This process is performed mainly for reducing losses and thereby increasing the output of the rotating electric machine 10 in operating conditions where the output voltage of the inverter 260 become high, such as in a high-rotation region and a high-output region. The controller 270 selectively performs either one of the torque feedback control process and the current feedback control process according to the operating condition of the rotating electric machine 10.

Figure 37:
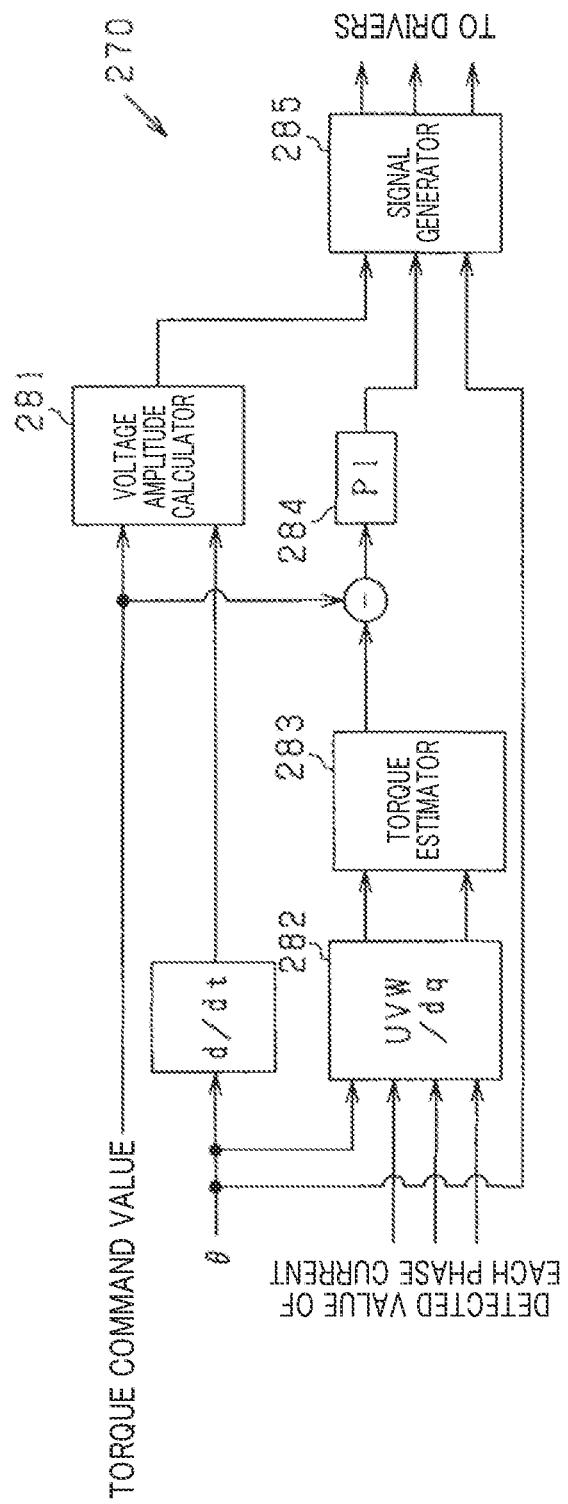
FIG. 37 is a functional block diagram illustrating a torque feedback control process performed by the controller.

FIG. 37 is a block diagram illustrating the torque feedback control process corresponding to the U, V and W phases.

A voltage amplitude calculator 281 is configured to calculate a voltage amplitude command, which indicates a command value of the amplitudes of voltage vectors, on the basis of the power running torque command value or the electric power generation torque command value to the rotating electric machine 10 and the electrical angular speed of obtained by differentiating the electrical angle θ with respect to time.

Similar to the above-described dq converter 272, a dq converter 282 is configured to convert current detected values, which are detected by the current sensors provided for respective phases, into d-axis current and q-axis current. A torque estimator 283 is configured to calculate a torque estimated value corresponding to the U, V and W phases on the basis of the d-axis current and q-axis current obtained by the dq converter 282. In addition, the torque estimator 283 may calculate the voltage amplitude command on the basis of map information associating the d-axis and q-axis currents with the voltage amplitude command.

A torque feedback controller 284 is configured to calculate a voltage phase command, which indicates command values of the phases of the voltage vectors, as a manipulated variable for feedback-controlling the torque estimated value to the power running torque command value or the electric power generation torque command value. More specifically, the torque feedback controller 284 calculates, using a PI feedback method, the voltage phase command on the basis of the difference of the torque estimated value from the power running torque command value or the electric power generation torque command value.

An operation signal generator 285 is configured to generate operation signals for the inverter 260 on the basis of the voltage amplitude command, the voltage phase command and the electrical angle θ. Specifically, the operation signal generator 285 first calculates U-phase, V-phase and W-phase command voltages on the basis of the voltage amplitude command, the voltage phase command and the electrical angle θ. Then, the operation signal generator 285 generates the operation signals for operating the upper-arm and lower-arm switches of the U, V and W phases by PWM control based on comparison in amplitude between signals, which are obtained by normalizing the calculated U-phase, V-phase and W-phase command voltages with respect to the power supply voltage, and a carrier signal such as a triangular-wave signal. The operation signals generated by the operation signal generator 285 are outputted to the switch drivers 263 of the inverter 260. Then, the switches 261 and 262 of the U, V and W phases are turned on and off by the switch drivers 263 based on the operation signals.

In addition, as an alternative, the operation signal generator 285 may generate the switch operation signals on the basis of pulse pattern information, the voltage amplitude command, the voltage phase command and the electrical angle θ. The pulse pattern information is map information associating the switch operation signals with the voltage amplitude command, the voltage phase command and the electrical angle θ.

Modifications of First Embodiment

Hereinafter, modifications of the above-described embodiment will be described.

Figure 38:
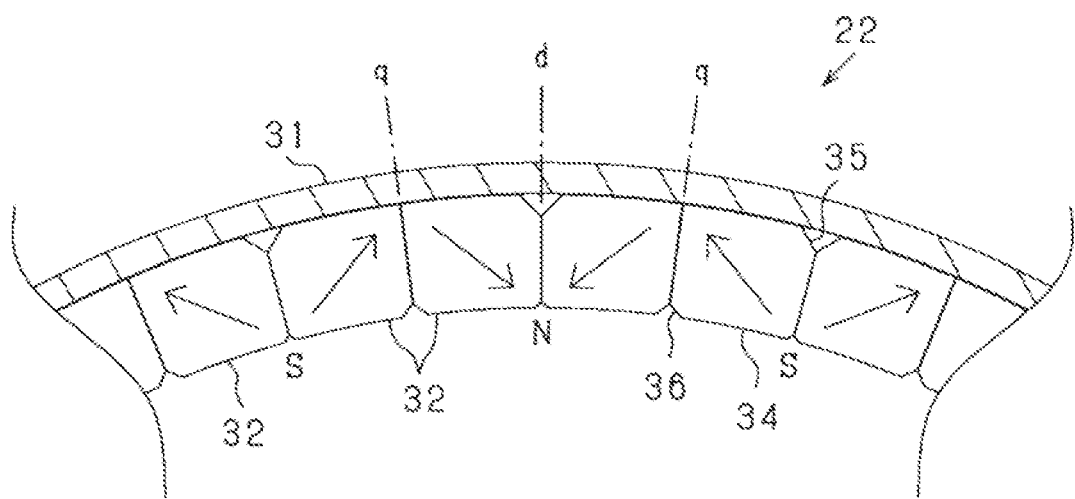
FIG. 38 is a transverse partial cross-sectional view illustrating the cross-sectional structure of a magnet unit according to a modification.

The configuration of the magnets 32 in the magnet unit 22 may be modified as follows. In the magnet unit 22 shown in FIG. 38, the directions of the easy axes of magnetization in the magnets 32 are oblique to the radial directions; and straight magnet magnetic paths are formed along the directions of the easy axes of magnetization. With this configuration, it is also possible to make the magnet magnetic paths in the magnets 32 longer than the radial width of the magnets 32, thereby improving the permeance.

The magnet unit 22 may alternatively employ magnets that arranged in a Halbach array.

In each of the partial windings 151, the bridging portions 153 may be bent radially inward or radially outward. More specifically, with respect to the core assembly CA, each of the first bridging portions 153A of the first partial windings 151A may be bent to the core assembly CA side or to the opposite side to the core assembly CA. Moreover, each of the second bridging portions 153B of the second partial windings 151B may also be bent radially inward or radially outward such that it extends, on the axially outer side of the first bridging portions 153A of the first partial windings 151A, circumferentially across part of at least one of the first bridging portions 153A.

The partial windings 151 constituting the stator coil 61 may include only one type of partial windings 151 instead of the two types of partial windings 151 (i.e., the first partial windings 151A and the second partial windings 151B). Specifically, each of the partial windings 151 may be formed to have a substantially L-shape or a substantially Z-shape in a side view. In the case of each of the partial windings 151 being formed to have a substantially L-shape in a side view, the bridging portion of the partial winding on one axial side is bent radially inward or radially outward while the bridging portion of the partial winding on the other axial side extends straight in the axial direction without being radially bent. On the other hand, in the case of each of the partial windings 151 being formed to have a substantially Z-shape in a side view, the bridging portion of the partial winding on one axial side is bent radially inward while the bridging portion of the partial winding on the other axial side is bent radially outward. In either of the above cases, the coil modules 150 may be fixed to the core assembly CA by the insulating covers covering the bridging portions of the partial windings as described above.

In the above-described embodiment, in each of the phase windings of the stator coil 61, all the partial windings 151 constituting the phase winding are connected in parallel with each other. As an alternative, in each of the phase windings of the stator coil 61, all the partial windings 151 constituting the phase winding may be divided into a plurality of partial-winding groups; each of the partial-winding groups includes a predetermined number of the partial windings connected in parallel with each other and all the partial-winding groups are connected in series with each other. For example, in the case of each of the phase windings of the stator coil 61 being formed of n partial windings 151, the n partial windings 151 may be divided into two (or three) partial-winding groups: each of the two (or three) partial-winding groups includes n/2 (or n/3) partial windings 151 connected in parallel with each other and the two (or three) partial-winding groups are connected in series with each other. As another alternative, in each of the phase windings of the stator coil 61, all the partial windings 151 constituting the phase winding may be connected in series with each other.

In the rotating electric machines 10 according to the above-described embodiment, the stator coil 61 is configured as a three-phase coil to include the U-phase, V-phase and W-phase windings. Alternatively, the stator coil 61 may be configured as a two-phase coil to include only a U-phase winding and a V-phase winding. In this case, in each of the partial windings 151, the pair of intermediate conductor portions 152 may be formed apart from each other by one coil-pitch and have one intermediate conductor portion 152 of one partial winding 151 of the other phase arranged therebetween in the circumferential direction.

Figure 39A:
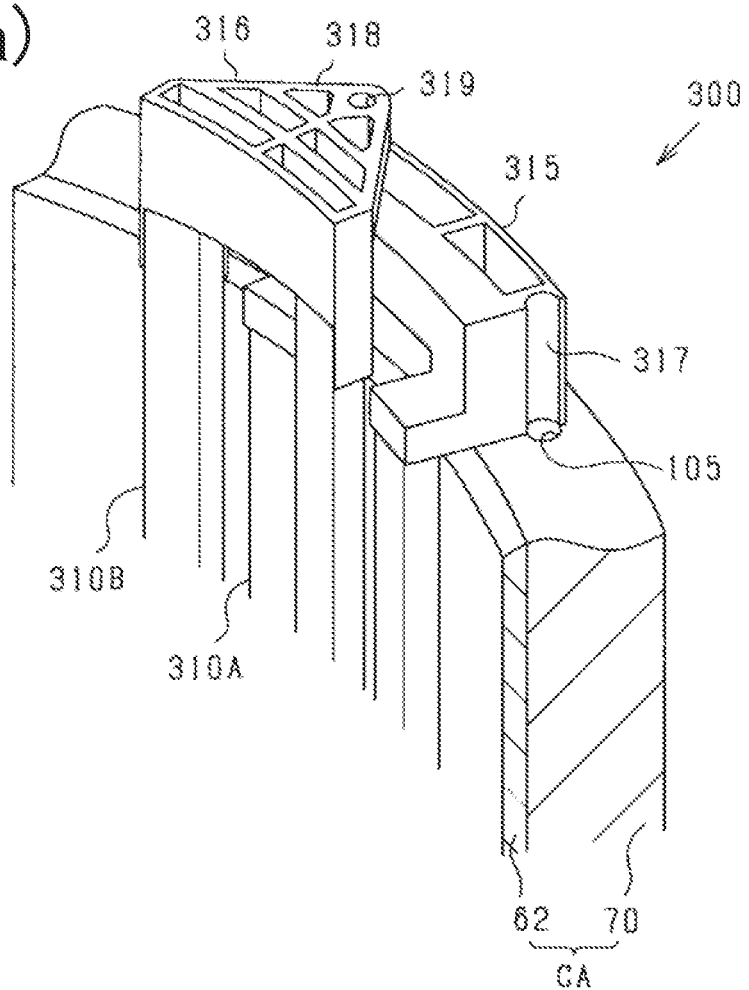
FIGS. 39(a) and 39(b) are diagrams illustrating the configuration of a stator unit of an inner rotor type rotating electric machine.
Figure 39B:
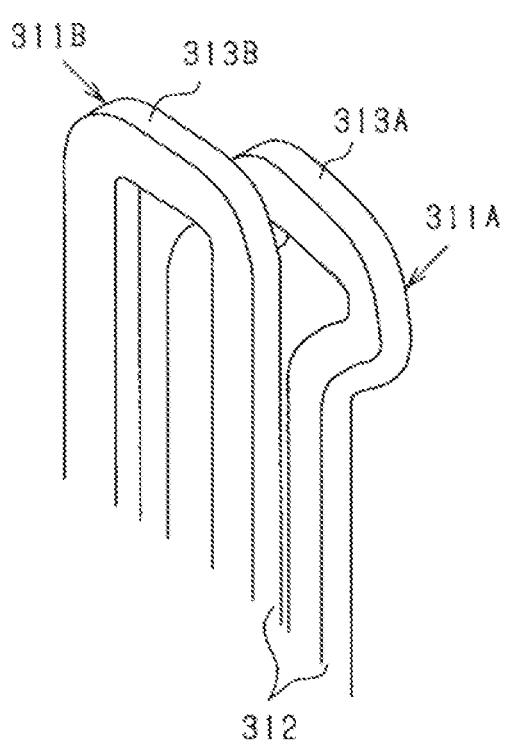

The rotating electric machine 10 according to the above-described embodiment is configured as an outer rotor type SPM (Surface Permanent Magnet) rotating electric machine. Alternatively, the rotating electric machine 10 may be configured as an inner rotor type SPM rotating electric machine. FIGS. 39(a) and 39(b) are diagrams illustrating the configuration of a stator unit 300 of an inner rotor type SPM rotating electric machine. Specifically, FIG. 39(a) is a perspective view showing coil modules 310A and 310B assembled to a core assembly CA. FIG. 39(b) is a perspective view showing partial windings 311A and 311B included respectively in the coil modules 310A and 310B. In this example, the core assembly CA includes a stator core 62 and a stator holder 70 assembled to a radially outer periphery of the stator core 62. Moreover, there are a plurality of coil modules 310A and 310B assembled to a radially inner periphery of the stator core 62.

The partial windings 311A have substantially the same configuration as the first partial windings 151A described above. That is, each of the partial windings 311A is ring-shaped to have a pair of intermediate conductor portions 312 and a pair of bridging portions 313A located respectively on opposite axial sides of the pair of intermediate conductor portions 312 to connect the pair of intermediate conductor portions 312. Moreover, each of the bridging portions 313A is bent to the core assembly CA side (i.e., radially outward). On the other hand, the partial windings 311B have substantially the same configuration as the second partial windings 151B described above. That is, each of the partial windings 311B is ring-shaped to have a pair of intermediate conductor portions 312 and a pair of bridging portions 313B located respectively on opposite axial sides of the pair of intermediate conductor portions 312 to connect the pair of intermediate conductor portions 312. Moreover, each of the bridging portions 313B extends straight in the axial direction without being radially bent. Furthermore, each of the bridging portions 313B extends, on the axially outer side of the bridging portions 313A of the partial windings 311A, circumferentially across part of at least one of the bridging portions 313A. Each of the bridging portions 313A of the partial windings 311A has an insulating cover 315 mounted thereon, whereas each of the bridging portions 313B of the partial windings 311B has an insulating cover 316 mounted thereon.

Each of the insulating covers 315 has a pair of recesses 317 formed respectively in opposite circumferential side walls thereof; each of the recesses 317 is semicircular in cross-sectional shape and extends in the axial direction. On the other hand, each of the insulating covers 316 has a protruding portion 318 that protrudes radially outward from the bridging portion 313B. Moreover, in a distal end part of the protruding portion 318, there is formed a through-hole 319 that extends in the axial direction.

Figure 40:
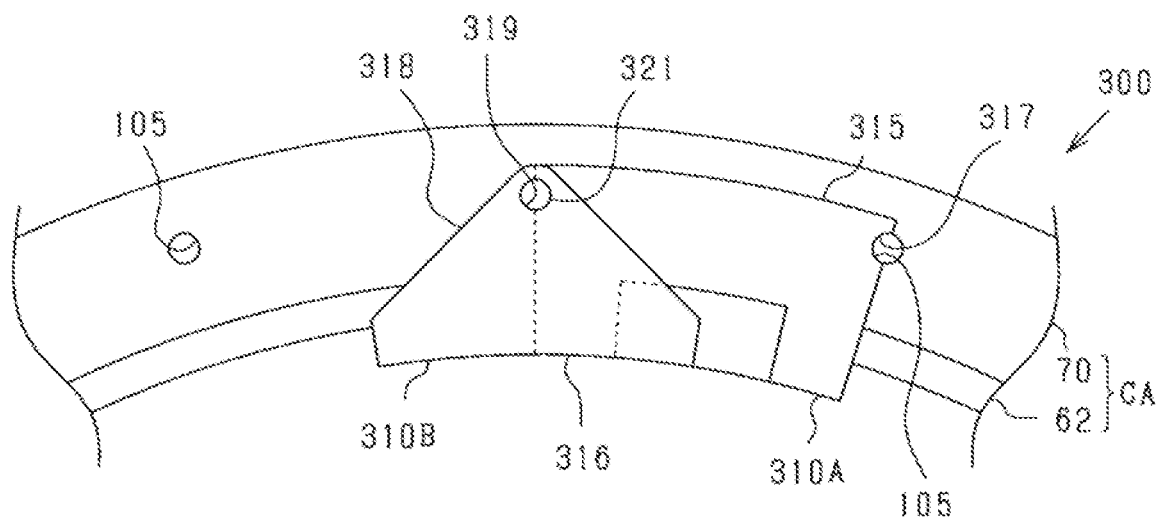
FIG. 40 is a plan view showing coil modules in a state of having been assembled to a core assembly in the inner rotor type rotating electric machine.

FIG. 40 is a plan view showing the coil modules 310A and 310B in a state of having been assembled to the core assembly CA. In addition, in the example shown in FIG. 40, in each of the axial end faces of the stator holder 70, there are formed a plurality of recesses 105 at equal intervals in the circumferential direction. Moreover, the stator holder 70 has a cooling structure using a liquid coolant or air. For example, the stator holder 70 may have, as an air-cooled structure, a plurality of heat-dissipating fins formed on the outer circumferential surface thereof.

As shown in FIG. 40, the insulating covers 315 and 316 are arranged so as to overlap one another in the axial direction. Moreover, in the state where the recesses 105 of the stator holder 70, the recesses 317 formed in the side walls of the insulating covers 315 and the through-holes 319 formed in the protruding portions 318 of the insulating covers 316 are aligned with one another in the axial direction, fixing pins 321 are inserted respectively into the axially-aligned groups of the recesses 105 and 317 and the through-holes 319. Consequently, the insulating covers 315 and 316 are together fixed to the stator holder 70.

Moreover, in the example shown in FIG. 40, the insulating covers 315 and 316 are fixed by the fixing pins 321 to the axial end faces of the stator holder 70 that is located radially outside the stator core 62. In this case, since the stator holder 70 has the cooling structure formed therein, heat generated in the partial windings 311A and 311B can be easily transferred to the stator holder 70, thereby improving the performance of cooling the stator coil 61.

In the rotating electric machine 10 according to the above-described embodiment, the stator 60 is configured to have a toothless structure. Alternatively, the stator 60 may be configured to have protrusions (e.g., teeth) extending radially from a back yoke. In this case, the coil modules 150 may be assembled to the back yoke.

In the rotating electric machine 10 according to the above-described embodiment, the phase windings of the stator coil 61 are star-connected together. Alternatively, the phase windings of the stator coil 61 may be Δ-connected together.

The rotating electric machine 10 according to the above-described embodiment is configured as a rotating-field type rotating electric machine where the rotor constitutes the field system and the stator constitutes the armature. Alternatively, the rotating electric machine 10 may be configured as a rotating-armature type rotating electric machine where a rotor constitutes an armature and a stator constitutes a field system.

Second Embodiment

In the above-described embodiment and modifications, the electrical conductor wire CR may be configured, as an electrical conductor, as follows. Hereinafter, the configuration of the electrical conductor wire CR according to the present embodiment will be described in detail. In addition, the differences in configuration between the present embodiment and the above-described embodiment and modifications will be mainly described. Moreover, in the present embodiment, explanation will be given taking the basic configuration of the rotating electric machine 10 according to the first embodiment as an example.

Figure 41:
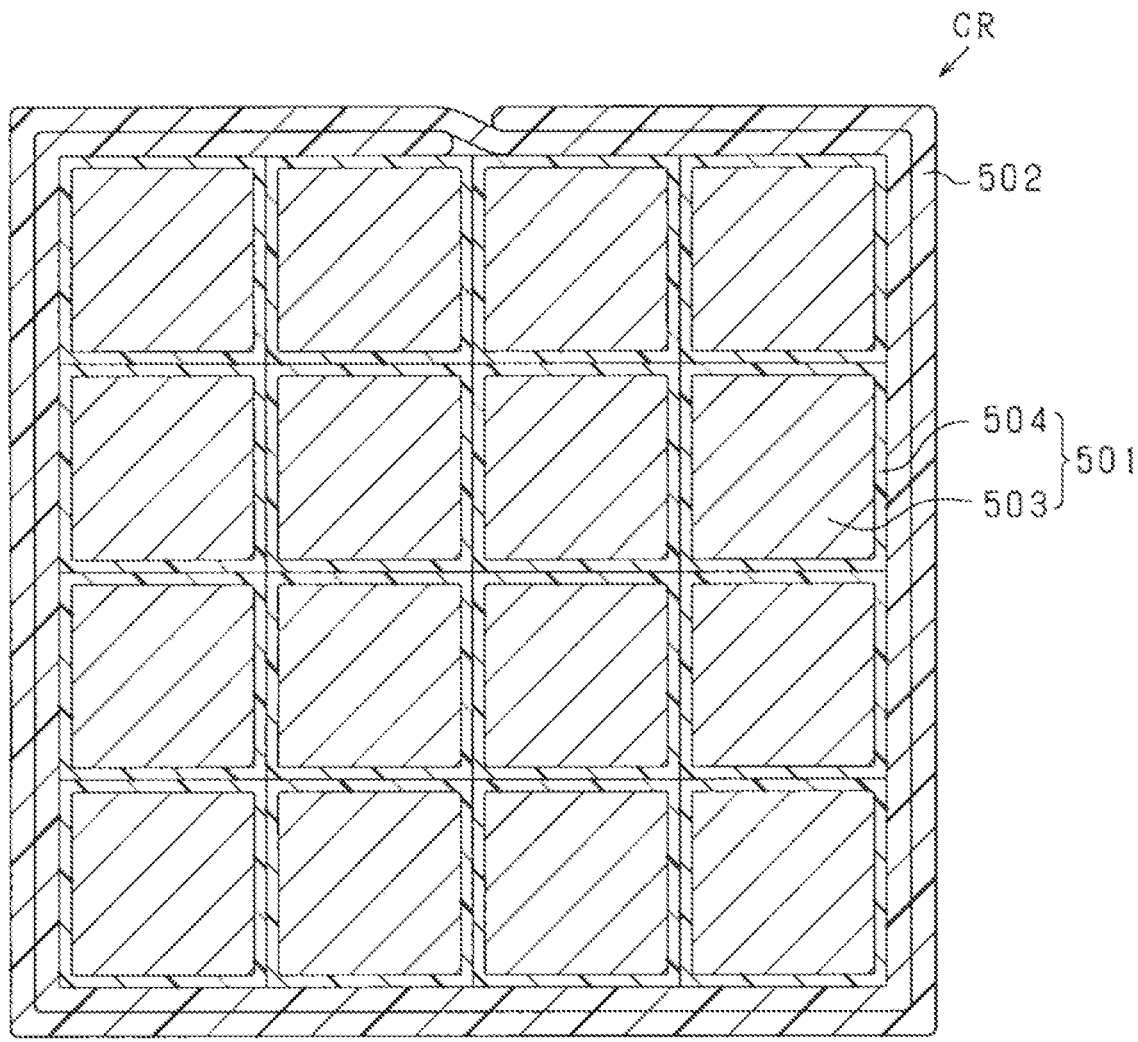
FIG. 41 is a cross-sectional view of an electrical conductor wire according to a second embodiment.

FIG. 41 is an enlarged cross-sectional view of the electrical conductor wire CR according to the second embodiment. As shown in the figure, in the present embodiment, the electrical conductor wire CR is configured to have a quadrangular cross-sectional shape. It should be noted that the electrical conductor wire CR may alternatively have other cross-sectional shapes, such as a polygonal cross-sectional shape other than the quadrangular cross-sectional shape, or a circular cross-sectional shape. Moreover, in the present embodiment, the electrical conductor wire CR is formed by bundling a plurality of element wires 501 together and covering the bundled element wires 501 with an insulating coat 502. Consequently, electrical insulation is ensured between circumferentially or radially overlapping parts of the electrical conductor wire CR and between the electrical conductor wire CR and the stator core 62.

In addition, the stator coil 61 formed of electrical conductor wires CR retains its insulation properties due to the insulating coats 502 of the electrical conductor wires CR except at those portions of the electrical conductor wires CR which are exposed for electrical connection. The exposed portions include, for example, the winding end portions 154 and 155.

Each of the element wires 501 includes an electrical conductor 503 through which electric current flows, and a fusing layer 504 that covers the surface of the electrical conductor 503. The electrical conductor 503 may be formed of, for example, an electrically conductive metal such as copper. In the present embodiment, the electrical conductor 503 is made of a flat wire having a quadrangular cross-sectional shape. It should be noted that the electrical conductor 503 may alternatively be made of a round wire having a circular cross-sectional shape or a wire having any other cross-sectional shape (e.g., polygonal or elliptical cross-sectional shape). The fusing layer 504 may be formed of, for example, an epoxy adhesive resin. In addition, the fusing layer 504 is heat resistant to about 150° C.

The fusing layer 504 is formed to be thinner than the insulating coat 502. The fusing layer 504 may have a thickness of, for example, 10 μm or less. In each of the element wires 501, on the surface of the electrical conductor 503, there is formed only the fusing layer 504 without any additional insulating layer provided thereon. In addition, the fusing layer 504 may be formed of an insulating member. That is, the idea is to configure the fusing layer 504 to have both the resin and insulation properties of a self-fusing wire. In general, an insulating layer and a fusing layer are provided separately. However, the fusing layer 504 formed of the epoxy adhesive resin can also serve as an insulating layer; therefore, an ordinary insulating layer is absent from each of the element wires 501.

The fusing layer 504 fuses at a lower temperature than the insulating coat 502. The fusing layer 504 also has a feature of being high in permittivity. With the feature of fusing at a lower temperature, it is possible to achieve an advantageous effect of facilitating electrical connection between the element wires 501 at ends thereof. Moreover, it is easy for the fusing layer 504 to fuse. On the other hand, the permittivity of the fusing layer 504 is allowed to be high because the electric potential differences between the element wires 501 are smaller than those between electrical conductor wires CR. With the above configuration, when the fusing layers 504 of the element wires 501 are fused, it is possible to effectively reduce the eddy current loss only by the contact resistances between the element wires 501.

Moreover, in a state of the element wires 501 being bundled together, the fusing layers 504 of the element wires 501 are in contact with and fused to one another. Consequently, each adjacent pair of the element wires 501 are fixed to one another, thereby suppressing vibration and noise from being generated due to the element wires 501 rubbing against each other. Moreover, the shape of the electrical conductor wire CR is maintained by bundling the element wires 501 together and fusing the fusing layers 504 of the element wires 501 together.

The insulating coat 502 is formed of a resin, such as a modified PI enamel resin that is heat resistant to 220° C.-240° C. The oil resistance of the insulating coat 502 is secured by forming it with the modified PI enamel resin. That is, it is prevented, with respect to ATF, from being hydrolyzed and from being attacked by sulfur. In addition, in this case, the coefficient of linear expansion of the epoxy adhesive resin is higher than that of the modified PI enamel resin.

Figure 42:
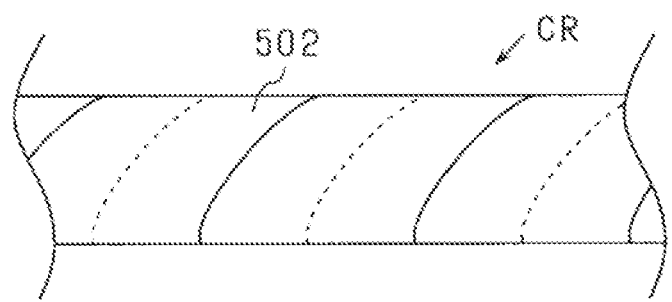
FIG. 42 is a side view of the electrical conductor wire according to the second embodiment.

The insulating coat 502 is formed in the shape of a wide tape, and is spirally wound around the outer periphery of the bundled element wires 501. Specifically, as shown in FIG. 42, the insulating coat 502 is spirally wound so that parts of the insulating coat 502 are slightly offset from one another in the extending direction of the element wires 501 (i.e., the left-right direction in FIG. 42) so as to overlap one another. More specifically, the insulating coat 502 is wound so that parts of the insulating coat 502 overlap one another by about half the width of the insulating coat 502. Consequently, the insulating coat 502 is wound in two layers at any location except the end portions. It should be noted that the insulating coat 502 is not necessarily wound in two layers, but may alternatively be wound in three or more layers. Moreover, it also should be noted that the insulating coat 502 may alternatively be wound in a single layer without gaps formed between parts of the insulating coat 502.

The insulating coat 502 is configured to have higher insulating performance than the fusing layers 504 of the element wires 501, so as to be capable of making inter-phase insulation. For example, when the thickness of the fusing layers 504 of the element wires 501 is about 1 μm, it is preferable to set the total thickness of the insulating coat 502 to about 9 μm-50 μm, thereby enabling the insulating coat 502 to suitably make inter-phase insulation. More specifically, in the case of the insulating coat 502 being wound in two layers, it is preferable to set the thickness of each layer of the insulating coat 502 to about 5 μm.

Figure 43:
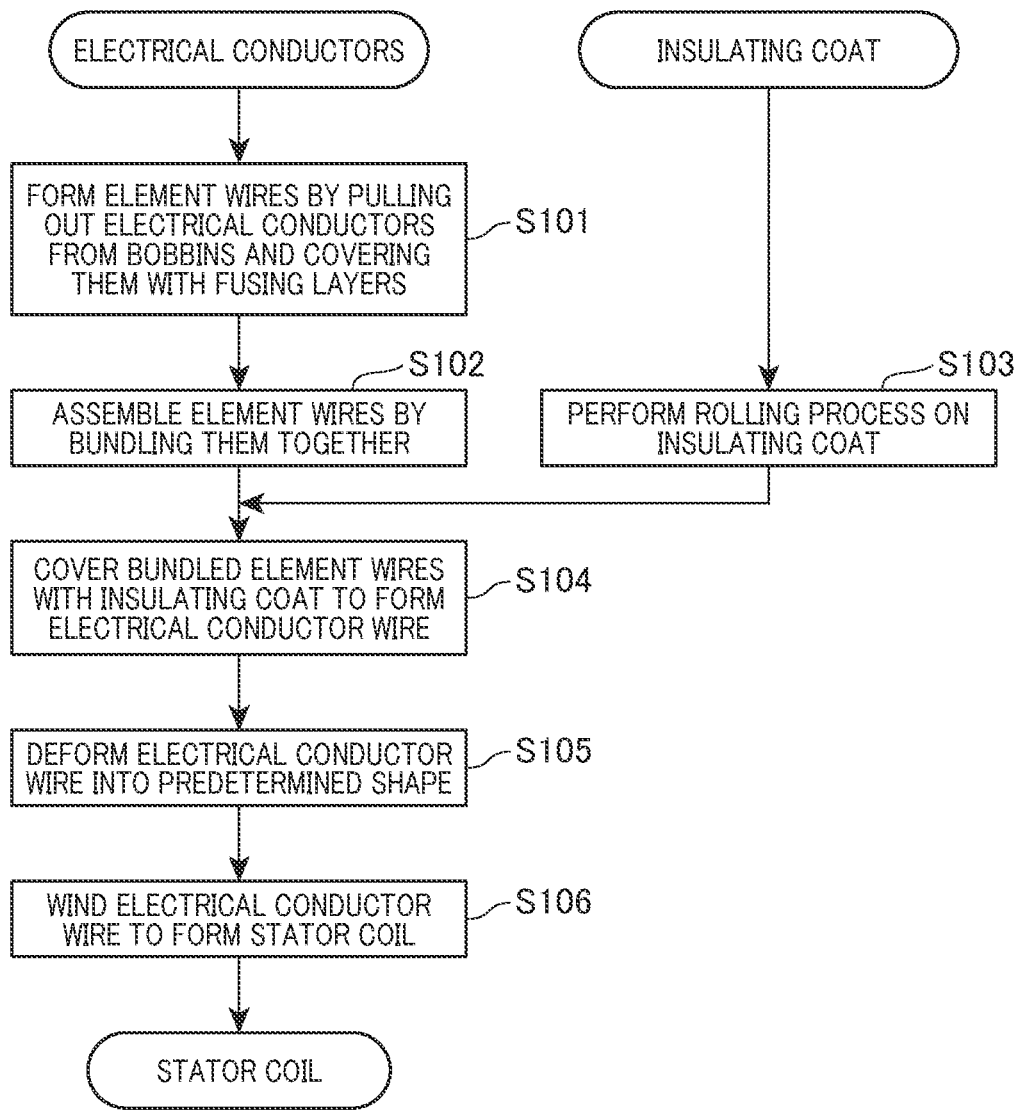
FIG. 43 is a flow chart illustrating a method of manufacturing a stator coil according to the second embodiment.

Next, a method of manufacturing the rotating electric machine 10, more specifically, a method of manufacturing the stator coil 61 will be described with reference to FIGS. 43 and 44. FIG. 43 is a flow chart illustrating the flow of the manufacturing method. FIG. 44 is a schematic diagram illustrating the manufacturing line.

First, from a plurality of cylindrical bobbins (or reels) 601 on which a plurality of wire-shaped electrical conductors 503 are respectively wound, the electrical conductors 503 are pulled out; and the fusing layers 504 are applied respectively to the surfaces of the pulled-out electrical conductors 503 to form the element wires 501 (step S101). Alternatively, the element wires 501, each of which has the fusing layer 504 applied to the surface of the electrical conductor 503 thereof, may be wound respectively on the bobbins 601 in advance; and the element wires 501 may be pulled out from the bobbins 601.

Then, the element wires 501 are bundled and thus assembled together (step S102). In doing so, the fusing layers 504 of the element wires 501 are brought into contact with and fused to one another. Moreover, in step S102, tension is applied to each of the element wires 501 to make them straight. Alternatively, each of the element wires 501 may be made straight before the assembly thereof (i.e., before step S102). In addition, step S102 is an assembly step.

On the other hand, a rolling process is performed on the wide tape-shaped insulating coat 502, thereby making it thinner (step S103). Moreover, by performing the rolling process, the insulating coat 502 is work-hardened and the tensile strength of the insulating coat 502 is improved. In addition, step S103 is a rolling step.

Thereafter (i.e., after step S102 and step S103), the tape-shaped insulating coat 502 having undergone the rolling process is spirally wound around the outer periphery of the element wires 501 in the bundled state, thereby covering the outer periphery of the element wires 501 (step S104). In addition, step S104 is a covering step. Further, a deforming step is performed on the element wires 501 covered with the insulating coat 502, thereby deforming them to have a predetermined cross-sectional shape (e.g., a quadrangular cross-sectional shape) (step S105). As a result, the electrical conductor wire CR is formed. Alternatively, the deforming step may be performed immediately after the assembly step in which the element wires 501 are bundled together.

Then, the electrical conductor wire CR is wound, as described in the first embodiment, to form the stator coil 61 (step S106). For example, to form the stator coil 61, the electrical conductor wire CR may be wound along a bobbin 602 for a stator coil. In addition, step S106 is a winding step. It should be noted that the straightness of the element wires 501 is maintained from when the element wires 501 are made straight until the electrical conductor wire CR is wound to form the stator coil 61 (i.e., from step S102 to step S106). That is, the manufacturing line is configured so that after the electrical conductor wire CR is formed, it is not wound around a cylindrical bobbin again.

According to the second embodiment, it is possible to achieve the following advantageous effects.

In the present embodiment, electrical insulation between adjacent parts of the electrical conductor wire CR is provided by the insulating coat 502. On the other hand, the electrical conductors 503 of the element wires 501 are covered with the fusing layers 504, but have no insulating layers provided thereon; therefore, the electrical conductors 503 may come into contact and thus electrically connected with one another. However, the electric potential differences between the electrical conductors 503 are small. Moreover, even if the fusing layers 504 are damaged during the bundling of the element wires 501 or during the covering of the element wires 501 with the insulating coat 502, the contact areas between the electrical conductors 503 would be very small and thus the contact resistances between the electrical conductors 503 would be very high. Therefore, even if the electrical conductors 503 are not completely insulated from each other, it is still possible to suppress eddy current from flowing between the electrical conductors 503.

In view of the above, in the present embodiment, the fusing layers 504 are provided directly on the electrical conductors 503 without insulating layers provided on the surfaces of the electrical conductors 503; and the fusing layers 504 are fused to one another. Consequently, it becomes possible to eliminate the time and effort required to provide insulating layers on the surfaces of the electrical conductors 503. Moreover, with the fusing layers 504 provided on the electrical conductors 503, it becomes easy to keep the element wires 501 in the bundled state and to cover the bundled element wires 501 with the insulating coat 502. As a result, it becomes easy to manufacture the electrical conductor wire CR and thus the rotating electric machine 10.

In the present embodiment, the insulating coat 502 is tape-shaped and spirally wound around the outer periphery of the bundled element wires 501. Since the electrical conductor wire CR is formed by winding the tape-shaped insulating coat 502 around the element wires 501, the insulating coat 502 can be made thinner than in the case of resin-molding the element wires 501. Moreover, since the element wires 501 are fixed together by the fusing layers 504, it becomes possible to keep the element wires 501 in the bundled state and to easily wind the tape-shaped insulating coat 502 around the bundled element wires 501.

In the present embodiment, unlike the conventional process of forming an insulating coat by extrusion, the rolling process is performed on the insulating coat 502. Consequently, the insulating coat 502 is thinned and work-hardened. As a result, the insulating coat 502 is prevented from being damaged when the electrical conductor wire CR is wound to form the stator coil 61. That is, with the insulating coat 502 being a strengthened tape, it becomes possible to bear such a force peculiar to divided wires that when the element wires 501 are bent, they move irregularly to damage the insulating coat 502. In addition, in the case of forming an insulating coat by extrusion, there is a risk of the insulating coat being cracked. Furthermore, in the present embodiment, with the insulating coat 502 thinned, it becomes possible to improve the space factor of the electrical conductors 503 in the space where the stator coil 61 is received.

In the present embodiment, in the covering step (i.e., step S104), the insulating coat 502 is spirally wound around the outer periphery of the bundled element wires 501 so as to have parts of the insulating coat 502 overlapping one another. Consequently, it becomes possible to prevent foreign matter such as dust or water from reaching the element wires 501 from the outside through gaps which otherwise might be formed between parts of the insulating coat 502. Moreover, with parts of the insulating coat 502 overlapping one another, it becomes difficult for gaps to be formed when the electrical conductor wire CR is wound to form the stator coil 61. In addition, in the gaps between the element wires 501, neither electropainting nor enamel painting could be performed well and thus bubbles might be formed; in the present embodiment, this problem is solved by using the tape-shaped insulating coat 502.

In the case of using an electrical conductor wire CR wound around a bobbin after being formed (i.e., after the covering step), the electrical conductor wire CR pulled out from the bobbin bends and thus slight deviation of straightness occurs, thereby hindering improvement in the space factor. That is, when the electrical conductor wire CR is wound around the bobbin, there is such a problem peculiar to divided wires that the elongation is different between an inner element wire and an outer element wire on the bobbin. Specifically, only the outer element wire is elongated. When the electrical conductor wire CR elongated only on the outer side is pulled out from the bobbin to form the stator coil 61, the electrical conductor wire CR becomes wavy because part of the electrical conductor wire CR is in a shrunk state. Consequently, when the wavy electrical conductor wire CR is further wound to form the stator coil 61, gaps will be formed between adjacent parts of the electrical conductor wire CR, thereby hindering improvement in the space factor and increasing the copper loss.

In view of the above, in the present embodiment, in the assembly step (i.e., step S102), a pressure is applied to the bundled element wires 501 to make them straight; after the assembly step, the element wires 501 are kept straight until the electrical conductor wire CR is wound to form the stator coil 61 in the winding step (i.e., step S106). Consequently, it becomes possible to improve the straightness of the electrical conductor wire CR in comparison with the case of winding the electrical conductor wire CR around a cylindrical bobbin again. That is, it becomes difficult for deviation to occur in the straightness of the electrical conductor wire CR due to the difference between the curvatures on the outer peripheral side and the inner peripheral side during the winding of the electrical conductor wire CR around the bobbin; thus it also becomes difficult for the electrical conductor wire CR to be imparted with a wavy habit. As a result, it becomes difficult for gaps to be formed between adjacent parts of the electrical conductor wire CR when the electrical conductor wire CR is wound to form the stator coil 61; thus it becomes possible to improve the space factor.

As described in the first embodiment, each of the first coil modules 150A has a shape such that the partial winding 151 is bent at the coil ends CE radially inward, i.e., toward the stator core 62 side. However, as described above, in the present embodiment, the rolling process is performed on the insulating coat 502 to improve the tensile strength thereof. Consequently, it becomes difficult for the insulating coat 502 to be damaged during the bending of the partial winding 151; and thus it becomes possible to ensure suitable insulation by the insulating coat 502. In addition, by bending the partial winding 151 at the coil ends CE, it becomes possible to suppress increase in the axial length of the stator coil 61.

In the present embodiment, the thickness of the insulating coat 502 is set to be larger than the thickness of the fusing layers 504 of the element wires 501. Consequently, it becomes possible to secure both the required intra-phase and inter-phase withstand voltages and to suppress the eddy current loss without increasing the copper loss. In addition, the copper loss is caused by decrease in the copper area due to increase in the thickness of the insulating coat 502.

Modifications of Second Embodiment

The configurations of the electrical conductor wire CR and the stator coil 61 according to the above-described second embodiment may be modified as described below. In the following modifications, the differences from the configurations described in the above-described embodiments and modifications will be mainly described. Moreover, in the following modifications, explanation will be given taking the basic configurations according to the second embodiment as an example.

In the above-described second embodiment, the coefficient of linear expansion (or the linear expansivity) of the fusing layers 504 of the element wires 501 may be set to be different from the coefficient of linear expansion of the insulating coat 502. Specifically, as described above, the electric potential differences between the electrical conductors 503 of the element wires 501 are small. Moreover, even if the fusing layers 504 are damaged during the bundling of the element wires 501 or during the covering of the element wires 501 with the insulating coat 502, the contact areas between the electrical conductors 503 would be very small and thus the contact resistances between the electrical conductors 503 would be very high. Therefore, even if the electrical conductors 503 are not completely insulated from each other, it is still possible to suppress eddy current from flowing between the electrical conductors 503. Furthermore, after the manufacture, there would be no problem even if the fusing layers 504 are damaged and thus the electrical conductors 503 come into contact with one another. Accordingly, any material whose coefficient of linear expansion is different from the coefficient of linear expansion of the insulating coat 502 may be selected as the material of the fusing layers 504, thus facilitating the design. For example, the coefficient of linear expansion of the fusing layers 504 may be set to be higher than the coefficient of linear expansion of the insulating coat 502.

As a matter of course, the coefficient of linear expansion of the fusing layers 504 may alternatively be set to be lower than the coefficient of linear expansion of the insulating coat 502. In this case, it would become difficult for the fusing layers 504 to be damaged and thus the number of locations where the electrical conductors 503 come into contact with each other would not be increased; thus it would become possible to suppress increase in the eddy current loss.

In the above-described second embodiment, the coefficient of linear expansion (or the linear expansivity) of the fusing layers 504 may be set to be equal to the coefficient of linear expansion of the insulating coat 502. In this case, it would become possible to prevent the fusing layers 504 and the insulating coat 502 from being cracked at the same time.

In the above-described second embodiment, the coefficient of linear expansion (or the linear expansivity) of the fusing layers 504 of the element wires 501 may be set to be different from the coefficient of linear expansion of the electrical conductors 503 of the element wires 501. In addition, when the coefficient of linear expansion of the fusing layers 504 is set to a value between the coefficient of linear expansion of the electrical conductors 503 and the coefficient of linear expansion of the insulating coat 502, the fusing layers 504 can serve as a cushion to suppress occurrence of cracking in the insulating coat 502.

In the above-described second embodiment, the insulating coat 502 may alternatively be formed of PA, PI, PAI, PEEK or the like. Moreover, each of the fusing layers 504 of the element wires 501 may alternatively be formed of fluorine, polycarbonate, silicone, epoxy, polyethylene naphthalate or LCP.

In the above-described second embodiment, the manufacturing process of the stator coil 61 includes the deforming step. However, when each of the electrical conductors 503 of the element wires 601 is made of a flat wire and the element wires 501 can be bundled together without gaps formed therebetween, the deforming step may be omitted from the manufacturing process. In contrast, when each of the electrical conductors 503 of the element wires 601 is made of a round wire, it is preferable for the manufacturing process to include the deforming step. Moreover, in the above-described second embodiment, the deforming step is performed after the bundling of the element wires 501. Alternatively, the deforming step may be performed, before the bundling of the element wires 501, on each of the element wires 501 so as to deform them to have a quadrangular cross-sectional shape.

Figure 45A:
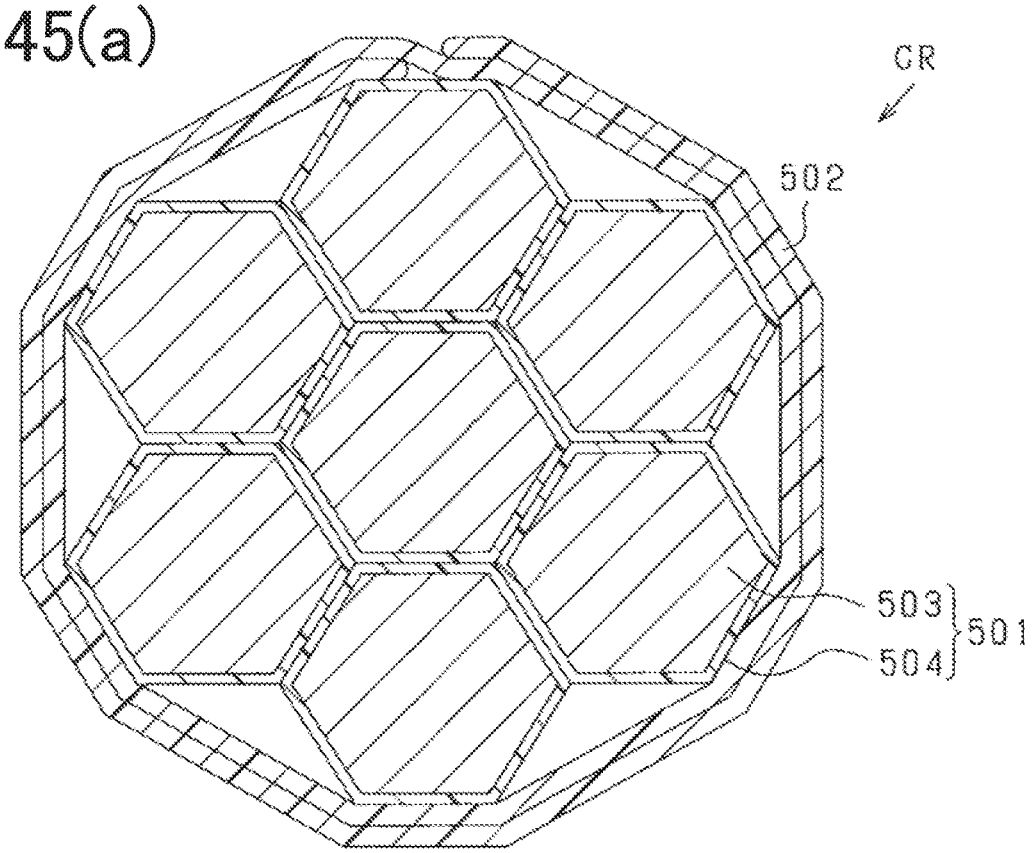
FIGS. 45(a) and 45(b) are cross-sectional views of electrical conductor wires according to modifications of the second embodiment.
Figure 45B:
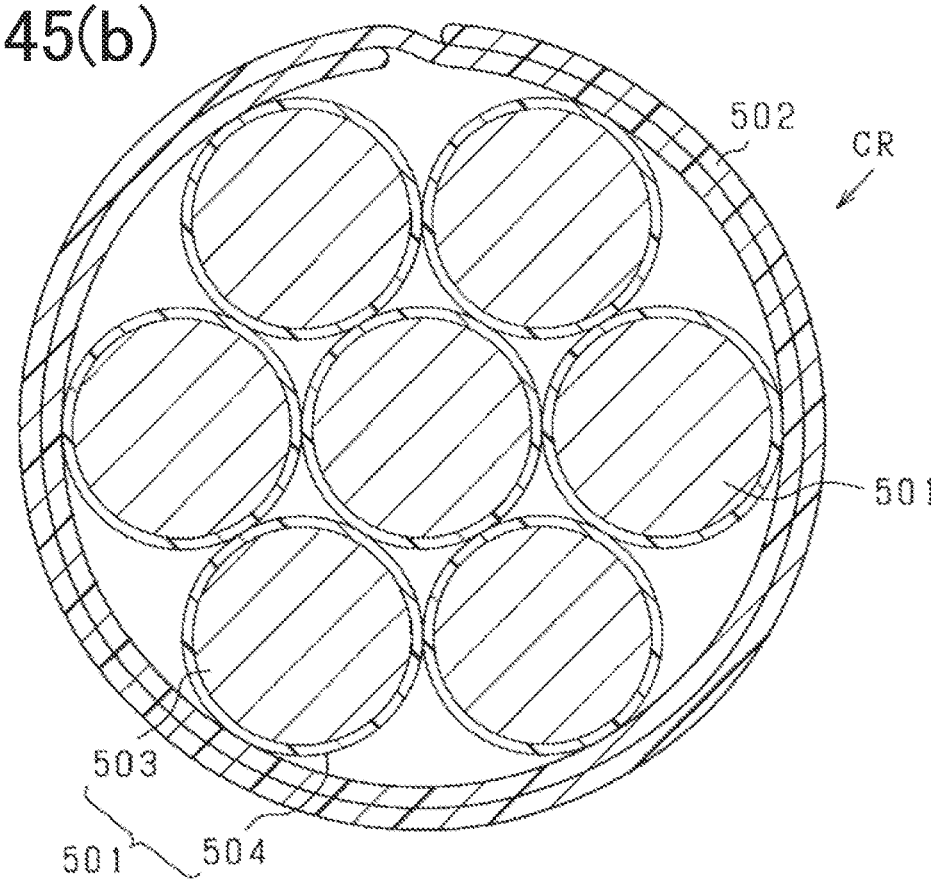

In the above-described second embodiment, each of the electrical conductors 503 of the element wires 601 has a quadrangular cross-sectional shape. Alternatively, each of the electrical conductors 503 may have a hexagonal, pentagonal, triangular or circular cross-sectional shape. Accordingly, the electrical conductor wire CR may have a hexagonal, pentagonal, quadrangular, triangular or circular cross-sectional shape. For example, as shown in FIG. 45(a), each of the electrical conductors 503 of the element wires 601 may have a hexagonal cross-sectional shape; and the electrical conductor wire CR as a whole may have a polygonal cross-sectional shape. Otherwise, as shown in FIG. 45(b), each of the electrical conductors 503 of the element wires 601 may have a circular cross-sectional shape; and the electrical conductor wire CR as a whole may also have a circular cross-sectional shape. In addition, in the examples shown in FIGS. 45(a) and 45(b), although there are gaps formed between the insulating coat 502 and the element wires 501, it is still possible to omit the deforming step from the manufacturing process of the stator coil 61. Furthermore, the electrical conductors 503 of the element wires 501 do not necessarily all have the same shape; and the fusing layers 504 of the element wires 501 also do not necessarily all have the same shape. For example, by the deforming step, some or all of the electrical conductors 503 of the element wires 501 may be deformed to have different shapes from each other; and some or all of the fusing layers 504 of the element wires 501 may also be deformed to have different shapes from each other. In addition, as a matter of course, by the deforming step, some or all of the electrical conductors 503 of the element wires 501 may be distorted in shape; and some or all of the fusing layers 504 of the element wires 501 may also be distorted in shape.

In the above-described second embodiment, each of the electrical conductors 503 of the element wires 501 may be constituted of a bundle of electrically conductive fibers. Further, the fibers may be implemented by, for example, CNT (carbon nanotube) fibers. The CNT fibers are micro fibers which are obtained by substituting at least part of carbon with boron. The fibers may alternatively be implemented by other carbon micro fibers, such as Vapor Grown Carbon Fibers (VGCF). However, it is preferable for the fibers to be implemented by CNT fibers.

In the above-described second embodiment, the electrical conductor wire CR may be formed by twisting the element wires 501 together. In this case, generation of eddy current in each of the element wires 501 is further suppressed. Moreover, each of the element wires 501 is twisted to have portions where the magnetic field application directions are opposite to each other; therefore, the counterelectromotive forces generated in these portions are canceled by each other. Consequently, further reduction in the eddy current can be achieved. In particular, with each of the element wires 501 constituted of the electrically conductive fibers, it becomes possible to subdivide each of the element wires 501 and considerably increase the number of twists in the electrical conductor wire CR, thereby more effectively reducing the eddy current.

In the above-described embodiments, the stator coil 61 is covered and encapsulated by the encapsulating members such as the insulating covers 161-164 and the sheet-like insulating coats 157. Alternatively, the stator coil 61 may be encapsulated by resin molding so as to cover the outer periphery of each electrical conductor wire CR with a resin. In this case, it is preferable for an encapsulating member to be formed by the resin molding in a range including the coil ends CE of the stator coil 61. That is, it is preferable for almost the entire stator coil 61 to be resin-encapsulated except at the winding end portions 154 and 155, i.e., except at the connection portions.

In addition, in the case of the rotating electric machine 10 being used as a vehicular power source, it is preferable for the aforementioned encapsulating member to be formed of a highly heat-resistant fluorocarbon resin, epoxy resin, PPS resin, PEEK resin, LCP resin, silicone resin, PAI resin, PI resin or the like. Moreover, in terms of suppressing occurrence of cracking due to a difference in coefficient of linear expansion, it is preferable for the encapsulating member to be formed of the same material as the insulating coat 502 of the electrical conductor wire CR. That is, it is preferable that silicone resins, whose coefficients of linear expansion are generally higher than twice those of other resins, are excluded from candidates for the material of the encapsulating member. Furthermore, in electrical products having no combustion engine, such as an electrical vehicle, a PPO resin, a phenol resin or an FRP resin, which have heat resistance of about 180° C., may be used as the material of the encapsulating member. In addition, in fields where the ambient temperature of the rotating electric machine 10 is lower than 100° C., the material of the encapsulating member is not limited to the aforementioned candidates.

Further, in the case of providing the encapsulating member in the stator coil 61, the coefficient of linear expansion of the encapsulating member may be set to be different from the coefficient of linear expansion of the insulating coat 502 of the electrical conductor wire CR. For example, the coefficient of linear expansion of the insulating coat 502 may be lower than the coefficient of linear expansion of the encapsulating member, and also be lower than the coefficient of linear expansion of the fusing layers 504 of the element wires 501. In this case, it would be possible to prevent these members from being cracked together. That is, expansion due to change in the external temperature can be prevented by the insulating coat 502 having the lower coefficient of linear expansion. This also applies to the opposite case.

Alternatively, the coefficient of linear expansion of the insulating coat 502 may be set to a value between the coefficient of linear expansion of the encapsulating member and the coefficient of linear expansion of the fusing layers 504 of the element wires 501. For example, the coefficient of linear expansion of the insulating coat 502 may be set to be lower than the coefficient of linear expansion of the encapsulating member and higher than the coefficient of linear expansion of the fusing layers 504 of the element wires 501. That is, the coefficients of linear expansion of these members may be set to increase from the inner side to the outer side. Otherwise, the coefficient of linear expansion of the insulating coat 502 may be set to be higher than the coefficient of linear expansion of the encapsulating member and lower than the coefficient of linear expansion of the fusing layers 504 of the element wires 501. That is, the coefficients of linear expansion of these members may be set to increase from the outer side to the inner side. Consequently, though the coefficient of linear expansion of the encapsulating member is different from the coefficient of linear expansion of the fusing layers 504, the insulating coat 502, which has the intermediate coefficient of linear expansion and is interposed between the encapsulating member and the fusing layers 504, could serve as a cushion therebetween. As a result, it would be possible to prevent the encapsulating member and the fusing layers 504 from being cracked at the same time due to change in the external temperature of the stator coil 61 or due to heat generated in the electrical conductors 503.

In the above-described second embodiment, the adhesive strength between the electrical conductors 503 and the fusing layers 504, the adhesive strength between the fusing layers 504 and the insulating coat 502, and the adhesive strength between the insulating coat 502 and the encapsulating member may be set to be different from each other. For example, the adhesive strengths may be set to decrease from the inner side to the outer side. In addition, the adhesive strength between two layers of coats can be determined from, for example, the tensile strength when the two layers are peeled from each other. Setting the adhesive strengths as above, even if a difference between the inner and outer temperatures is caused by heat generation or cooling, it would still be possible to suppress occurrence of cracking on both the inner side and the outer side at the same time (or co-cracking).

In the above-described second embodiment, after being formed, the electrical conductor wire CR may be once wound around a cylindrical bobbin and received thereon. More specifically, as shown in FIG. 46, after being formed in step S105, the electrical conductor wire CR may be once wound around a cylindrical bobbin and received thereon (step S105*a*). Then, the electrical conductor wire CR may be pulled out from the cylindrical bobbin (step S105*b*), and further wound as described in the first embodiment to form the stator coil 61 (step S106). In addition, step S105*a* is a winding step and step S105*b* is a pulling-out step.

In the above case, deviation occurs in the straightness of the electrical conductor wire CR due to the difference between the curvatures on the outer peripheral side and the inner peripheral side during the winding of the electrical conductor wire CR around the cylindrical bobbin; thus the electrical conductor wire CR is imparted with a wavy habit. Consequently, it becomes easy for gaps to be formed between adjacent parts of the electrical conductor wire CR when the electrical conductor wire CR is wound to form the stator coil 61 in step S106. Therefore, a filler such as varnish may be filled into minute gaps between adjacent parts of the electrical conductor wire CR (step S107). In addition, step S107 is a filling step. By performing the filling step, it would become possible to suppress vibration of the electrical conductor wire CR. Moreover, since the electrical conductor wire CR is once wound around the cylindrical bobbin after being formed, it becomes unnecessary to maintain the straightness of the element wires 501 from when the element wires 501 are made straight until the electrical conductor wire CR is wound to form the stator coil 61 (i.e., from step S102 to step S106). That is, it becomes unnecessary to carry out these steps on one manufacturing line; thus the degree of freedom of manufacturing lines can be improved.

The disclosure in this description is not limited to the embodiments illustrated above. The disclosure encompasses not only the embodiments illustrated above, but also modifications of the embodiments which can be derived by one of ordinary skill in the art from the embodiments. For example, the disclosure is not limited to the combinations of components and/or elements illustrated in the embodiments. Instead, the disclosure may be implemented by various combinations. The disclosure may include additional parts which can be added to the embodiments. The disclosure encompasses components and/or elements omitted from the embodiments. The disclosure also encompasses any replacement or combination of components and/or elements between one and another of the embodiments. The disclosed technical ranges are not limited to the description of the embodiments. Instead, the disclosed technical ranges should be understood as being shown by the recitation of the claims and as encompassing all modifications within equivalent meanings and ranges to the recitation of the claims.

While the disclosure has been described pursuant to the embodiments, it should be appreciated that the disclosure is not limited to the embodiments and the structures. Instead, the disclosure encompasses various modifications and changes within equivalent ranges. In addition, various combinations and modes are also included in the category and the scope of technical idea of the disclosure.

What is claimed is:

1. A rotating electric machine comprising:
   an armature coil; and
   an armature that includes the armature coil, wherein
   the armature coil is formed by winding an electrical conductor wire,
   the electrical conductor wire includes a plurality of element wires in a bundled state and an insulating coat covering the bundled element wires,
   each of the element wires includes an electrical conductor through which electric current flows, and a fusing layer that covers a surface of the electrical conductor,
   in the bundled state of the element wires, the fusing layers of the element wires are in contact with and fused to one another,
   an adhesive strength between the fusing layers of the element wires and the insulating coat is lower than an adhesive strength between the electrical conductor and the fusing layer in each of the element wires,
   between adjacent parts of the electrical conductor wire wound to form the armature coil, there are formed gaps due to differences in straightness between different parts of the electrical conductor wire, and
   the gaps are filled with a filler.

2. A method of manufacturing a rotating electric machine, the rotating electric machine comprising an armature coil, the method comprising:
   an assembly step of bundling a plurality of element wires, each of which includes an electrical conductor through which electric current flows and a fusing layer covering a surface of the electrical conductor, to have the fusing layers of the element wires in contact with and fused to one another;
   a covering step of covering the element wires, which are bundled in the assembly step, with a tape-shaped insulating coat to form an electrical conductor wire,
   wherein an adhesive strength between the fusing layers of the element wires and the insulating coat is lower than an adhesive strength between the electrical conductor and the fusing layer in each of the element wires;
   a first winding step of winding the electrical conductor wire, which is formed in the covering step, around a cylindrical bobbin;
   a pulling-out step of pulling out the electrical conductor wire, which is wound around the cylindrical bobbin, from the cylindrical bobbin;
   a second winding step of winding the electrical conductor wire, which is pulled out from the cylindrical bobbin in the pulling-out step, to form the armature coil; and a filling step of filling a filler into gaps between adjacent parts of the electrical conductor wire wound to form the armature coil.

* * * * *